(12) United States Patent
Busbee et al.

(10) Patent No.: US 11,230,131 B2
(45) Date of Patent: Jan. 25, 2022

(54) PRINTED POLYMERIC ARTICLES, SYSTEMS AND METHODS

(71) Applicant: Voxel8, Inc., Somerville, MA (US)

(72) Inventors: Travis Alexander Busbee, Somerville, MA (US); Andrew Marschner, Chicago, IL (US); Alexandra Koukhtieva, Somerville, MA (US)

(73) Assignee: Kornit Digital Technologies Ltd., Rosh Haayin (IL)

( * ) Notice: Subject to any disclaimer, the term of this patent is extended or adjusted under 35 U.S.C. 154(b) by 0 days.

(21) Appl. No.: 16/224,504

(22) Filed: Dec. 18, 2018

(65) Prior Publication Data

US 2019/0358983 A1 Nov. 28, 2019

Related U.S. Application Data

(60) Provisional application No. 62/714,560, filed on Aug. 3, 2018, provisional application No. 62/607,292, filed on Dec. 18, 2017.

(51) Int. Cl.
| | |
|---|---|
| *B33Y 10/00* | (2015.01) |
| *B41J 2/04* | (2006.01) |
| *B41M 5/50* | (2006.01) |
| *B33Y 30/00* | (2015.01) |
| *B29C 64/264* | (2017.01) |
| *B29C 64/112* | (2017.01) |
| *B29C 64/209* | (2017.01) |
| *B41M 5/00* | (2006.01) |

(52) U.S. Cl.
CPC .......... *B41M 5/502* (2013.01); *B29C 64/112* (2017.08); *B29C 64/209* (2017.08); *B29C 64/264* (2017.08); *B33Y 10/00* (2014.12); *B33Y 30/00* (2014.12); *B41J 2/04* (2013.01); *B41M 5/0011* (2013.01)

(58) Field of Classification Search
CPC .. D06P 5/30; B41J 3/4078; B41J 2/04; B41M 5/502; B41M 5/0011; B33Y 10/00; B33Y 30/00; B33Y 80/00; B29C 64/264; B29C 64/112; B29C 64/209; B29C 64/106; C09D 11/322; C09D 11/102; C09D 11/101
See application file for complete search history.

(56) References Cited

U.S. PATENT DOCUMENTS

| | | | | |
|---|---|---|---|---|
| 9,346,303 | B2 * | 5/2016 | Grinberg | B41M 7/0081 |
| 9,694,389 | B2 * | 7/2017 | Fan | B29C 64/00 |
| 9,815,268 | B2 * | 11/2017 | Mark | B33Y 70/00 |
| 10,035,358 | B2 * | 7/2018 | Pervan | B41J 3/407 |
| 10,194,714 | B2 * | 2/2019 | McGinnity | A43B 23/027 |
| 10,226,103 | B2 * | 3/2019 | Mark | B29C 64/106 |
| 10,556,447 | B2 * | 2/2020 | Pervan | B41M 5/0256 |
| 10,694,817 | B2 * | 6/2020 | McGinnity | A43B 1/04 |

(Continued)

FOREIGN PATENT DOCUMENTS

JP 2000-158796 * 6/2000 .............. B41J 2/01

OTHER PUBLICATIONS

Machine translation of JP 2000-158796, published on Jun. 2000. (Year: 2000).*

*Primary Examiner* — Huan H Tran
(74) *Attorney, Agent, or Firm* — Wolf, Greenfield & Sacks, P.C.

(57) ABSTRACT

Composite articles, and associated methods and systems, are generally provided.

29 Claims, 26 Drawing Sheets

(56) References Cited

U.S. PATENT DOCUMENTS

| | | | |
|---|---|---|---|
| 2015/0030817 A1* | 1/2015 | Wiegelmann | B44C 5/04 |
| | | | 428/195.1 |
| 2015/0298495 A1* | 10/2015 | Furuhata | B05D 1/36 |
| | | | 427/558 |
| 2016/0142741 A1* | 5/2016 | Haot | A63F 13/335 |
| | | | 725/12 |
| 2016/0192741 A1* | 7/2016 | Mark | A43B 23/0245 |
| | | | 36/43 |
| 2016/0219982 A1* | 8/2016 | Waatti | A43B 23/021 |
| 2019/0039310 A1* | 2/2019 | Busbee | A43B 13/026 |
| 2020/0139726 A1* | 5/2020 | Pervan | B41M 5/0353 |

* cited by examiner

PRINTED POLYMERIC ARTICLES, SYSTEMS AND METHODS

RELATED APPLICATIONS

This application claims priority under 35 U.S.C. § 119(e) to U.S. Provisional Application No. 62/607,292, filed Dec. 18, 2017, and entitled "Printed Polymeric Articles, Systems and Methods", which is incorporated herein by reference in its entirety for all purposes. This application also claims priority under 35 U.S.C. § 119(e) to U.S. Provisional Application No. 62/714,560, filed Aug. 3, 2018, and entitled "Printed Polymeric Articles, Systems and Methods", which is also incorporated herein by reference in its entirety for all purposes.

TECHNICAL FIELD

The present invention generally relates to composite articles, and associated methods and systems.

BACKGROUND

Certain articles comprising pigments and polymers have poor mechanical properties, and/or are formed in a manner which includes an undesirable step of purging a pigment from a chamber.

Accordingly, improved composite articles, and associated methods and systems are needed.

SUMMARY

The present invention generally relates to composite articles, and associated methods and systems.

In some embodiments, composite articles are provided. A composite article may comprise a substrate and a layer disposed on the substrate. The layer disposed on the substrate may comprise a plurality of pigment particles distributed within a polymer matrix.

In some embodiments, a composite article may comprise a first layer comprising a first polymer, a second layer comprising a pigment, and a third layer comprising a second polymer. The second layer may be disposed on the first layer. The third layer may be disposed on the second layer.

In some embodiments, a composite article comprises a substrate, a layer comprising a polymer disposed on the substrate, and a layer comprising a plurality of islands comprising an ink jet ink disposed on the polymer.

In some embodiments, a composite article comprises a substrate, a layer comprising a polymer disposed on the substrate, and an ink jet ink disposed on the polymer.

In some embodiments, a composite article comprises a substrate and a polymer. At least a portion of the polymer penetrates into an interior of the substrate.

In some embodiments, methods of forming composite articles are provided. A method may comprise depositing a plurality of pigment particles onto a substrate, and depositing a polymer onto the pigment particles to form a layer disposed on the substrate comprising the plurality of pigment particles distributed within a matrix comprising the polymer.

In some embodiments, a method comprises depositing a first polymer onto a substrate to form a first layer comprising the first polymer, depositing a pigment onto the first layer to form a second layer comprising the pigment, and depositing a second polymer onto the second layer to form a third layer comprising the second polymer.

In some embodiments, a method comprises depositing a first polymer onto a substrate to form a first layer comprising the first polymer and depositing an ink jet ink onto the first polymer to form a layer comprising islands comprising the ink jet ink disposed on the first layer.

In some embodiments, a method comprises depositing a first polymer onto a substrate to form a first layer comprising the first polymer and depositing an ink jet ink onto the first polymer.

In some embodiments, a method comprises depositing a polymer onto a substrate. At least a portion of the polymer penetrates into an interior of the substrate.

In some embodiments, a method comprises depositing a curable composition from a print head onto a substrate. The curable composition is at least partially cured prior to contacting the substrate.

In some embodiments, systems are provided. A system may comprise a mixing chamber, a compressed gas source configured to atomize a fluid flowing through the mixing chamber, and an ink jet head.

In some embodiments, digital printing systems are provided. A digital printing system may comprise a print head configured to deposit a curable composition onto a substrate at a first location and a source of light and/or heat configured to cure the curable composition at a second location. The digital printing system may be configured to translate the substrate through the digital printing system along a pathway comprising at least the first location and the second location.

In some embodiments, a digital printing system comprises a print head configured to deposit a curable composition onto a substrate at a first location and a second location. The digital printing system may be configured to translate the substrate through the digital printing system along a pathway comprising at least the first location and the second location.

In some embodiments, a digital printing system comprises a print head configured to deposit a composition onto a substrate at a first location and an ink jet tool configured to ink jet an ink jet ink onto the substrate at a second location. The digital printing system may be configured to translate the substrate through the digital printing system along a pathway comprising at least the first location and the second location.

In some embodiments, spray print heads are provided. A spray print head may comprise a chamber configured to receive a fluid and to output a curable composition comprising the fluid, a sheath configured to direct a gas flow to an outlet of the chamber, and an irradiation assembly configured to direct light to a location spaced from the outlet of the chamber and in the flow path of the curable composition output from the chamber.

In some embodiments, a method comprises spraying a polymer onto a fabric. The fabric may have a first stiffness, and a portion of the polymer may have a second stiffness greater than the first stiffness.

In some embodiments, a method comprises spraying a polymer onto a fabric draped over a non-flat support to form an article comprising the fabric and the polymer. The article comprising the fabric and the polymer may comprise a non-flat portion having a shape indicative of a portion of the non-flat support.

In some embodiments, a method comprises spraying a polymer onto an interface between two pieces of fabric to adhere together the two pieces of fabric.

In some embodiments, a method comprises spraying a polymer onto a seam joining together two pieces of fabric to form a polymer-coated seam that is waterproof.

In some embodiments, a method comprises spraying a polymer onto a portion of a piece of fabric to cover the portion of the fabric. A portion of the piece of fabric may remain uncovered by the polymer. The portion of the piece of fabric covered by the polymer may be waterproof. The portion of the piece of fabric uncovered by the polymer may be permeable to water.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
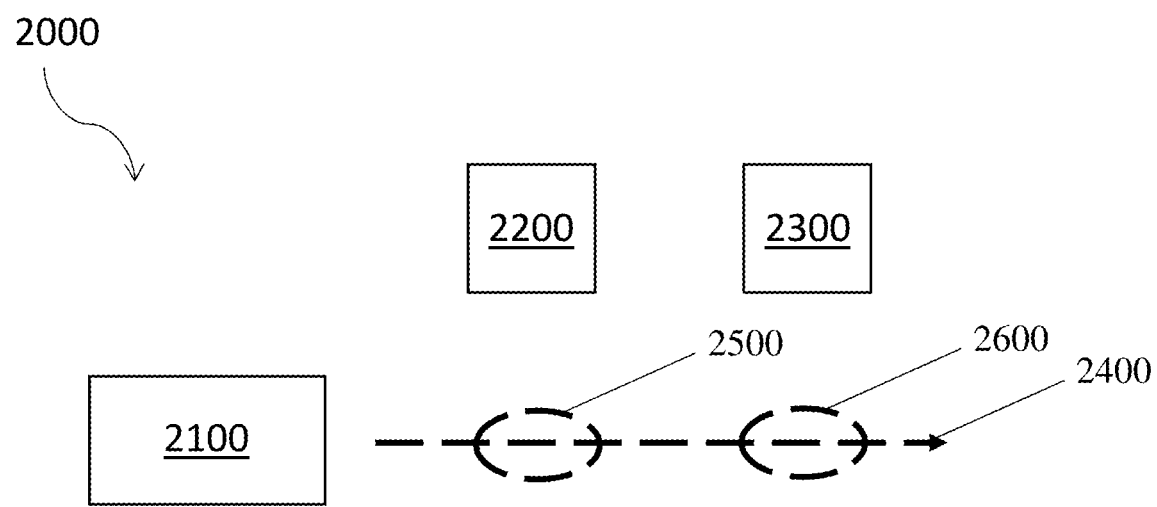
FIGS. 1A-1B are schematic depictions digital printing systems, according to certain embodiments.

Digital printing systems, spray print heads, ink jet heads, and articles including novel designs are generally described. The digital printing systems, spray print heads, and ink jet heads described herein may be advantageous for manufacturing articles in a manner that is rapid, facile, precise, consistent, and/or high-throughput. Some digital printing systems, spray print heads, and ink jet heads may be configured to perform printing processes, such as 3D-printing processes and/or 2D-printing processes, in parallel. For instance, some digital printing systems, spray print heads, and ink jet heads may be capable of performing parallel manufacturing processes. In some embodiments, a digital printing system comprises one or more spray print heads, one or more ink jet heads, and/or is configured to produce one or more of the articles described herein (e.g., by use of a spray print head and/or an ink jet head). The articles described herein may be capable of being formed using the digital printing systems, spray heads, and/or ink jet heads described herein, and/or may have novel advantageous features and/or advantageous features that would be challenging, expensive, or impossible to form using existing manufacturing processes. Some embodiments relate to methods of forming these articles, by, for instance, employing the digital printing systems, spray heads, and/or ink jet heads described herein.

While some digital printing systems, spray print heads, ink jet heads, and articles described herein may be related to each other, some embodiments relate to digital printing systems, spray print heads, ink jet heads, and articles that are unrelated to each other and/or incompatible with each other. For instance, some digital printing systems describe herein may lack spray print heads, may lack ink jet heads, and/or may not be configured to produce some of the articles described herein. Similarly, some spray print heads may be provided as stand-alone print heads not embedded in a larger digital printing system and some ink jet heads may be provided as stand-alone print heads not embedded in a larger digital printing system. As another example, some of the articles described herein may be formulated by processes that do not include use of a spray print head, an ink jet head, or digital printing system. The advantages associated with and possible interrelationships between the various digital printing systems, spray print heads, ink jet heads, articles, and methods described herein will be explained in further detail below.

As described above, some embodiments relate to digital printing systems and some embodiments relate to methods comprising one or more steps that may be performed on a digital printing system. A digital printing system may be capable of operating digitally. For instance, it may be capable of producing products based on digital instructions, and/or operate from a digital operating system. In some embodiments, a digital printing system may be a 3D-printing system, such as a system capable of performing a 3D-printing process and/or of forming 3D-printed articles. In some embodiments, the digital printing system is capable of forming 3D features, by use of a 3D-printing head and/or by successive use of a 2D-printing head, as described in further detail below. The digital printing system may comprise a variety of 3D-printing tools, may comprise a variety of 2D-printing tools, and/or may comprise a variety of non-printing tools.

A variety of digital printing system designs and methods of operation may be advantageous. As an example, some digital printing systems described herein are designed to rapidly produce products that are consistent in one or more ways. For instance, a digital printing system may be designed to rapidly produce products having a common set of features. The features may differ from each other very little, or only in ways that would not be recognized without the aid of microscopy or other specialized detection devices.

As a second example, some digital printing systems described herein are capable of producing high quality products with diverse designs rapidly and facilely. For instance, a digital printing system may be capable of being set up to produce a first set of products consistently, and then reset to produce a second set of products consistently that differ from the first set of products in one or more ways. As another example, a digital printing systems may be configured to produce products that are not alike, but which are faithful to their intended designs to a high degree.

As a third example, some digital printing systems described herein may be designed to produce products in an automated manner, and/or in a manner requiring little input from an operator. This may be achieved by, for instance, the use of quality control features that allow the digital printing system to self-adjust during operation to maintain production of uniform products and/or products conforming closely to a selected design without input from an operator.

As a fourth example, some digital printing systems described herein may be designed to produce articles including gradients in one or more features. This may be accomplished, for instance, by employing print heads configured to deposit compositions that change over time. As the deposited compositions change, one or more properties of the article formed by the deposited composition may also change.

In some embodiments, a digital printing system is configured to translate a substrate and/or a plurality of substrates through a plurality of locations therein. Some methods comprise translating a substrate and/or a plurality of substrates through a plurality of locations in a digital printing system. At each location, one or more components of the digital printing system may perform an operation on the portion of the substrate positioned at that location. Then, after being translated through the digital printing system (and/or through all of the locations in the digital printing system at which the same set of processes occur), the substrates or portions of a substrate translated therethrough may include a set of features that are substantially the same (or may be substantially the same).

FIG. 1A shows one non-limiting embodiment of a digital printing system. In FIG. 1A, a digital printing system 2000 comprises a support 2100, a first tool 2200, and a second tool 2300. The support is configured to translate a substrate (not shown) through the digital printing system along a pathway 2400 comprising a first location 2500 and a second location 2600. The first tool may be configured to perform a first operation on the substrate at the first location, and the second tool may be configured to perform a second operation on the substrate at the second location. In some embodiments, like the embodiment shown in FIG. 1A, a digital printing system is configured to translate a substrate therethrough along a pathway including exactly two locations at which tools are configured to perform operations. In other embodiments, a digital printing system is configured to translate a substrate therethrough along a pathway including a different number of locations at which tools are configured to perform operations. Some digital printing systems include one, three, four, five, six, seven, eight, nine, ten, eleven, twelve, thirteen, fourteen, fifteen, or more such locations. It should be understood that the locations may have different sizes and spacings relative to the tools, support, and each other those shown in FIG. 1A. In some embodiments, a digital printing system is configured to translate a substrate therethrough that is not disposed on a support. For instance, a self-supporting substrate may be translated through a digital printing system by one or more tools present in the digital printing system, by one or more other portions of the digital printing system, and/or in another manner.

In some embodiments, a support may be configured to translate a substrate along a pathway that is substantially straight and/or unidirectional (such as, for example, the pathway shown in FIG. 1A). In other embodiments, a support may be configured to translate a substrate along a pathway that differs from the pathway shown in FIG. 1A in one or more ways. For instance, the pathway may be curved (upwards, downwards, to the left, to the right). Some pathways may have a height that varies along the pathway. As an example, a pathway may curve upwards to reach a location positioned beneath a high tool and/or may curve downwards to reach a location positioned beneath a low tool. In some embodiments, the pathway may double back on itself. As an example, the pathway may comprise a first location at which a first tool is configured to perform a first operation, may extend to a second location at which a second tool is configured to perform a second operation, and then may double back to the first location where the first tool is configured to perform a third operation.

Figure 1B:
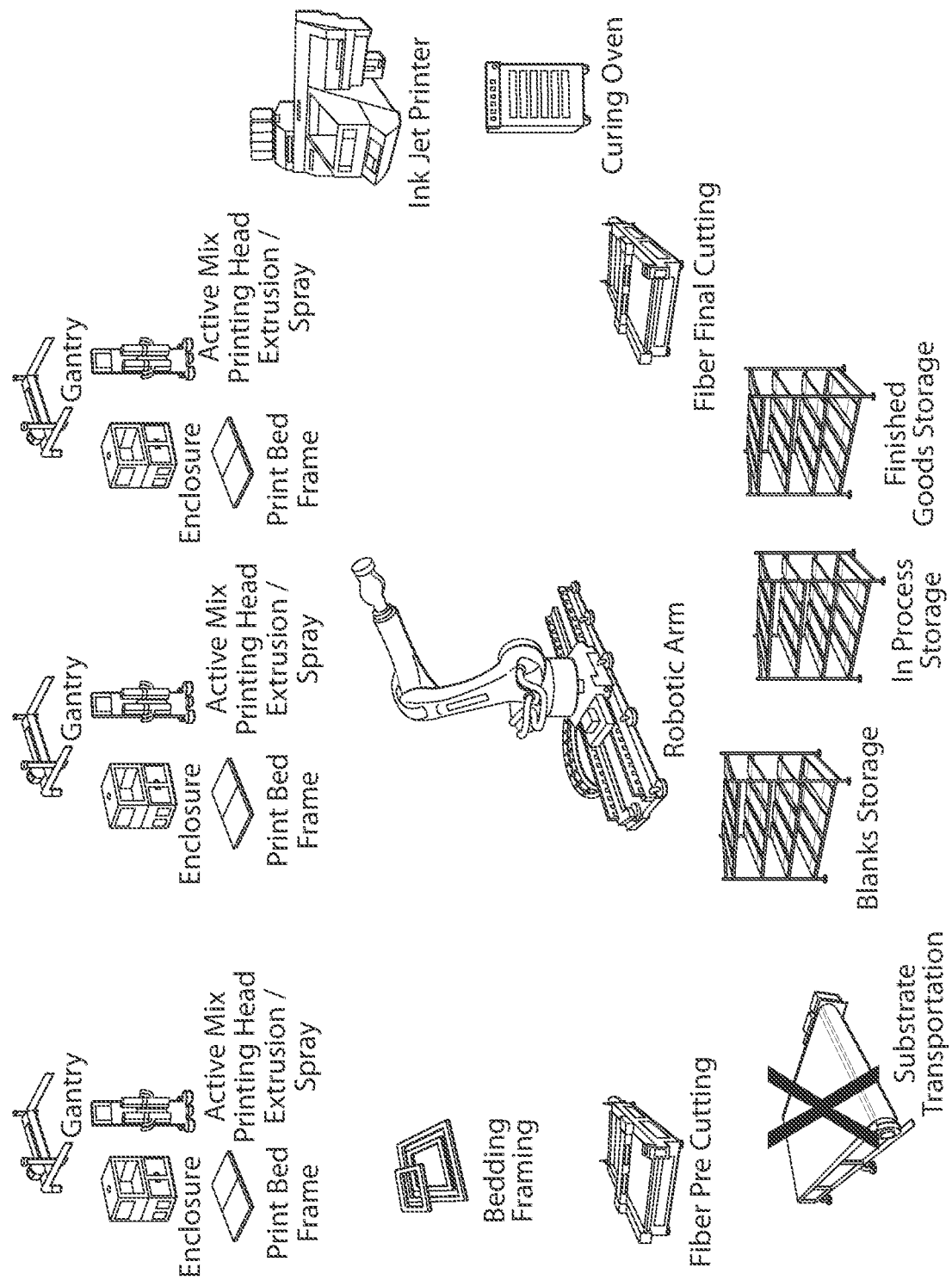

In some embodiments, a digital printing system may be configured to translate a substrate along a variety of different pathways. For instance, the digital printing system may comprise a support that can move in multiple directions (e.g., two directions, three directions, four directions, more directions) and/or multiple directions independently (e.g., two directions, three directions). Digital printing systems with this design may be capable of translating different substrates along different pathways and/or may be capable of robotically translating substrates along pathways (e.g., the digital printing system may receive instructions from software indicating which pathway to translate the substrate along). FIG. 1B shows one example of a digital printing system with this property. FIG. 1B comprises a support that is a robot arm that is configured to translate a substrate among up to eleven different locations in a variety of orders.

It should be understood that substrates may be translated through a digital printing system in a variety of suitable manners. In some embodiments, a substrate is translated through a digital printing system in a manner such that it is in constant motion throughout its passage through the digital printing system and/or throughout its passage from a first location in the pathway at which a tool is configured to perform an operation thereon to a final location in the pathway at which a tool is configured to perform an operation thereon. The digital printing system may initiate a first operation (e.g., a printing operation) when the substrate reaches a first location in the pathway along which it is translated. Then, the digital printing system may continue to perform operations on the substrate until it reaches the end of the pathway along which it is translated and/or exits the digital printing system.

In some embodiments, a substrate is translated through a digital printing system in a manner including one or more stops. In other words, the process of translating the substrate through the system may include one or more period of time at which the substrate is motionless. The stop(s) may be at location(s) at which a tool is configured to perform an operation on the substrate (and/or a portion thereof), or may be at other locations. In some embodiments, a process of translating a substrate through a system may comprise a step at which translation of the substrate in one direction is stopped (e.g., a direction laterally through the digital printing system) and translation of the substrate in another direction is started (e.g., a direction that brings the substrate upwards or downwards towards a tool positioned in the digital printing system).

A digital printing system may be configured to translate a substrate therethrough at a variety of suitable speeds. This may be accomplished by the use of a support. In some embodiments, the average speed of the substrate through the digital printing system and/or the speed of the substrate through the digital printing system at one or more points in time is greater than or equal to 0.01 ft/30 seconds, greater than or equal to 0.02 ft/30 seconds, greater than or equal to 0.05 ft/30 seconds, greater than or equal to 0.1 ft/30 seconds, greater than or equal to 0.2 ft/30 seconds, or greater than or equal to 0.5 ft/30 seconds. In some embodiments, the average speed of the substrate through the digital printing system and/or the speed of the substrate through the digital printing system at one or more points in time is less than or equal to 1 ft/30 seconds, less than or equal to 0.5 ft/30 seconds, less than or equal to 0.2 ft/30 seconds, less than or equal to 0.1 ft/30 seconds, less than or equal to 0.05 ft/30 seconds, or less than or equal to 0.02 ft/30 seconds. Combinations of the above-referenced ranges are also possible (e.g., greater than or equal to 0.01 ft/30 seconds and less than or equal to 1 ft/30 seconds). Other ranges are also possible.

It should also be understood that components other than substrates and supports on which substrates are positioned may be translated through the digital printing systems described herein. For instance, some tools may be configured to be translated through the digital printing systems. Generally, tools may be configured to translate freely and/or in a variety of directions (e.g., along one, two, three, or more axes) and/or may be configured to rotate around a variety of axes (e.g., around one, two, three, or more axes). However, some tools may have a restricted range of motion (e.g., by being configured to translate along fewer than three or two axes and/or by being configured to rotate around fewer than three or two axes), or may be incapable of motion. Some tools may be capable of translating, but may remain motionless during some methods. Tools configured to be translated may be configured to translate around a substrate or a portion of a substrate when it is positioned at a location. If the substrate is motionless at the location, the tool(s) may be configured to translate around the substrate or portion of a substrate positioned at the location. If the substrate is translated through the location, the tool(s) may be configured to translate with the substrate.

In some embodiments, like the embodiment shown in FIG. 1A, a digital printing system includes a number of tools configured to perform operations equal to the number of locations at which operations on the substrate are performed. In other embodiments, a digital printing system includes more tools than the number of locations at which operations on the substrate are performed or fewer tools than the number of locations at which operations on the substrate are performed. Each tool may be configured to perform an operation at a single location, or one or more tools may be configured to perform operations at multiple locations. Each location may be configured such that a single tool performs an operation there, or one or more locations may be configured such that no tools perform an operation there or two or more tools perform an operation there. When two or more tools are configured to perform operations at a single location, the tools and/or operations may be the same (e.g., two print heads may be configured to deposit a material onto the substrate in a single location) and/or the tools and/or operations may be different (e.g., a spray print head may be configured to spray a material onto a substrate in the location, and an ink jet head may be configured to ink jet an ink jet ink onto the substrate in the location). The operations may be performed sequentially or simultaneously.

Digital printing systems typically, but not always, include at least one 3D-printing tool, such as a 3D-print head or a tool configured to form a 3D-printed structure. Digital printing systems may include exclusively 3D-printing tools, may include one or more non-3D-printing tools, or may include no 3D-printing tools. Similarly, digital printing systems may be configured to exclusively perform 3D-printing processes (e.g., processes that result in the formation of a 3D-printed structure), may be configured to perform one or more processes other than 3D-printing processes, or may be configured to exclusively perform processes other than 3D-printing processes. Examples of suitable tools and the processes that they may perform are described in further detail below.

As described above, some digital printing systems are configured to translate a substrate and/or a plurality of substrates through the digital printing system. Some digital printing systems are configured for use with substrates for which multiple portions be translated through the digital printing system along a pathway sequentially. These substrates may extend for an appreciable distance in one direction, and may extend for shorter distances in other directions. For instance, some substrates may be bolts of fabric that extend for an appreciable distance in one direction. The digital printing system may be configured such that multiple portions of the substrate positioned along the long direction of the substrate may sequentially be translated through the digital printing system along the pathway. In other words, as the substrate is translated along the pathway, different portions thereof may pass through the same set of locations along the pathway. In some embodiments, a digital minting system may be configured to be used in combination with roll-to-roll processing. Portions of the substrate may be rolled around a first roll, unrolled, translated through the digital printing system, and then rolled around a second roll. Each portion of the substrate undergoing this process may translate through the digital printing system sequentially along the same pathway.

Similarly, two different portions of a single substrate may be positioned in two different locations at which two different tools are configured to perform two different operations on the two different portions of the substrate simultaneously. The two different locations may be positioned such that one location is to the rear of the other (e.g., in the case where a single portion of a substrate would be translated from the location in the rear to the location in the front as the substrate is translated through the digital printing system), may be positioned at the same relative position as each other (e.g., in the case where the two portions may be connected by a line perpendicular to the pathway along which the substrate is translated through the digital printing system), and/or may be positioned in a variety of other manners. When the locations are positioned at the same relative position as each other, it may be beneficial for the same tools to perform the same operations on the different portions of the substrate at the two different locations. The tools may be spaced from each other at a variety of appropriate distances (e.g., approximately 20 inches).

Some digital printing systems are configured for use with substrates with a more limited spatial extent. These digital printing systems may be configured so that a single substrate is translated through the digital printing system as a whole. For instance, a single upper may be translated through a digital printing system along a pathway.

Some digital printing systems may be configured for use with, or capable of being configured for use with, both substrates for which multiple portions be translated through the digital printing system along a pathway sequentially and substrates for which the entirety of the substrate translates through the digital printing system as a whole. A digital printing system may be switched between being configured for the former use and the latter by adjusting a support configured to translate the substrate through the digital printing system and/or changing one or more components of the digital printing system configured to handle the substrate and/or prepare it for translation through the digital printing system.

It should also be understood that some digital printing systems may be configured for use with flat substrates, some digital printing systems may be configured for use with non-flat substrates (e.g., substrates having curvature, substrates including protrusions), and some digital printing systems may be configured for use with both flat substrates and non-flat substrates. Further examples of suitable substrates are described in more detail below.

Substrates may be translated through the digital printing systems described herein by a wide variety of suitable supports. The support may translate a substrate as a whole through the digital printing system, and/or may translate one or more portions of a substrate through the digital printing system. In some embodiments, a support may be configured to translate some portions of a substrate through the digital printing system, while not translating other portions of the substrate therethrough (e.g., in the case of a support configured to translate a substrate through the digital printing system in a roll-to-roll process, in which some portions of the roll are already wound on the receiving roll and/or in which some portions of the roll are not unwound). Non-limiting examples of possible supports include a conveyor belt, one or more articles configured to roll and/or unroll a substrate to be translated through the digital printing system e.g., rollers, unrollers), a tensioner, a robot arm, a jig, and a tray (e.g., a tray positioned on a conveyor belt, a tray positioned on a robot arm). In some embodiments, a support comprises one or more lasts (e.g., a support may comprise a conveyor belt and one or more lasts disposed thereon, a support may comprise a jig and/or fixture and one or more lasts disposed thereon). Robot arms that may be employed as supports may comprise one or more grippers configured to pick up and put down the substrate (e.g., onto a conveyor belt, onto a tray). In some embodiments, two or more supports may be used together to translate a substrate through a digital printing system. In some embodiments, a support may be a non-stick support.

A wide variety of suitable tools and combinations of tools may be employed to perform a wide variety of suitable operations on substrates or portions of a substrate. Non-limiting examples of such tools include print heads, sources of heat, sources of light, cutting tools (e.g., laser cutters, mechanical cutting tools), and sensors (e.g., cameras). Each of these tools will be described in further detail below.

In some embodiments, a digital printing system includes one or more print heads. There are a number of possible print head designs that may be employed. For instance, in some embodiments, a digital printing system includes one or more print heads configured to deposit a polymer. Depositing the polymer may comprise extruding a composition from the nozzle, such as a polymeric composition and/or a composition comprising one or more prepolymers that may cure to form a polymer (i.e., a curable composition). Extrusion may be accomplished, for example, by use of a print head described in U.S. patent application Ser. No. 15/907,128, entitled "3D Printing Methods Using Mixing Nozzles", and incorporated herein by reference for all purposes and/or by use of one or more print heads described elsewhere herein (e.g., with reference to a multi-axis deposition system). Some print heads may include multiple inlets (e.g., two, three, four, or more inlets) to receive multiple fluids to be extruded, and some print heads may include exactly one inlet to receive exactly one fluid to be extruded. The inlets may supply the print head with the fluids by use of pumps, such as rotary positive displacement pumps. Some print heads may comprise valves associated with input ports through which fluids are received into a chamber therein. The valves may be configured to allow for a chamber-cleaning purse material to pass into the input port, and then into the chamber. The print heads may include a mixing chamber to mix together the multiple fluids to be extruded such that a mixed fluid comprising the multiple fluids input into the print head is extruded from the print head, or may lack a mixing chamber. Mixture of the fluids may be accomplished by use of a rotating mixing paddle. Some print heads may also comprise further features. For instance, some print heads may be robotic (e.g., may translate and/or rotate based on instructions from software) and/or may be disposed on a robotic gantry (e.g., may be disposed on a gantry comprising one or more components that may translate and/or rotate based on instructions from software).

In some embodiments, in which a digital printing system comprises multiple print heads, a subset or all of the print heads therein may be fed by a single material distribution center. In other embodiments, each print head may be fed by a separate feed. Similarly, a subset or all of the print heads may be controlled by a single controller, or each print head may be controlled by a separate controller.

In some embodiments, a digital printing system includes one or more spray print heads. The digital printing system may comprise a spray tool comprising one or more spray print heads (e.g., two or more spray print heads). Spray print heads are generally configured to deposit a polymer by spraying a polymeric composition and/or a curable composition. Some spray print heads include one or more features of other print heads (e.g., such as mixing chambers) while also including one or more features configured to cause the composition emerging from the spray print head to be in the form of a spray. Spray print heads typically include at least a chamber configured to receive a fluid (e.g., a fluid to be sprayed, a fluid to form a component of a fluid to be sprayed) and a sheath and/or a port configured to direct a gas flow to an outlet of the chamber (e.g., a gas flow configured to atomize fluid output from the chamber to form a spray).

Figure 2A:
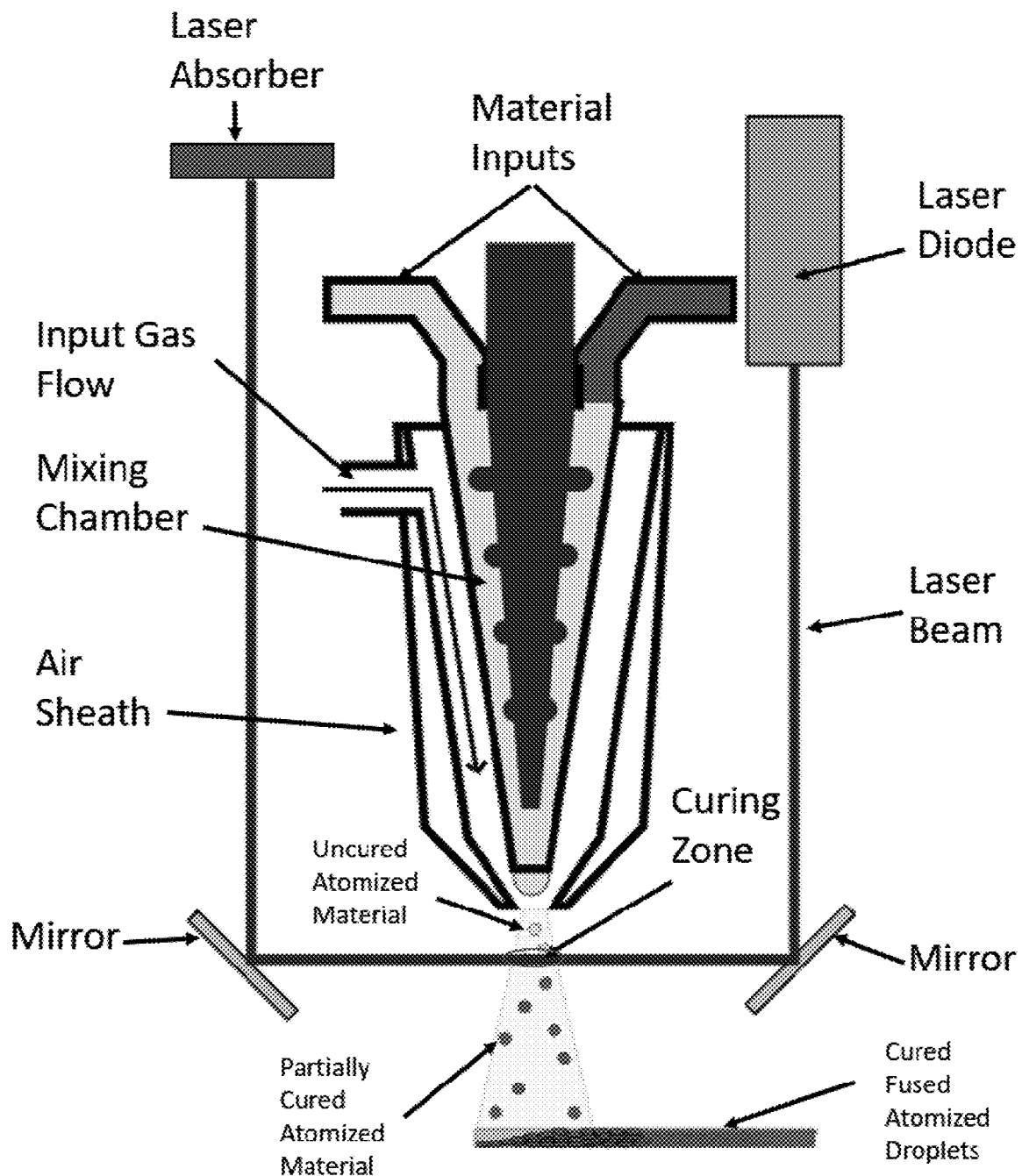
FIGS. 2A-2B are schematic depictions of spray print heads, according to certain embodiments.

FIG. 2A shows one non-limiting embodiment of a spray print head. The spray print head shown in FIG. 2A includes a chamber configured to receive a fluid that is a mixing chamber, two inlets to the mixing chamber configured to provide two or more fluids to be mixed in the mixing chamber, an air sheath configured to direct an air flow to an outlet of the chamber (i.e., air is the gas is configured to atomize material being output from the spray print head shown in FIG. 2A), and also several components associated with an irradiation assembly configured to direct light to a location spaced from the outlet of the chamber. This location is in the flow path of the material output from the chamber. Compositions output from the chamber and atomized by the sheath may pass through the location to which the laser light is directed and be cured by the laser light.

In some embodiments, a spray print head comprises a port configured to direct a gas flow to an outlet of a chamber configured to receive a fluid therein instead of or in addition to the sheath described above. When the spray print head comprises both the port and the sheath, the port may be positioned upstream of the sheath and direct the port may allow the fluid to be input to the sheath. One example of a port with this design is shown in FIG. 2A, and is labeled therein as "Input Gas Flow". When the spray print head lacks the sheath but comprises the port, the port may be positioned close to an outlet of the chamber. The port may direct the gas directly thereto.

The irradiation assembly shown in FIG. 2A is a laser light assembly. In other words, the irradiation comprises a laser and produces laser light. The laser light assembly may include a laser diode, which outputs the laser light. In some embodiments, the laser light assembly includes reflectors, such as mirrors, configured to direct the laser light to a location spaced from the outlet of the chamber and to a laser absorber. The laser absorber may absorb the laser light, enhancing the safety of the laser light assembly. In some embodiments, the reflectors are configured to be translated. Translation of the reflectors may change the distance between the location the laser light is directed to and the outlet of the chamber. In some embodiments, a light assembly may include a type of light other than laser light. However, laser light may be especially beneficial for certain reasons, which will be described in further detail below.

Figure 2B:
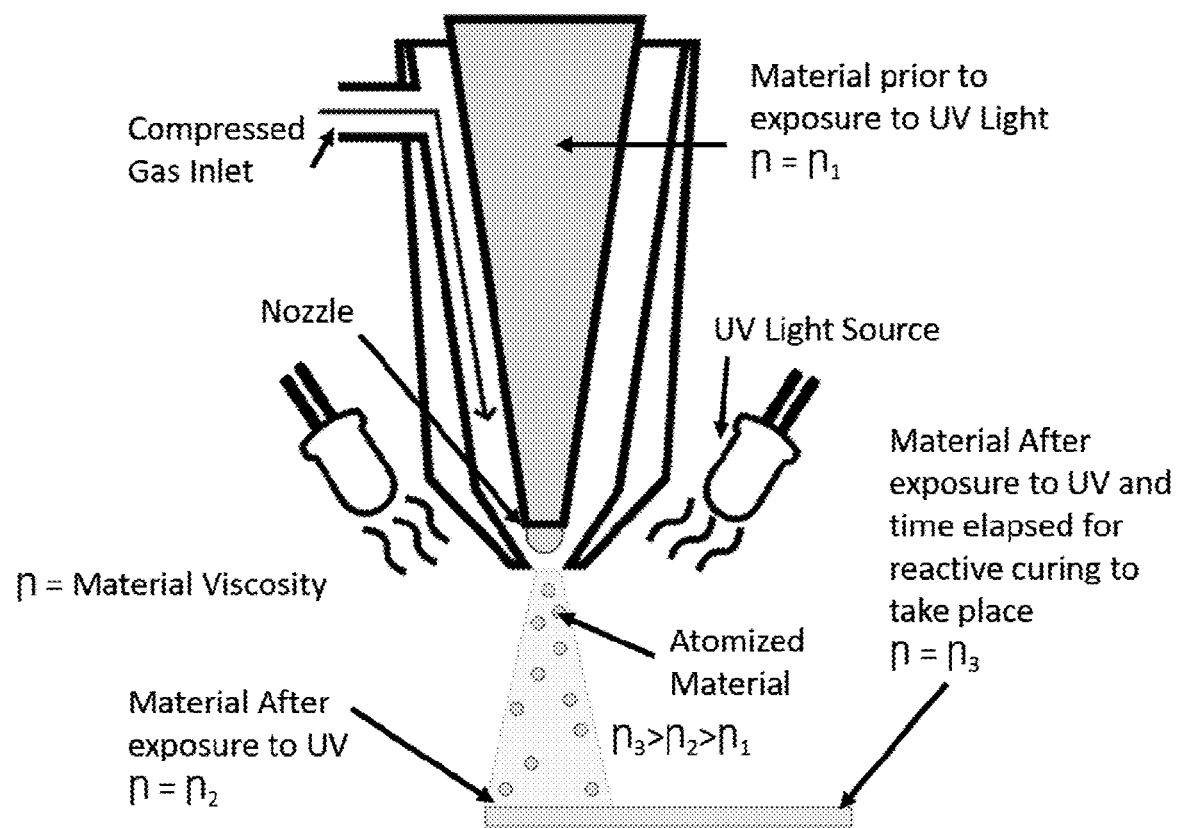
Figure 2C:
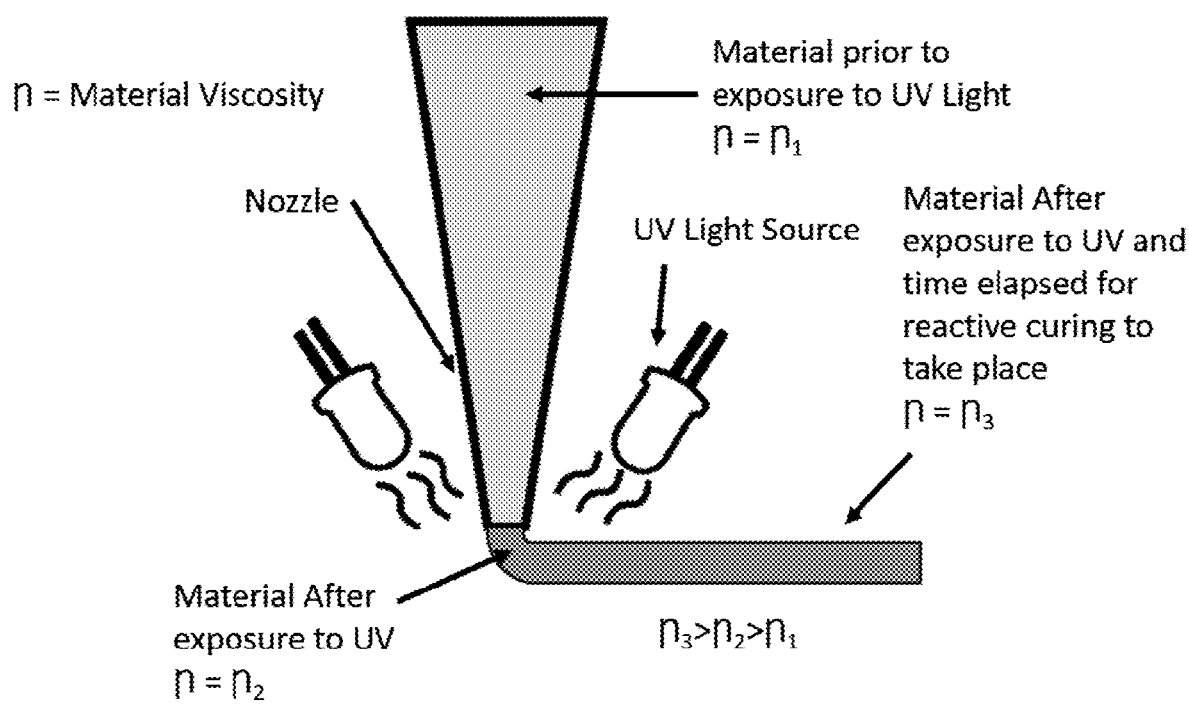
FIG. 2C is a schematic depiction of a print head, according to certain embodiments.

FIG. 2B shows an alternative designs for a spray print in which an LED light assembly is used instead of a laser light assembly. In FIG. 2B, the LED light assembly comprises an LED and produces LED light. In some embodiments, a print head that is not a spray print head may include a light source (e.g., a UV light source, a laser light assembly, a LED light assembly). For instance, as shown in FIG. 2C, a print head configured to extrude a composition from a nozzle may comprise a light source.

In some embodiments, a digital printing system comprises one or more ink jet heads. In some embodiments, a digital printing system comprises an ink jet tool that comprises one or more ink jet heads two or more ink jet heads). The ink jet head(s) may be configured to expel droplets of ink jet inks towards a substrate onto which they are deposited. The droplets may, in some embodiments, be deposited on demand. Non-limiting examples of suitable ink jet heads include piezoelectric ink jet heads (e.g., those manufactured by Xaar, Ricoh, Epson, Kyocera, and Dimatix), thermal ink jet heads (e.g., those manufactured by HP), valve jetting ink jet heads (e.g., those manufactured by Vermes and Nordson), and inertial transfer ink jet heads (e.g., those manufactured by TTP Vista Print). The ink jet heads may be configured to deposit ink jet inks, such as pigmented ink jet inks, clear ink jet inks, and/or translucent ink jet inks, by an ink jet process. In some embodiments, the ink jet heads are configured to deposit CYMK inks. The ink jet head may comprise a piezoelectric system (e.g., to control the ink jet process). Some ink jet heads include one or more components configured to cure ink jet inks ink jetted by the ink jet head, such as an irradiation assembly (e.g., a laser light assembly) described elsewhere herein with respect to spray print heads.

In some embodiments, a digital printing system comprises one or more tools configured to cure one or more compositions deposited by a print head. The tool(s) configured to cure the one or more compositions deposited by the print head may be employed to cure the composition(s) after deposition thereof on the substrate. The compositions may be curable compositions, may comprise one or more prepolymers, and/or may comprise one or more polymers. In some embodiments, the composition(s) is (are) at least partially cured prior to further curing with the tool. The tool(s) may be employed to further cure the composition(s), such as to completion. A tool configured to cure one or more compositions deposited by a print head may be configured to cure the composition by heating and/or by irradiation. In other words, the tool may be a source of heat and/or a source of light. It should be understood that tools configured to cure a composition may be configured to do so by application of heat without light, by application of light without heat, and/or by application of both heat and light together. Heat may be provided in a variety of suitable ways, such as by an oven (e.g., by a tunnel oven), by conduction, by convection, and/or by radiation. Light may be provided in a variety of suitable ways, such as by use of LEDs and/or lasers, and at a variety of suitable wavelengths, such as those in the UV spectrum.

When the digital printing system comprises a source of heat, the source of heat may be configured to provide heat a variety of suitable temperatures and/or to heat a substrate passing through a digital printing system to a variety of suitable temperatures. In some embodiments, the source of heat is configured to provide heat and/or heat a substrate to a temperature of greater than or equal to 40° C., greater than or equal to 50° C., greater than or equal to 60° C., greater than or equal to 70° C., greater than or equal to 80° C., greater than or equal to 90° C., greater than or equal to 100° C., greater than or equal to 110° C., or greater than or equal to 120° C. In some embodiments, the source of heat is configured to provide heat and/or heat a substrate to a temperature of less than or equal to 130° C., less than or equal to 120° C., less than or equal to 110° C., less than or equal to 100° C., less than or equal to 90° C., less than or equal to 80° C., less than or equal to 70° C., less than or equal to 60° C., or less than or equal to 50° C. Combinations of the above-referenced ranges are also possible (e.g., greater than or equal to 40° C. and less than or equal to 130° C.). Other ranges are also possible.

In some embodiments, a digital printing system comprises one or more tools configured to remove one or more portions of a substrate and/or one or more portions of a material deposited thereon (e.g., a polymer, a curable composition, an ink jet ink). The tool may be configured to engrave the substrate or material deposited thereon, may be configured to modify the surface texture of the substrate or material deposited thereon, and/or may be configured to cut the substrate or material deposited thereon. In some embodiments, the tool may be configured to cut the substrate and/or material(s) deposited thereon such that one or more regions of the substrate and/or material(s) deposited thereon detach from the substrate. The features detaching from the substrate may be features that are desirable to recover (e.g., a finished product), or may be features that are desirable to remove (e.g., features designed to be removed from a finished product). The tool configured to cut, modify the surface texture of, and/or engrave the substrate may be a CNC cutting device, such as a laser, an end mill, a rolling blade, and the like.

In some embodiments, a tool is a knitting machine.

In some embodiments, a digital printing system comprises one or more tools that are sensors. The sensors may be configured to sense one or more properties of a substrate, portion of a substrate, and/or composition deposited thereon. In some embodiments, the sensor may work in conjunction with one or more tools configured to alter the substrate in some way (e.g., by depositing one or more materials thereon, by removing one or more portions therefrom). For instance, a digital printing system may comprise a print head configured to deposit a material onto the substrate in a pattern that a sensor is configured to sense. As another example, a digital printing system may comprise an ink jet head configured to ink jet an ink jet ink onto the substrate in a pattern that the sensor is configured to sense. The pattern may be a pattern that appears to blend in with the overall design of the substrate and/or material deposited or ink jetted thereon to the unaided eye, and/or may be a pattern that has a size sufficiently small to be difficult to see by the unaided eye. The sensor may sense one or more features of the pattern to detect alignment of different components of the digital printing system (e.g., in the plane of the substrate, perpendicular to the substrate), the quality of the products being produced by the digital printing system, and/or the speed at which the substrate is being translated through the digital printing system. Some sensors may be optical sensors (e.g., cameras, vision systems, laser distance sensors). Some sensors may sense topographic properties and/or mechanical properties. For instance, some sensors may be stylus profilometers.

In some embodiments, a sensor is configured to sense an identifier associated with the substrate, such as a QR code or a manufacturing code. The identifier may be deposited by one or more tools associated with the digital printing system, or may be present on the substrate prior to passage through the digital printing system.

The various tools described herein, or a subset thereof, and/or the support on which the substrate is positioned may be in electronic communication with a central computing device. The central computing device may be configured to control operation of the tools and/or the substrate. In some embodiments, the central computing device may be configured to adjust the operation of the tools and/or the support based on information received from the sensors and/or based on a preloaded computer program.

As described above, a substrate may be translated along a path that includes a plurality of locations at which one or more tools, such as those described above and elsewhere herein, are employed to perform a plurality of operations on substrates or portions of a substrate. By way of example, a substrate or a portion of a substrate may be translated along a pathway comprising a first location at which a print head is configured to deposit a curable composition thereon and a second location at which a source of light and/or heat is configured to cure the curable composition. As another example, a substrate or a portion of a substrate may be translated along a pathway comprising a first location at which a print head is configured to deposit a composition thereon and a second location at which an ink jet tool is configured to ink jet an ink jet ink thereon. Some pathways may comprise further locations and/or further tools (and/or may omit a location at which a print head is configured to deposit a composition onto a substrate, a location at which an ink jet tool is configured to ink jet an ink jet ink thereon, and/or a location at which a source of light and/or heat is configured to cure a curable composition).

Figure 3A:
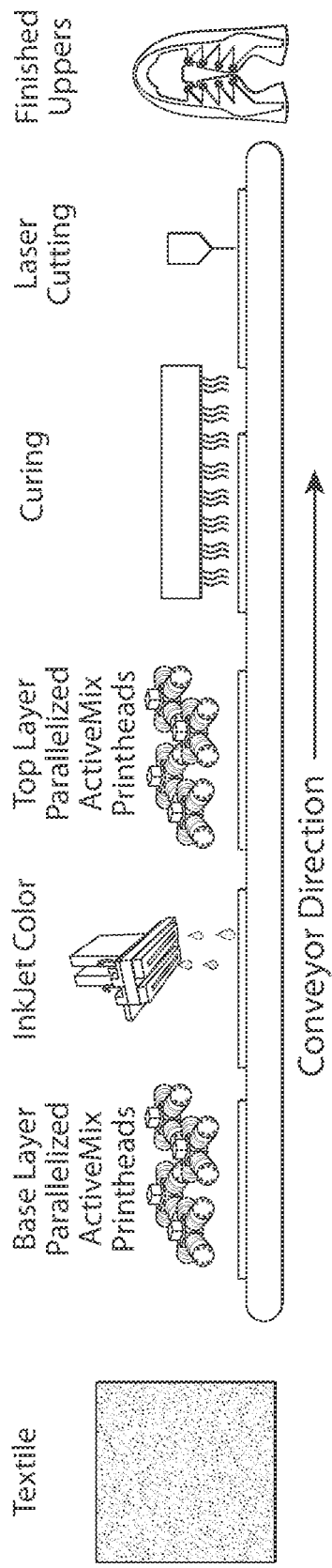
FIGS. 3A-3B are schematic depictions of digital printing systems, according to certain embodiments.

FIG. 3A shows another possible pathway comprising locations at which various tools are configured to perform various operations. In FIG. 3A, the digital printing system comprises five tools configured to perform five operations on a substrate passing therethrough at five different locations. These tools include two spray tools comprising multiple spray print heads, one ink jet tool comprising multiple ink jet heads, one source of heat, and one laser cutter. The portions of the substrate translated in FIG. 3A first pass through a first location at which a first spray tool is configured to deposit a first curable composition thereon, then through a second location at which an ink jet tool is configured to ink jet an ink jet ink onto one or more regions of the first composition and/or onto one or more regions of the substrate uncovered by the curable composition. Next, the portions of the substrate pass through a third location at which a second spray tool is configured to deposit a second curable composition (which may be identical to the first curable composition or may differ from the first curable composition in one or more ways) onto one or more regions of the ink jet ink, one or more regions of the first curable composition, and/or one or more regions of the substrate uncovered by either the ink jet ink or the first curable composition. After this step, the portions of the substrate pass through a fourth location at which a source of heat and/or light is configured to cure the curable composition. Finally, the portions of the substrate pass through a fifth location at which a laser cutter is configured to cut out one or more regions of the portion of the substrate, one or more regions of the ink jet ink jetted thereon, and/or one or more regions of the cured first and/or second curable compositions deposited thereon.

Figure 3B:
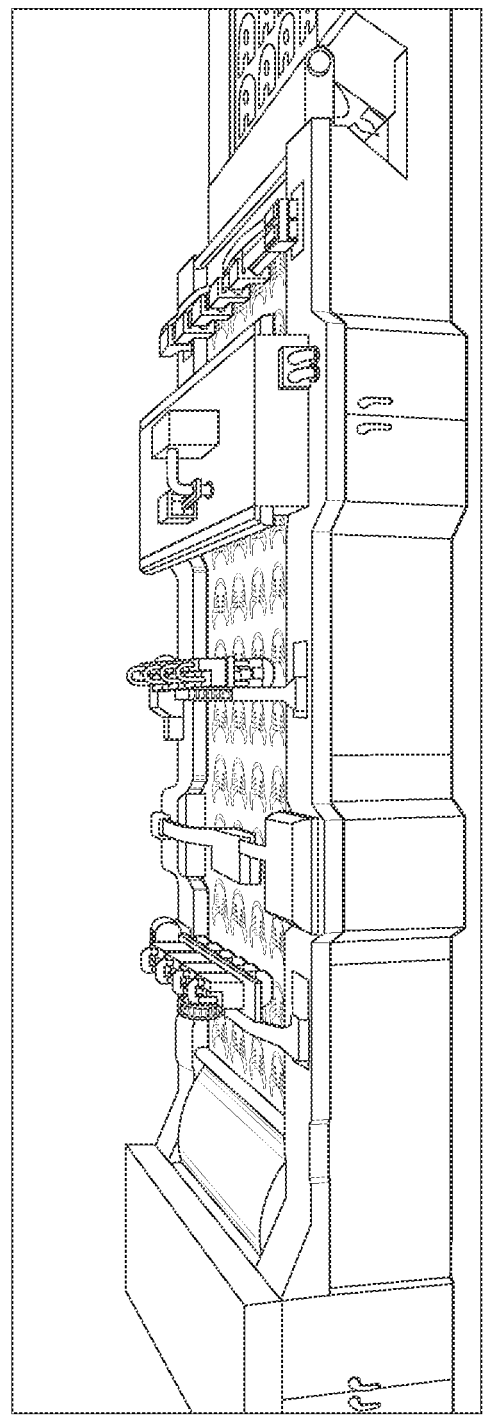

FIG. 3B shows a schematic depiction of a digital printing system comprising seven locations at which various tools are configured to perform various operations. The tools include one tool configured to unroll fabric, two printing tools which each comprise one or more print heads (e.g., one or more spray print heads, one or more print heads configured to extrude a polymer onto a substrate, one or more print heads comprising mixing chambers), one ink jet tool comprising multiple ink jet heads, one source of heat (e.g., a tunnel furnace), one laser cutter, and one conveyor belt configured to translate a composite article fabricated with the use of the digital printing system away from the digital printing system. A portion of a substrate being translated through the digital printing system shown in FIG. 3B may first be unrolled at a first location comprising the tool configured to unroll fabric. Then, it may pass through a second location at which one of the printing tools is configured to deposit a curable composition thereon. Next, it may pass through a third location at which the ink jet tool is configured to ink jet an ink jet ink thereon. After these steps, it may pass through a fourth location at which the second of the printing tools is configured to deposit a curable composition thereon. Then, the portion of the substrate may pass through the source of heat at the fifth location and the curable compositions deposited thereon may be cured. Finally, the portion of the substrate may pass through the sixth location, at which the laser cutter is configured to cut the substrate, and onto the conveyor belt at the seventh location.

FIG. 1B shows another example of a digital printing system comprising a variety of locations. The locations in FIG. 1B include three locations associated with mixing print heads configured to extrude and/or spray materials (e.g., curable compositions) onto the substrate, one location associated with an ink jet printer configured to ink jet materials (e.g., ink jet inks, pigments) onto the substrate, one location associated with a curing oven configured to cure any curable composition disposed on the substrate, one location associated with a final fiber cutting tool configured to cut one or more fibers of the substrate, one location associated with a fiber precutting tool configured to cut one or more fibers of the substrate, three locations associated with storage (one location associated with storage for blanks, one location associated with storage for substrates undergoing a printing process, and one location associated with storage for finished composite articles), and one associated with a bedding framing tool configured to frame a substrate. The substrate may be translated through all or a subset of these locations in any desired order. In one exemplary embodiment, a substrate is removed from the location associated with storage for blanks, translated to one of the three locations associated with mixing print heads (at which one or more materials, such as one or more curable compositions, are deposited thereon), translated to the location associated with a curing oven (at which a curable composition deposited thereon may be cured), translated to the location associated with the ink jet printer (at which an ink jet ink may be ink jetted thereon), and then translated to the location associated with storage for finished composite articles. However, other methods of translating a substrate through the digital printing system shown in FIG. 1B are also possible (e.g., a substrate may be translated from a location associated with mixing print heads to the location associated with the curing oven and then back to a location associated with mixing print heads multiple times to build up a 3D-printed structure).

Other possible arrangements of locations at which various tools are configured to perform various operations on a substrate are also possible. One example is an arrangement of sequential locations comprising: a first location at which a spray tool comprising a spray print head comprising a mixing nozzle is configured to spray a polymer onto the substrate, a second location at which an ink jet tool is configured to ink jet an ink jet ink onto the substrate, a third location at which a spray tool comprising a spray print head comprising a mixing nozzle is configured to spray a polymer onto the substrate, a fourth location at which an ink jet tool is configured to ink jet an ink jet ink onto the substrate, a fifth location at which a tunnel oven is configured to cure one or more materials previously deposited on the substrate, and a sixth location at which a laser cutter is configured to cut, etch, and/or engrave the substrate. This example, and the others described herein, should be understood to possibly include steps at which the substrate is handled prior to and/or after translating through the digital printing system. For example, a substrate may pass through one or more fabric handling devices (e.g., rollers, tensioners) prior to passing through the first location and/or may pass through one or more fabric handling devices after passing through the final location.

Another example is an arrangement of sequential locations comprising: a first location at which a print head comprising a mixing nozzle is configured to extrude a polymer onto the substrate, a second location at which an ink jet tool is configured to ink jet an ink jet ink onto the substrate, a third location at which a spray tool comprising a spray print head comprising a mixing nozzle is configured to spray a polymer onto the substrate, a fourth location at which an ink jet tool is configured to ink jet an ink jet ink onto the substrate, a fifth location at which a tunnel oven is configured to cure one or more materials previously deposited on the substrate, and a sixth location at which a laser cutter is configured to cut, modify the surface texture of, and/or engrave the substrate.

A third example is an arrangement of sequential locations comprising: a first location at which a sensor is configured to sense one or more properties of the substrate, a second location at which a spray tool comprising a spray print head comprising a mixing nozzle is configured to spray a polymer onto the substrate, a third location at which a sensor is configured to sense one or more properties of the substrate, a fourth location at which an ink jet tool is configured to ink jet an ink jet ink onto the substrate, a fifth location at which a sensor is configured to sense one or more properties of the substrate, a sixth location at which a spray print head comprising a mixing nozzle is configured to spray a polymer onto the substrate, a seventh location at which a sensor is configured to sense one or more properties of the substrate, an eighth location at which an ink jet tool is configured to ink jet an ink jet ink onto the substrate, a ninth location at which a sensor is configured to sense one or more properties of the substrate, a tenth location at which a tunnel oven is configured to cure one or more materials previously deposited on the substrate, and an eleventh location at which a laser cutter is configured to cut, modify the surface texture of, and/or engrave the substrate. In this example, the sensors may be employed to detect alignment between each printing step. If misalignment is detected, the digital printing system may compensate for the misalignment by realigning the substrate and/or realigning one or more tools.

A fourth example is an arrangement of sequential locations comprising: a first location at which a print head comprising a mixing nozzle is configured to extrude a polymer onto the substrate, a second location at which a tunnel oven is configured to cure one or more materials previously deposited on the substrate, and a third location at which a laser cutter is configured to cut, modify the surface texture of, and/or engrave the substrate.

A fifth example is an arrangement of sequential locations comprising: a first location at which a print head comprising a mixing nozzle is configured to extrude a polymer onto the substrate, a second location at which an ink jet tool is configured to ink jet an ink jet ink onto the substrate, and a third location at which a tunnel oven is configured to cure one or more materials previously deposited on the substrate.

A sixth example is an arrangement of sequential locations comprising: a first location at which a print head lacking a mixing nozzle is configured to extrude a polymer onto the substrate, a second location at which a spray tool comprising a spray print head comprising a mixing nozzle is configured to spray a polymer onto the substrate, a third location at which an ink jet tool is configured to ink jet an ink jet ink onto the substrate, a fourth location at which a spray tool comprising a spray print head comprising a mixing nozzle is configured to spray a polymer onto the substrate, a fifth location at which an ink jet tool is configured to ink jet an ink jet ink onto the substrate, a sixth location at which a tunnel oven is configured to cure one or more materials previously deposited on the substrate, and a seventh location at which a laser cutter is configured to cut, modify the surface texture of, and/or engrave the substrate.

As described above, some embodiments, relate to systems comprising spray print heads, tools comprising spray print heads, and/or to methods that may be performed by employing spray print heads. The spray print head design has been generally described above. Further specifics are provided below.

A spray print head may comprise a chamber configured to receive a fluid and to output a curable composition comprising the fluid. The fluid input may be a curable composition (e.g., a one part resin, a curable composition identical to the curable composition output by the spray print head) and/or may be configured to form a curable composition upon mixing with another fluid. In some such embodiments, the spray print head may be configured to receive at least two fluid inputs (e.g., three fluid inputs, four fluid inputs, five fluid inputs, more fluid inputs). The second fluid input may be configured to react with the first fluid, or may not be configured to react with the first fluid. Non-limiting examples of curable compositions (for use in spray print heads and other types of print heads described herein) include compositions configured to be cured to form polyurethanes (e.g., compositions comprising isocyanate groups and alcohol groups), compositions configured to be cured to form polyureas (e.g., compositions comprising isocyanate groups and amine groups), and compositions configured to cured to form polyurethane-polyurea blends (e.g., compositions comprising isocyanate groups, alcohol groups, and amine groups). In some embodiments, the curable composition may be an acrylate-based and/or methacrylate-based composition (e.g., it may comprise acrylate groups that are curable and/or methacrylate groups that are curable). The curable compositions may be one component (e.g., comprising one component that reacts with itself to cure the curable composition), two component (e.g., comprising two components that react with each other to cure the curable composition), or multicomponent (e.g., comprising two or more components that react with each other to cure the curable composition). Non-limiting examples of curable compositions are described in further detail in U.S. Provisional Patent Application No. 62/639,250, entitled "Methods for the Printing of Materials Using Hybrid Ink Formulations", incorporated herein in its entirety for all purposes.

Some spray print heads may be configured to deposit compositions suitable for incorporation into a final product onto the substrate. Some spray print heads may be configured to deposit compositions designed to release the substrate or a material deposited thereon from another material. The release composition may be a PTFE spray, a silicone spray, a dry powder lubricant, a matting agent, and/or spray paint. In some embodiments, a release composition may be deposited selectively on some portions of the substrate and not on others. Further compositions deposited on the release composition may be facilely removed from the final product by use of the release composition while further compositions not deposited on the release composition may be incorporated into the final product.

When a chamber of a spray print head is configured to receive more than one fluid, it may be configured to mix the fluids therein. Mixture may be accomplished by use of a mixing chamber, such as the mixing chambers described elsewhere herein (e.g., with references to print heads configured to extrude polymers). The fluids being mixed may include curable compositions, two or more fluids that together form a curable composition, and/or one or more fluids that does not include any curable component (e.g., a fluid made up exclusively of non-curable components, a fluid comprising one or more solvents and/or thermoplastic polymers). The fluid output from the chamber may be a mixture of the different fluids input, and may itself be a curable composition, may not be a curable composition (i.e., may be a non-curable composition), and/or may be a composition curable by a process other than light. In some embodiments, a fluid output comprises one or more components curable by light and one or more components curable by heat. The curable composition may cure upon mixing and/or comprise one or more curable components that cure upon mixing (e.g., without the addition of light, heat, or any other energy input from the environment). Some curable components and compositions may be curable by one technique but not another. For instance, a curable component and/or composition may be curable by light but not heat, heat but not light, or only by certain wavelengths of light. In some embodiments, a composition comprises a non-UV-curable component. The non-UV-curable component may be curable by a curing agent other than UV light.

It should also be understood that some print heads other than spray print heads may be employed to cure curable compositions, such as the print head shown in FIG. 2C. It should al so be understood that some methods of curing curable compositions prior to deposition on a substrate may comprise the use of print heads other than spray print heads. While the discussion herein describes features of spray print heads, it should be understood that the relevant information may also apply to other types of print heads and/or curable compositions deposited by other types of print heads.

When a fluid comprises more than one type of curable component (e.g., a curable component that is curable by light and a curable component that is curable by heat), the curable components may be present in a variety of suitable relative amounts. Each curable component may independently make up greater than or equal to 0 vol %, greater than or equal to 1 vol %, greater than or equal to 2 vol %, greater than or equal to 5 vol %, greater than or equal to 10 vol %, greater than or equal to 15 vol %, greater than or equal to 20 vol %, greater than or equal to 25 vol %, greater than or equal to 30 vol %, greater than or equal to 40 vol %, greater than or equal to 50 vol %, greater than or equal to 75 vol %, greater than or equal to 90 vol %, greater than or equal to 95 vol %, or greater than or equal to 97.5% of the total volume of curable components in the fluid. Each curable component may independently make up less than or equal 99 vol %, less than or equal to 97.5 vol %, less than or equal to 95 vol %, less than or equal to 90 vol %, less than or equal to 75 vol %, less than or equal to 50 vol %, less than or equal to 40 vol %, less than or equal to 30 vol %, less than or equal to 25 vol %, less than or equal to 20 vol %, less than or equal to 15 vol %, less than or equal to 10 vol %, less than or equal to 5 vol %, less than or equal to 2 vol %, or less than or equal to 1 vol % of the total volume of curable components in the fluid. Combinations of the above-referenced ranges are also possible (e.g., greater than or equal to 0 vol % and less than or equal to 99 vol %). Other ranges are also possible.

In some embodiments, a chamber configured to receive a fluid and to output a curable composition comprising the fluid is configured to receive a fluid that is premixed. The premixed fluid may comprise two or more fluids mixed together prior to entering the chamber configured to receive a fluid and to output a curable composition comprising the fluid and/or prior to entering the spray print head. By way of example, the two or more fluids may be mixed together in a vessel separate from the spray print head.

Each fluid input into a chamber of a spray print head and each fluid output from a chamber of a spray print head may independently be configured to input or output fluid at a rate of greater than or equal to 0.1 mL/min, greater than or equal to 0.2 mL/min, greater than or equal to 0.5 ml/min, greater than or equal to 1 mL/min, greater than or equal to 2 mL/min, greater than or equal to 5 mL/min, greater than or equal to 10 mL/min, greater than or equal to 20 mL/min, greater than or equal to 50 mL/min, greater than or equal to 100 mL/min, greater than or equal to 200 mL/min, or greater than or equal to 500 mL/min. Each fluid input into a chamber of a spray print head and each fluid output from a chamber of a spray print head may independently be configured to input or output fluid at a rate of less than or equal to 1 L/min, less than or equal to 500 mL/min, less than or equal to 200 mL/min, less than or equal to 100 mL/rain, less than or equal to 50 ml/min, less than or equal to 20 mL/min, less than or equal to 10 mL/min, less than or equal to 5 mL/min, less than or equal to 2 mL/min, less than or equal to 1 mL/min, less than or equal to 0.5 mL/min, or less than or equal to 0.2 mL/min. Combinations of the above-referenced ranges are also possible (e.g., greater than or equal to 0.1 mL/min and less than or equal to 1 L/min). Other ranges are also possible. In many, but not necessarily all, embodiments, the rate of fluid output from a chamber may be equal to the sum of all of the rates of fluid inputs into the chamber. The ratios of various fluid inputs may generally be selected as desired, and may be configured to vary to produce output from the chamber with varying properties. For instance, a chamber may be configured to receive one input that stiffens the polymers into which it is incorporated and one input that softens the polymers into which it is incorporated. The ratio of the two components may be changed (e.g., during a deposition process) to vary the stiffness of the features formed by the material output from the spray print head. Other properties of the features formed by the material output from the spray print head may be varied in an analogous matter (e.g., one or more of the properties described in Int. Apl. No. PCT/US18/19993, filed Feb. 27, 2018, and entitled "Systems and Methods of 3D Printing Articles of Footwear with Property Gradients", incorporated herein by reference in its entirety).

As also described above, a spray print head may comprise a sheath configured to direct a gas flow to an outlet of a chamber. The sheath may direct the gas such that the composition output from the chamber may be atomized by the gas to form a plurality of droplets. The gas may be a gas that is not reactive with the composition output from the chamber, or may be a gas comprising one or more species configured to react with the composition output from the chamber (e.g., to cure a curable composition output from the chamber). Non-limiting examples of suitable gases not reactive with compositions typically output from spray print head chambers include air, carbon dioxide, dry gases, and gases typically considered to be inert (e.g., the noble gases, argon, and/or nitrogen). One example of a species that may be configured to react with compositions typically output from spray print head chambers is water vapor (e.g., in the form of steam, as a component of humidified air). The water vapor may be configured to react with water-curable compositions, such as water-curable polyurethanes. Another example of species that may be configured to react with compositions typically output from spray print head chambers is an oxidizing gas.

A sheath positioned on a spray print head may be configured to direct a gas flow to an outlet of a chamber of the spray print head at a variety of suitable pressures. The pressure of the gas may be greater than or equal to 2 psi, greater than or equal to 5 psi, greater than or equal to 10 psi, greater than or equal to 20 psi, greater than or equal to 30 psi, or greater than or equal to 40 psi. The pressure of the gas may be less than or equal to 50 psi, less than or equal to 40 psi, less than or equal to 30 psi, less than or equal to 20 psi, less than or equal to 10 psi, or less than or equal to 5 psi. Combinations of the above-referenced ranges are al so possible (e.g., greater than or equal to 2 psi and less than or equal to 50 psi). Other ranges are also possible.

The interaction between a gas flow directed by a sheath to an outlet of a chamber and compositions output therefrom may result in the formation of a plurality of droplets of the composition with a variety of suitable average sizes. The average size of the droplets may be greater than or equal to 1 micron, greater than or equal to 2 microns, greater than or equal to 5 microns, greater than or equal to 10 microns, greater than or equal to 20 microns, greater than or equal to 50 microns, greater than or equal to 100 microns, or greater than or equal to 200 microns. The average size of the droplets may be less than or equal to 500 microns, less than or equal to 200 microns, less than or equal to 100 microns, less than or equal to 50 microns, less than or equal to 20 microns, less than or equal to 10 microns, less than or equal to 5 microns, or less than or equal to 2 microns. Combinations of the above-referenced ranges are also possible (e.g., greater than or equal to 1 micron and less than or equal to 500 microns). Other ranges are also possible.

As also described above, some spray print heads and other print heads may be configured to cure a curable composition output from a chamber. The curable composition may be at least partially cured prior to contacting a substrate onto which it is deposited by the print head. Curing a curable composition output from the chamber may advantageously allow for fluids with a low viscosity beneficial for being input to the chamber and mixed in the chamber to form fluids with higher viscosities more suitable for deposition onto a substrate. It may be beneficial for fluids with low viscosity to be input into the chamber and to pass through the chamber because fluids with low viscosity require less power to pump and to mix. However, fluids with low viscosities may undesirably spread when deposited on substrates and/or may undesirably soak into substrates. Fluids with higher viscosities may deposit onto substrates in a more desirable manner. These fluids may spread to a smaller, more controllable extent (or not at all) and/or may minimally soak into substrates. Accordingly, in some embodiments, it is desirable for the viscosity of a composition to increase after being output from the chamber (e.g., by a factor of 2 or more). For curable compositions, this may be accomplished by curing the composition. Curing may be accomplished by exposing the curable composition to a light which causes curing (e.g., from an irradiation assembly, such as a laser light assembly), by exposing the curable composition to a species configured to cure the composition (e.g., a gaseous species reactive with the composition directed to the composition by a sheath), and/or by exposing the curable composition to heat that causes curing (e.g., from a radiant heat source).

When a curable composition is cured between being output from a chamber on a spray head (or other print head) and prior to depositing on a substrate, it may be cured to a variety of suitable degrees. In some embodiments, it may be desirable for the curable composition to be partially cured. In such cases, the extent of cure may be such that the viscosity of the curable composition is sufficiently high to prevent the negative effects outlined above and such that the curable composition retains some functional groups that are reactive. The reactive functional groups may cause droplets of the curable composition that contact each other to react with each other and fuse together. Droplets, fused and/or unfused, may be configured to undergo plastic deformation upon deposition onto a substrate and/or may have a relatively low yield stress. This may be accomplished by curing the curable composition to a relatively low degree. In some embodiments, droplets, fused and/or unfused, are configured to not undergo appreciable plastic deformation upon deposition onto a substrate and/or may have a relatively high yield stress. This may be accomplished by curing the curable composition to a relatively high degree. Droplets, fused and/or unfused, with a higher yield stress may deposit onto a substrate as a porous structure (i.e., in a manner such that there is little plastic deformation of the droplets after curing). Droplets, fused and/or unfused, with a lower yield stress may deposit onto the substrate as a structure including few pores (i.e., in a manner such that plastic deformation of the droplets after curing results in flow of the curable composition to fill in pores present upon deposition of the curable composition). Curable compositions that are partially cured upon leaving the spray print head may be fully cured at a later time (e.g., by a source of light and/or heat also positioned within a digital printing system comprising the spray print head).

In some embodiments in which a curable composition develops a yield stress prior to depositing on a substrate and/or shortly after depositing on a substrate, it may be possible to facilely form 3D-structures from the curable composition. The curable composition will retain the shape it had when it developed the yield stress unless a stress is applied to it in excess of its yield stress. By taking advantage of this phenomenon, compositions can be cured to develop yield stresses at a time such that they do not appreciably spread on the substrate after deposition thereon. The unspread curable compositions can be deposited and/or stacked on top of each other in a variety of patterns that do not spread after deposition. In this manner, 3D-structures can be facilely be formed.

In some embodiments, a spray print head (or other print head) may be configured to change the degree to which it cures materials output therefrom over time. As described above, changing the degree to which the material is cured may change its viscosity. In some embodiments, a spray print head (or other print head) is configured to initially cure materials it outputs to a high degree, and then later cure materials it outputs to a lower degree (or vice versa) This may be beneficial for the spraying of materials that have varying properties (e.g., properties having a gradient). Changing the degree to which the spray print head (or other print head) cures the material output therefrom and/or changing the viscosity of the material output therefrom may be accomplished by, for instance, changing and/or modulating the intensity of light produced by an irradiation assembly, changing and/or modulating the amount of time for which the material is exposed to light produced by the irradiation assembly (e.g., by modulating the duty cycle at which the light is produced by the irradiation assembly), and the like.

By way of example, a curable composition may have a viscosity that varies with degree of curing such that it has a very low viscosity at very low (or zero) degrees of curing, has a moderate viscosity at moderate degrees of curing, and has a high viscosity and/or forms a solid with a yield stress after undergoing a higher degree of curing (e.g., once fully cured). This may be useful, for example and as described elsewhere herein, for applications in which it is desirable for at least a portion of the cured curable composition (e.g., the resultant polymer) to penetrate into an interior of a substrate onto which it is deposited. Portions of the curable composition to be penetrated into the interior of the substrate may be lightly cured or uncured so that they have a viscosity low enough to facilitate such penetration. After penetrating to the desired degree (e.g., partially, fully), the curable composition may be cured such that further penetration is prevented and/or substantially slowed (e.g., the polymer may be cured to form a solid with a yield stress and/or fully cured). Portions of the curable composition not to be penetrated into the interior of the substrate may be cured to a degree sufficient to prevent such infiltration. By way of example, an uncured, lower viscosity portion of the curable composition may be deposited on a substrate to penetrate therein and then a partially or fully cured, higher viscosity portion of the curable composition may be deposited onto the substrate to be disposed thereon. The partially or fully cured, higher viscosity portion of the curable composition may be deposited onto the same portion of the substrate onto which the uncured, lower viscosity portion of the curable composition was deposited (e.g., to form a portion of a composite article for comprising a portion of a substrate into which a polymer penetrates and on which a polymer is disposed) and/or onto a different portion of the substrate (e.g., to form a portion a portion of a composite article for comprising a portion of a substrate into which a polymer penetrates and a separate, different, portion on which a polymer is disposed). In other words, in some embodiments, changing a relative amount of the polymer that is cured prior to deposition on the substrate causes an amount of the polymer that penetrates into the interior of the substrate to change.

In some embodiments, a curable composition may be deposited on a substrate such that it does not penetrate into the substrate at all and/or does not substantially penetrate into the substrate. This may be accomplished by curing the curable composition so that it has a sufficient viscosity to resist penetration into the substrate prior to deposition thereon and/or shortly after deposition thereon.

It should be noted that other ways of changing the properties of sprayed materials during spraying (and of materials printed in other manners by other types of print heads) are also contemplated. A non-limiting list of such ways include: changing the chemical composition of the curable composition (e.g., the ratio of curable to non-curable components of the composition), changing the flow rate of the curable composition output from the spray print head, changing the pressure of the gas flowing through the sheath of the spray print head, changing the distance between the spray print head and the substrate onto which it is spraying, and changing the relative motion of the spray print head with respect to the substrate onto which it is spraying. A non-limiting list of properties that may vary include stiffness, Shore A hardness, color, and density.

In some embodiments, a spray print head (or other print head) may be configured to cure a curable composition such that greater than or equal to 2 vol %, greater than or equal to 5 vol %, greater than or equal to 10 vol %, greater than or equal to 15 vol %, greater than or equal to 20 vol %, greater than or equal to 25 vol %, greater than or equal to 30 vol %, or greater than or equal to 35 vol % of the curable composition is cured after being output from a chamber therein and prior to deposition on a substrate (e.g., by use of an irradiation assembly, such as a laser light assembly). In some embodiments, a spray print head (or other print head) may be configured to cure a curable composition such that less than or equal to 40 vol %, less than or equal to 35 vol %, less than or equal to 30 vol %, less than or equal to 25 vol %, less than or equal to 20 vol %, less than or equal to 15 vol %, less than or equal to 10 vol %, or less than or equal to 5 vol % of the curable composition is cured after being output from a chamber therein and prior to deposition on a substrate (e.g., by use of an irradiation assembly, such as a laser light assembly). Combinations of the above-referenced ranges are also possible (e.g., greater than or equal to 2 vol % and less than or equal to 40 vol %, or 5 vol % and less than or equal to 40 vol %). Other ranges are also possible. It should also be understood that, for a curable composition that comprises more than one type of curable component, each curable component may independently fall within one or more of the ranges listed above and/or that the composition as a whole may fall within one or more of the ranges listed above.

When a curable composition is deposited on a substrate, may be at least partially cured by a short amount of time after deposition thereon. In some embodiments, a curable composition is deposited on a substrate, and the composition is at least partially cured after a time of greater than or equal to 1 second, greater than or equal to 2 seconds, greater than or equal to 5 seconds, greater than or equal to 10 seconds, greater than or equal to 20 seconds, greater than or equal to 30 seconds, greater than or equal to 1 minute, greater than or equal to 2 minutes, greater than or equal to 5 minutes, greater than or equal to 10 minutes, greater than or equal to 20 minutes, greater than or equal to 30 minutes, greater than or equal to 1 hour, greater than or equal to 2 hours, greater than or equal to 5 hours, greater than or equal to 10 hours, greater than or equal to 1 day, greater than or equal to 2 days, or greater than or equal to 5 days have elapsed after deposition thereon. In some embodiments, a curable composition is deposited on a substrate, and the composition is at least partially cured by a time of less than or equal to 1 week, less than or equal to 5 days, less than or equal to 2 days, less than or equal to 1 day, less than or equal to 10 hours, less than or equal to 5 hours, less than or equal to 2 hours, less than or equal to 1 hour, less than or equal to 30 minutes, less than or equal to 20 minutes, less than or equal to 10 minutes, less than or equal to 5 minutes, less than or equal to 2 minutes, less than or equal to 1 minute, less than or equal to 30 seconds, less than or equal to 2.0 seconds, less than or equal to 10 seconds, less than or equal to 5 seconds, or less than or equal to 2 seconds has elapsed after deposition thereon. Combinations of the above-referenced ranges are also possible (e.g., greater than or equal to 1 second and less than or equal to 1 week). Other ranges are also possible.

When a curable composition cures over time, it may reach a state in which it stops undergoing appreciable further curing. Such compositions are referred to herein as "fully cured". Full curing of a composition may be indicated, for instance, by stable mechanical properties that do not change appreciably over time. In some embodiments, a curable composition is deposited on a substrate, and the composition is fully cured after a time of greater than or equal to 1 minute, greater than or equal to 2 minutes, greater than or equal to 5 minutes, greater than or equal to 10 minutes, greater than or equal to 20 minutes, greater than or equal to 30 minutes, greater than or equal to 1 hour, greater than or equal to 2 hours, greater than or equal to 5 hours, greater than or equal to 10 hours, greater than or equal to 1 day, greater than or equal to 2 days, or greater than or equal to 5 days have elapsed after deposition thereon. In some embodiments, a curable composition is deposited on a substrate, and the composition is fully cured by a time of less than or equal to 1 week, less than or equal to 5 days, less than or equal to 2 days, less than or equal to 1 day, less than or equal to 10 hours, less than or equal to 5 hours, less than or equal to 2 hours, less than or equal to 1 hour, less than or equal to 30 minutes, less than or equal to 20 minutes, less than or equal to 10 minutes, less than or equal to 5 minutes, or less than or equal to 2 minutes has elapsed after deposition thereon. Combinations of the above-referenced ranges are also possible (e.g., greater than or equal to 1 minute and less than or equal to 1 week). Other ranges are also possible.

In some embodiments, a spray print head (or other print head) may be configured to cure a curable composition to a high degree, or completely. In other words, a spray print head (or other print head) may be configured to receive one or more fluids that together form a curable composition and then cure then curable composition. The cured curable composition may form microparticles. If deposited onto an adhesive substrate, the microparticles may adhere to the adhesive substrate without substantially changing in shape. This may result in the formation of a textured substrate.

The amount of curing at which a curable composition forms a solid with a yield stress may be a variety of suitable values. In some embodiments, a curable composition forms a solid and/or has a yield stress once greater than or equal to 5 vol %, greater than or equal to 10 vol %, greater than or equal to 15 vol %, greater than or equal to 20 vol %, greater than or equal to 25 vol %, greater than or equal to 30 vol %, greater than or equal to 40 vol %, greater than or equal to 50 vol %, or greater than or equal to 75 vol % of the curable composition is cured. In some embodiments, a curable composition forms a solid and/or has a yield stress once less than or equal to 100 vol %, less than or equal to 75 vol %, less than or equal to 50 vol %, less than or equal to 40 vol %, less than or equal to 30 vol %, less than or equal to 25 vol %, less than or equal to 20 vol %, less than or equal to 15 vol %, or less than or equal to 10 vol % of the curable composition is cured. Combinations of the above-referenced ranges are also possible (e.g., greater than or equal to 5 vol % and less than or equal to 100 vol %). Other ranges are also possible. It should also be understood that, for a curable composition that comprises more than one type of curable component, each curable component may independently fall within one or more of the ranges listed above and/or that the composition as a whole may fall within one or more of the ranges listed above.

In some embodiments, a spray print head is employed to form a 3D-feature. The 3D-feature may be formed, for instance, by spraying successive layers of a polymer onto a substrate. The layers may be discontinuous, and portions of the substrate onto which more layers of polymer are sprayed may protrude from the substrate to a higher degree than portions of the substrate onto which fewer layers of polymer are sprayed.

It may be advantageous for curing of a curable composition to be accomplished by an irradiation assembly that is a laser light assembly for a variety of reasons. For instance, lasers may be focused to form small spot sizes and/or spot sizes of controlled spatial extent. Little laser light may diverse from the spot size, and so it may be possible to substantially reduce the amount of light interacting with compositions output from the chamber other than at desired locations or completely prevent light from interacting with compositions output from the chamber other than at desired locations. The laser light may interact with compositions output from a chamber as they pass through the location to which the laser light is directed but not in other disadvantageous locations (e.g., inside the chamber, where curing would undesirably raise the fluid viscosity) and/or may interact with portions of the composition that pass through the location to which the laser light is directed but not other portions of the composition (e.g., portions that do not pass through the location to which the laser light is directed).

The location at which the laser light is directed may be positioned in a variety of suitable positions and may have a variety of suitable spatial extents. A laser light assembly may be configured to direct laser light to a location such that a large portion or all of a composition output by a chamber is exposed thereto. In some embodiments, a laser light assembly is configured to direct laser light to a location such that significant portions of the composition output by the chamber are not exposed thereto. This may be accomplished by selecting a smaller spot size for the location (e.g., a spot size less than the average spatial extent of the composition) and/or by switching the laser light on and off. The laser light may be pulsed with a duty cycle, whose frequency and relative amount of off time may be selected such that a desired fraction of the composition is not exposed to the laser. In some embodiments, the duty cycle may be a variable duty cycle. In other words, one or more features of the duty cycle may vary over time. In some embodiments, non-laser light (e.g., LED light) is pulsed with a duty cycle, such as a variable duty cycle.

In some embodiments, light (e.g., laser light, LED light) is provided at an intensity that varies with time by a method other than pulsing the light with a duty cycle. The intensity may vary with time by varying the intensity of the light, but, optionally, not including time periods at which the light has a zero intensity. This may be accomplished by, for instance, changing the power of the laser and/or LEI) source providing the light. In some embodiments, the intensity is varied by changing the number of lasers and/or LED light sources providing light.

In some embodiments, one or more features of the light (e.g., laser light, LED light) may be controlled by one or more external controllers. These features include one or more features of a duty cycle (e.g., its length, its frequency, the relative amount of off time) and/or the intensity of light (e.g., laser light, LED light). One controller may control each feature of the light (e.g., laser light, LED light), each feature of the light (e.g., laser light, LED light) may be controlled by a different controller, or a spray print head may comprise at least one controller which controls two or more features of the light (e.g., laser light, LED light) but does not control all features of the light (e.g., laser light, LED light).

A location to which laser light is directed may have a spot size of greater than or equal to 10 microns, greater than or equal to 20 microns, greater than or equal to 50 microns, greater than or equal to 100 microns, greater than or equal to 200 microns, greater than or equal to 500 microns, greater than or equal to 1 mm, greater than or equal to 2 mm, or greater than or equal to 5 mm. The location may have a spot size of less than or equal to 10 mm, less than or equal to 5 mm, less than or equal to 2 mm, less than or equal to 1 mm, less than or equal to 500 microns, less than or equal to 200 microns, less than or equal to 100 microns, less than or equal to 50 microns, or less than or equal to 20 microns. Combinations of the above-referenced ranges are also possible (e.g., greater than or equal to 10 microns and less than or equal to 10 mm, or greater than or equal to 50 microns and less than or equal to 1 mm). Other ranges are also possible.

Light configured to cure a curable composition, such as laser light and/or LED light, may have a variety of suitable wavelengths. In some embodiment, the light is UV light. The light may have a peak average wavelength of greater than or equal to 235 nm, greater than or equal to 250 nm, greater than or equal to 275 nm, greater than or equal to 300 nm, greater than or equal to 325 nm, greater than or equal to 350 nm, greater than or equal to 365 nm, greater than or equal to 370 nm, greater than or equal to 375 nm, greater than or equal to 380 nm, greater than or equal to 385 nm, greater than or equal to 390 nm, greater than or equal to 395 nm, greater than or equal to 400 nm, greater than or equal to 405 nm, greater than or equal to 410 nm, greater than or equal to 420 nm, greater than or equal to 430 nm, or greater than or equal to 440 nm. The light may have a peak average wavelength of less than or equal to 450 nm, less than or equal to 440 nm, less than or equal to 430 nm, less than or equal to 420 nm, less than or equal to 415 nm, less than or equal to 410 nm, less than or equal to 405 nm, less than or equal to 400 nm, less than or equal to 395 nm, less than or equal to 390 nm, less than or equal to 385 nm, less than or equal to 380 nm, less than or equal to 375 nm, less than or equal to 370 nm, less than or equal to 365 nm, less than or equal to 350 nm, less than or equal to 325 nm, less than or equal to 300 nm, less than or equal to 275 nm, or less than or equal to 250 nm. Combinations of the above-referenced ranges are also possible (e.g., greater than or equal to 235 nm and less than or equal to 450 nm, greater than or equal to 235 nm and less than or equal to 415 nm, greater than or equal to 300 nm and less than or equal to 450 nm, greater than or equal to 365 nm and less than or equal to 415 nm, or greater than or equal to 390 nm and less than or equal to 415 nm). Other ranges are also possible.

When a print head is employed to deposit a material, such as a curable composition, onto a substrate, it may be present at any suitable distance from the substrate. In some embodiments, the print head may be positioned relatively close to the substrate. For instance, the print head may be positioned less than or equal to 20 mm, less than or equal to 10 mm, less than or equal to 5 mm, or less than or equal to 2 mm from the substrate. In some embodiments, the print head is positioned greater than or equal to 1 mm from the substrate, greater than or equal to 2 mm from the substrate, greater than or equal to 5 mm from the substrate, or greater than or equal to 10 mm from the substrate. Combinations of the above-referenced ranges are also possible (e.g., less than or equal to 20 mm and greater than or equal to 1 mm). Other ranges are also possible.

As described above, some embodiments relate to articles and methods of forming articles, such as composite articles, non-composite articles, methods of forming composite articles, and methods of forming non-composite articles. In some embodiments, a composite article comprises a pigment and a polymer. The pigment and the polymer may, separately, each have certain properties that are advantageous. In the composite, the pigment and the polymer may be arranged with respect to each other such that the composite article as a whole has certain advantageous properties of the pigment and certain advantageous properties of the polymer. For example, certain pigments may have beneficial optical or aesthetic qualities. As another example, certain polymers may have beneficial mechanical properties. Some composite articles described herein may comprise both a pigment and a polymer, and may be advantageously designed such that they have a coloration similar to or identical to that of the pigment therein and have mechanical properties similar to or identical to those of the polymer therein.

In some embodiments, methods of forming composite articles comprising a pigment and a polymer are provided. In some such methods, the pigment is deposited from a different print head than the polymer, such as an ink jet head.

Such methods may result in the incorporation of the pigment into the composite article in a manner that is more facile than other methods of forming composite articles comprising the pigment and the polymer. For instance, such methods may be capable of depositing two or more different pigments in sequence, or a pigment followed by a colorless polymer, without needing to clear residual pigment from a chamber after deposition of that pigment has completed. Accordingly, an operator performing such methods may be capable of forming differently-pigmented (and/or differently-colored) portions of a composite material more rapidly, and/or with less material waste, than he or she would be capable of doing by employing other methods to form composite materials.

Certain embodiments are directed to composite articles, methods of forming composite articles, and/or systems configured to form composite articles comprising two different types of materials. For instance, a composite article may comprise a polymer and an ink jet ink. The two different types of materials may be deposited by two different processes. By way of example, a composite article may comprise a material deposited by a spraying process and a material deposited by an ink jet process. The different types of materials, and/or materials deposited by different processes, provide different benefits to a composite article. As an example, a composite article may comprise a material deposited by spraying that is flexible (e.g., a polymer) and a material deposited by an ink jet process that enhances one or more properties of a surface of the composite article (e.g., an ink jet ink, a pigment, an ink jet ink comprising a pigment).

In some embodiments, one or more types of material present in a composite article (e.g., an ink jet ink, a pigment, a polymer) may form a 3D-structure. In some embodiments, the composite article as a whole has a 3D-structure. The 3D-structure may take the form of protrusions from a flat surface, and/or may take the form of a structure that is macroscopically 3D. A macroscopically 3D structure may be a portion of a the composite article and/or material therein (and/or the entirety of the composite article or material therein) that is macroscopically curved. In some embodiments, the 3D-structure is self-supporting and/or capable of maintaining its structure under an applied load and/or when it is part of an article of apparel being worn by an individual.

In some embodiments, composite articles and/or methods of forming composite articles comprising a plurality of islands are provided. The islands may be positioned within a matrix (e.g., a matrix comprising a polymer) and/or disposed on a layer (e.g., a layer comprising a polymer). The islands may comprise one or more materials that have one or more advantageous properties (e.g., the ability to be deposited by an ink jet process, advantageous aesthetic properties, advantageous mechanical properties, properties that enhance the performance of the composite articles for one or more applications). In some embodiments, it may be impractical or challenging to form certain articles entirely out of the material forming the islands but advantageous and/or practical to form articles comprising the material forming the islands in island form. In some embodiments, a layer on which the islands are disposed and/or a matrix in which the islands are positioned may also provide advantageous properties (e.g., it may be capable of being deposited by spraying, it may support the material forming the islands, it may provide beneficial mechanical properties). In some embodiments, the islands may comprise an ink jet ink (e.g., an ink jet ink comprising a pigment, a clear ink jet ink, a translucent ink jet ink) and may be disposed on a layer comprising a polymer. It should be understood that any of the embodiments herein may comprise an ink jet ink (e.g., a clear ink jet ink, a translucent ink jet ink) and/or islands comprising an ink jet ink. Non-limiting examples of suitable ink jet inks include CYMK ink jet inks, metallic inks, reflective inks, and special black inks. The ink jet ink may be a composition capable of being deposited by an ink jet head and/or a composition configured to be deposited by an ink jet head. Ink jet inks may comprise one or more polymers, one or more solvents, one or more curable components, and/or one or more pigments.

It should also be understood that some composite articles may comprise continuous layers of materials that may also be advantageously incorporated into the composite articles as islands. For instance, some composite articles may comprise a continuous layer of an ink jet ink and/or a continuous layer of a pigment.

Figure 4:
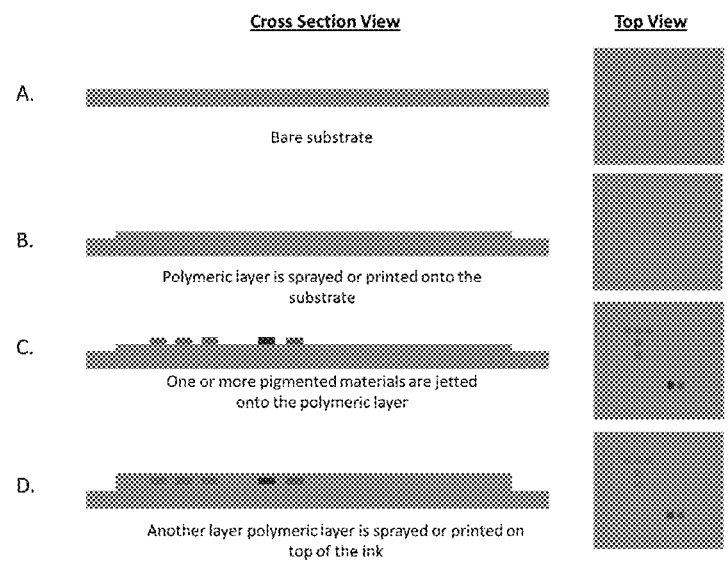
FIG. 4 is a schematic depiction of a method of forming a composite article, according to certain embodiments.

In some embodiments, systems are provided. Some of the systems may have one or more features similar to the digital printing systems described above, and some systems may differ from the digital printing systems described above in one or more ways. The systems may be systems capable of forming, and/or be configured to form, one or more of the articles described herein (e.g., one or more composite articles) and/or to perform one or more of the methods described herein. The system may comprise one or more print heads configured to deposit a polymer and/or a precursor for a polymer, such as a print head comprising a mixing chamber, and one or more heads configured to deposit a pigment, such as an ink jet head. In some embodiments, a print head configured to deposit the polymer may be configured to spray the polymer. For instance, the print head may be coupled to a compressed gas source configured to atomize a fluid flowing through the mixing chamber. FIG. 4 shows one non-limiting embodiment of a method of forming a composite article. In FIG. 4, the method commences with depositing a first polymer onto a substrate to form a first layer comprising the first polymer. Then, the method comprises depositing a pigment onto the first layer to form a second layer comprising the pigment. Finally, a second polymer is deposited onto the second layer to form a third layer comprising the second polymer. In some embodiments, like that shown in FIG. 4, the pigment is deposited in the form of a plurality of pigment particles. In some such embodiments, also like that shown in FIG. 4, the second polymer and the pigment form a layer comprising the plurality of pigment particles distributed within a matrix comprising the polymer. The pigment (e.g., pigment particles) may, in some embodiments, be deposited when present in a composition further comprising one or more additional species (e.g., one or more polymers). The composition may be an ink jet ink. For instance, an ink jet ink comprising a pigment and a polymer may be deposited onto a first layer comprising a first polymer to form a second layer comprising the pigment. In such cases, the second layer may also comprise the polymer present in the composition comprising the pigment. In some embodiments, unlike that shown in FIG. 4, the pigment may not be in particulate form, and/or the pigment may form a layer that includes minimal or no polymer.

In some embodiments, a composite article may have a structure like that shown in FIG. 4. For instance, the composite article may comprise a first layer comprising a first polymer, a second layer comprising a pigment, and a third layer comprising a second polymer. The second layer may be disposed on the first layer, and the third layer may be disposed on the second layer. As another example, in some embodiments, like that shown in FIG. 4, one or more of the layers comprising polymers may be continuous. For instance, the first layer comprising the first polymer may be continuous, and/or the second layer comprising the second polymer may be continuous. As a third example, in some embodiments, like that shown in FIG. 4, a composite article may comprise pigment that is fully embedded in the composite article. In other words, the composite article may comprise a pigment, and none of the pigment may be present at any of the surfaces of the composite article. In some embodiments, a composite article may comprise a pigment that is mostly embedded in the composite article. That is, a small percentage of the pigment in the composite article may be present at any of the surfaces of the composite article, and a large percentage of the pigment in the composite article may be positioned in the interior of the composite article.

Figure 5A:
FIG. 5A is a schematic depiction of a composite article comprising a pigment that is not embedded, according to certain embodiments.

In some embodiments, a composite article may comprise pigment that is not embedded. In certain cases, most or all of the pigment present in a composite article may be pigment that is not embedded therein. In some such embodiments, a composite article may include only one layer other than the pigment, or only one layer comprising a polymer. For instance, a composite article may comprise a layer comprising a polymer and pigment disposed on the layer comprising the polymer. FIG. 5A shows one non-limiting example of a composite article comprising a pigment that is not embedded. In FIG. 5A, pigment is disposed on an upper surface of the composite article. No further material is disposed on the pigment. When pigment is not embedded, it may be on any exterior surface of the composite article (e.g., on an upper surface, on a lower surface, on a side surface, on a surface that is a layer comprising a polymer). Pigment that is not embedded may be present in a layer that contains minimal or no polymer. When present, pigment that is not embedded may be in the form of a layer (e.g., in the form of a discontinuous layer, in the form of a layer comprising pigment particles, in the form of a layer comprising islands of pigment). In certain cases, a composite article may comprise pigment that is not embedded that is not in the form of a layer.

Certain methods may comprise depositing a pigment that is not embedded. For instance, a method may comprise depositing a pigment onto a substrate and/or onto a material disposed on a substrate. The material disposed on the substrate may be an exterior surface of a composite article (e.g., onto an upper surface, onto a lower surface, onto a side surface, onto a surface that is a layer comprising a polymer). The pigment may, in certain cases, be deposited by an ink jet process.

As described above, in some embodiments, a composite article may comprise an ink jet ink. When present, the ink jet ink may be fully embedded in the composite article mostly embedded in the composite article, and/or not embedded in the composite article. Ink jet ink that is not embedded may be present in a layer that contains minimal or no species other than the ink jet ink. When present, ink jet ink that is not embedded may be in the form of a layer (e.g., in the form of a discontinuous layer, in the form of a layer comprising ink jet ink particles, in the form of a layer comprising islands of ink jet ink). In certain cases, a composite article may comprise ink jet ink that is not embedded that is not in the form of a layer.

Certain methods may comprise depositing an ink jet ink that is not embedded. For instance, a method may comprise depositing an ink jet ink onto a substrate and/or onto a material disposed on a substrate. The material disposed on the substrate may be an exterior surface of a composite article (e.g., onto an upper surface, onto a lower surface, onto a side surface, onto a surface that is a layer comprising a polymer).

Without wishing to be bound by any particular theory, it is believed that composite articles comprising pigment and/or ink jet ink that is not embedded may have one or more beneficial properties. For instance, a composite article comprising pigment and/or ink jet ink that is not embedded may have enhanced abrasion resistance at the exterior surface where the pigment and/or ink jet ink is present (e.g., if the pigment is resistant to abrasion, if the pigment is positioned at the exterior surface to form a structure that is resistant to abrasion, if the ink jet ink is resistant to abrasion, if the ink jet ink is positioned at the exterior surface to form a structure that is resistant to abrasion). As another example, as will be described in further detail below, a composite article comprising pigment and/or ink jet ink that is not embedded may have beneficial aesthetic properties.

Figure 5B:
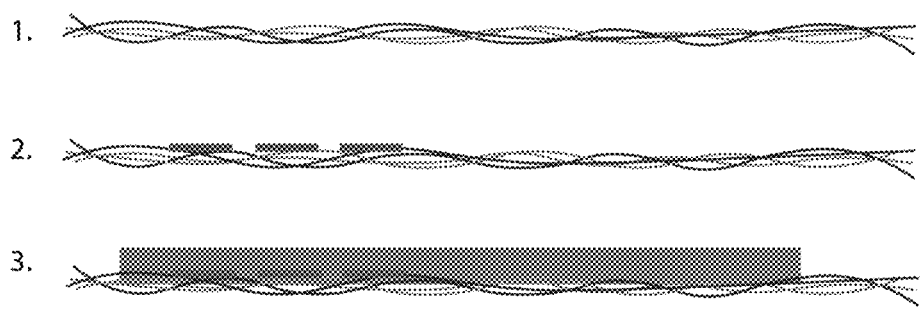
FIG. 5B is a schematic depiction of a method of forming a composite article in which a pigment is deposited directly onto a substrate, according to certain embodiments.

In some embodiments, a composite article may comprise a layer comprising a pigment that is positioned directly adjacent to a substrate. In some such embodiments, a layer comprising a polymer may be disposed on the layer comprising the pigment that is directly adjacent to the substrate. FIG. 5B shows one non-limiting embodiment of a method of fabricating a composite article with this structure. In FIG. 5B, a layer comprising a pigment is deposited on a substrate (e.g., by performing an ink jet process). Then, a layer comprising a polymer is deposited on the layer comprising the pigment (e.g., by spraying). In FIG. 5B, the substrate is a textile. Methods similar to that shown in FIG. 5B, such as methods in which a layer comprising a pigment is deposited directly onto a substrate, may be performed on other types of substrates in certain cases.

In some embodiments, a composite article may comprise a layer comprising an ink jet ink that is positioned directly adjacent to a substrate. In some such embodiments, a layer comprising a polymer may be disposed on the layer comprising the ink jet ink that is directly adjacent to the substrate.

It should be understood that, in some embodiments, a material (e.g., a first polymer, a plurality of pigment particles, an ink jet ink) may be deposited directly onto a substrate. In other embodiments, a material (e.g., a first polymer, a plurality of pigment particles, an ink jet ink) may be deposited onto a material disposed on the substrate (e.g., onto a layer disposed on the substrate, onto a first polymer layer). Two layers having the same composition may be deposited and/or disposed on one another, and/or one or more layers may be directly adjacent to a layer having a different composition. By way of example, in some embodiments, multiple layers comprising polymers are directly adjacent to each other. Such layers may be formed by spraying layers of polymer directly onto each other.

It should also be understood that, when a method comprises more than one step in which a polymer is deposited, the polymers deposited during each step may be different, the polymers deposited during each step may be the same, or the method may comprise two or more steps in which different polymers are deposited and two or more steps in which the same polymer is deposited. In embodiments in which a composite article comprises more than one polymer, the polymers may be the same, each polymer may be different, or certain polymers may be the same as some of the other polymers and different from some of the other polymers. In some embodiments, one or more polymers (or layers comprising a polymer, such as a layer or polymer on which a layer comprising a pigment is disposed, a layer or polymer disposed on a layer comprising a pigment, a layer or polymer on which a layer comprising an ink jet ink is disposed, a layer or polymer disposed on a layer comprising an ink jet ink) may be clear or colorless.

In embodiments in which a composite article comprises one or more polymers (and/or a method comprises depositing one or more polymers), the polymer(s) may be any suitable polymer(s). For instance, the composite article may comprise thermoplastics and/or thermosets. In some embodiments, the composite article may comprise a polymer (e.g., a first polymer, a second polymer, a polymer in a layer comprising a pigment, a polymer in a layer comprising an ink jet ink) that is a polyurethane and/or a silicone.

Figure 6:
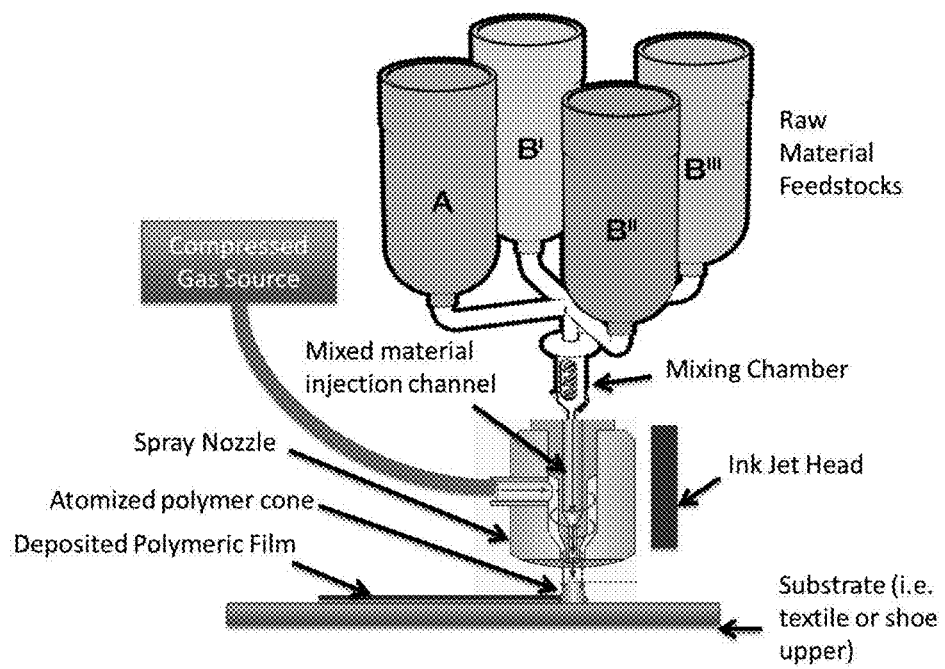
FIG. 6 is a schematic depiction of a method of depositing a polymer onto a substrate, according to certain embodiments.

FIG. 6 shows one non-limiting embodiment of a method of depositing a polymer onto a substrate. The method shown in FIG. 6 may be employed, for instance, to form one or more of the layers comprising the polymers shown in FIG. 4. In FIG. 6, two or more different polymers or precursors for polymers (e.g., as in FIG. 6, four different polymers or precursors for polymers) are flowed into a mixing chamber. In some embodiments, the mixing chamber is a mixing chamber with one or more features of the mixing chambers described in U.S. Provisional Patent Application No. 62/555,874 entitled "3D Printing Methods Using Mixing Nozzles", incorporated herein in its entirety. When in the mixing chamber, the two or more different polymers or precursors for polymers may be mixed together. This mixture may form a fluid that flows through the mixing chamber. Then, the mixture may enter a spray nozzle. A compressed gas source configured to atomize the mixture may be coupled to the spray nozzle. Compressed gas from the compressed gas source may flow into the mixing nozzle and atomize the mixture therein (e.g., a fluid from the mixing chamber). The atomized mixture may then be sprayed onto a substrate (e.g., directly onto a substrate, or onto one or more layers disposed on the substrate, such as a layer comprising a pigment, a layer comprising a polymer, a layer comprising a pigment and a polymer, a layer comprising an ink jet ink, and/or a layer comprising an ink jet ink and a polymer). When being sprayed, the atomized mixture may, in some cases, take the form of an atomized polymer cone.

Figure 7A:
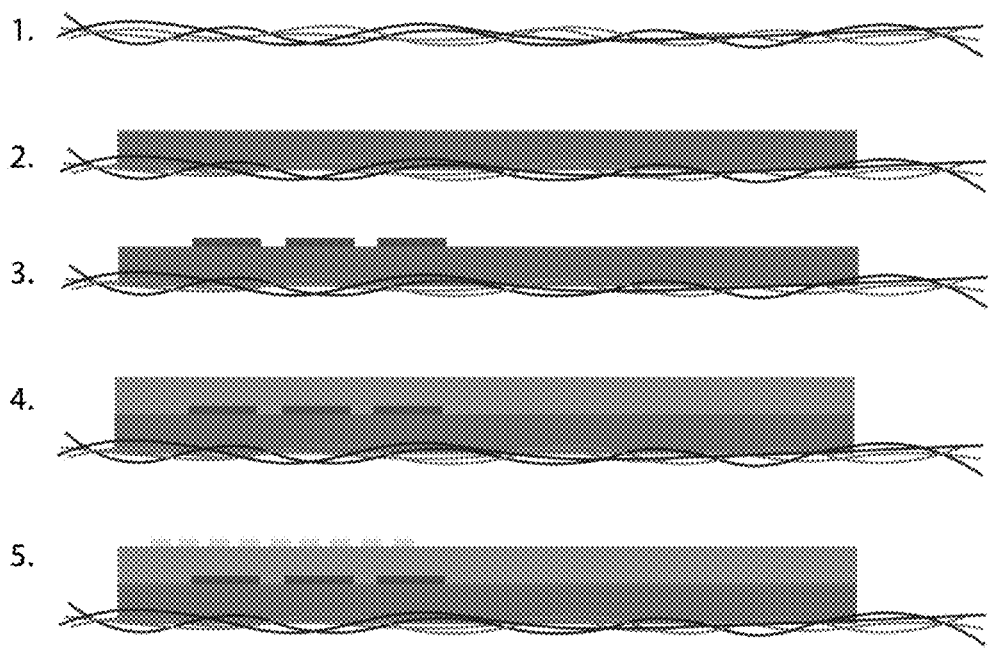
FIGS. 7A-7B are schematic depictions of methods of forming composite articles, according to certain embodiments.
Figure 7B:
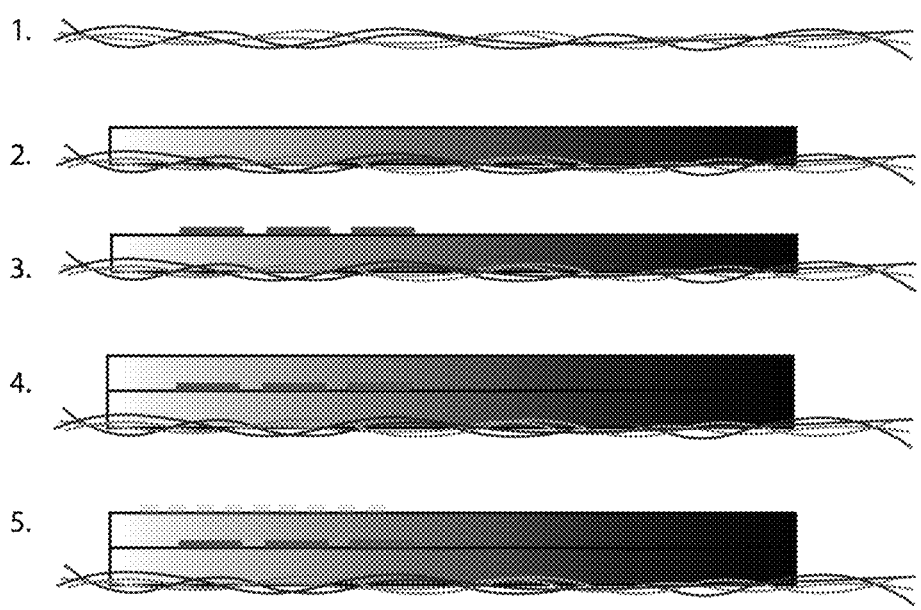

A substrate onto which a polymer (or any other suitable material) is deposited and/or disposed may be any suitable substrate. In some embodiments, the substrate may be a flexible substrate, such as a substrate that is capable of bending without undergoing much or any permanent deformation. Examples of flexible substrates include fabrics, such as textiles, woven fabrics, non-woven fabrics, and knitted fabrics. In some embodiments, a flexible polymer may be deposited onto a flexible substrate to form a flexible composite article. In some embodiments, the substrate may be a component of an article of footwear or apparel (e.g., an upper for a shoe, a fabric and/or textile component of an article of footwear or article of apparel, a fabric and/or textile configured for use in an article of footwear or article of apparel). Suitable articles of footwear and apparel are described in more detail below. FIGS. 7A and 7B show examples of methods of fabricating composite articles deposited on substrates that are textiles. The composite article formed in FIG. 7A includes two layers comprising a polymer, both of which have substantially uniform properties throughout the layer. The composite article formed in FIG. 7B includes two layers comprising a polymer, both of which have a gradient in one or more properties across the layer. Both FIG. 7A and FIG. 7B include one layer comprising a pigment that is embedded and one layer comprising an ink jet ink that is not embedded.

In some embodiments, a polymer (or any other suitable material) is deposited directly onto a support, such as directly onto a last. In such cases, the support may be a non-stick support. Some composite articles may be fabric-free, or may comprise fabric positioned onto one or more non-fabric layers deposited onto a non-fabric support (e.g., one or more layers comprising a polymer, a pigment, and/or an ink jet ink deposited onto a non-fabric support).

It should be noted that certain articles relate to systems similar to those shown in FIG. 6, such as systems comprising a mixing chamber, a compressed gas source configured to atomize a fluid flowing through the mixing chamber, and an ink jet head. Some systems may have one or more of the components shown in FIG. 6. Some systems may lack one or more of the components shown in FIG. 6 (e.g., a system may have fewer than four raw material feedstocks). In some embodiments, a system may have one or more of the components shown in FIG. 6, but their arrangement may be other than that shown in FIG. 6 (e.g., the compressed gas source may be positioned upstream of the mixing nozzle, or may input into the middle of the mixing nozzle).

Figure 8:
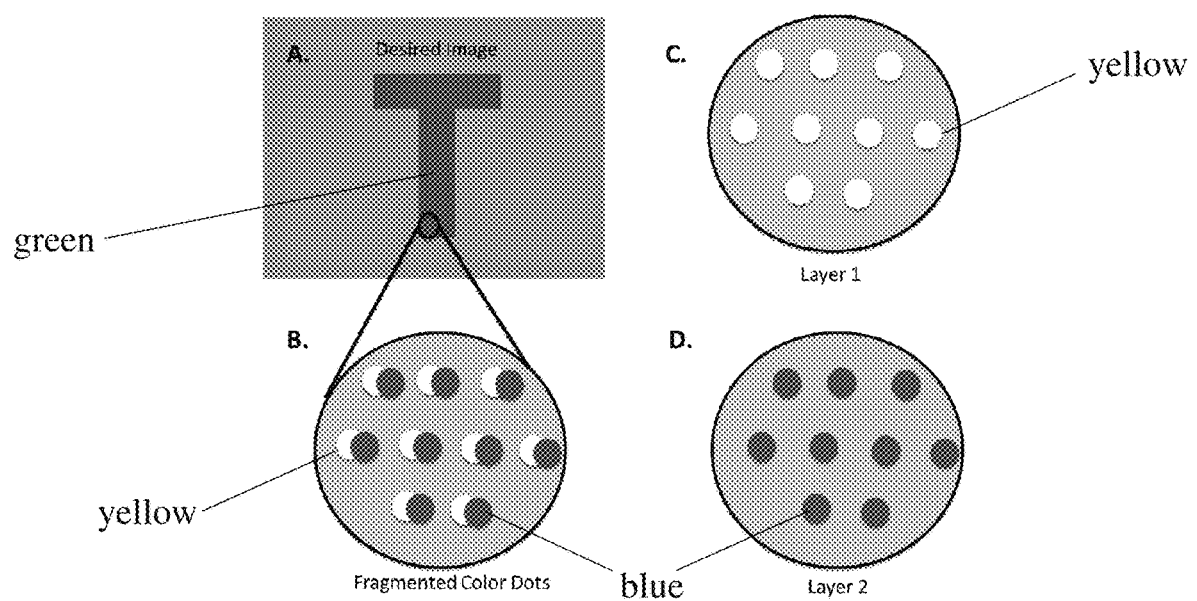
FIG. 8 is a schematic depiction of a layer comprising a pigment and a polymer, according to certain embodiments.

FIG. 8 shows one non-limiting embodiment of a layer comprising a pigment and a polymer. The pigment may be positioned in any suitable design. In some embodiments, like that shown in FIG. 8, the pigment (e.g., pigment particles) may be in the form of islands. In other words, the pigment be divided into multiple discernible portions. In some embodiments, the islands comprising pigment may not be interconnected, or may be minimally interconnected (e.g., none of the islands may be in direct contact with other islands, or a minimal percentage of the islands may be in contact with other islands). In some such embodiments, the polymer within the layer may be fully interconnected, or a large portion of the polymer within the layer may be interconnected. For instance, the polymer may form a matrix that is fully or mostly interconnected, and the islands comprising pigment may be distributed within the polymer matrix.

In some embodiments, a composite article comprises ink jet ink that is in the form of islands. In some embodiments, the islands comprising ink jet ink may not be interconnected, or may be minimally interconnected (e.g., none of the islands may be in direct contact with other islands, or a minimal percentage of the islands may be in contact with other islands). In some embodiments, a composite article may comprise a layer comprising islands of ink jet ink and polymer (e.g., a polymer other than a polymer present in the ink jet ink). When present, the polymer within the layer may be fully interconnected, or a large portion of the polymer within the layer may be interconnected. For instance, the polymer may form a matrix that is fully or mostly interconnected, and the islands comprising ink jet ink may be distributed within the polymer matrix.

Figure 9A:
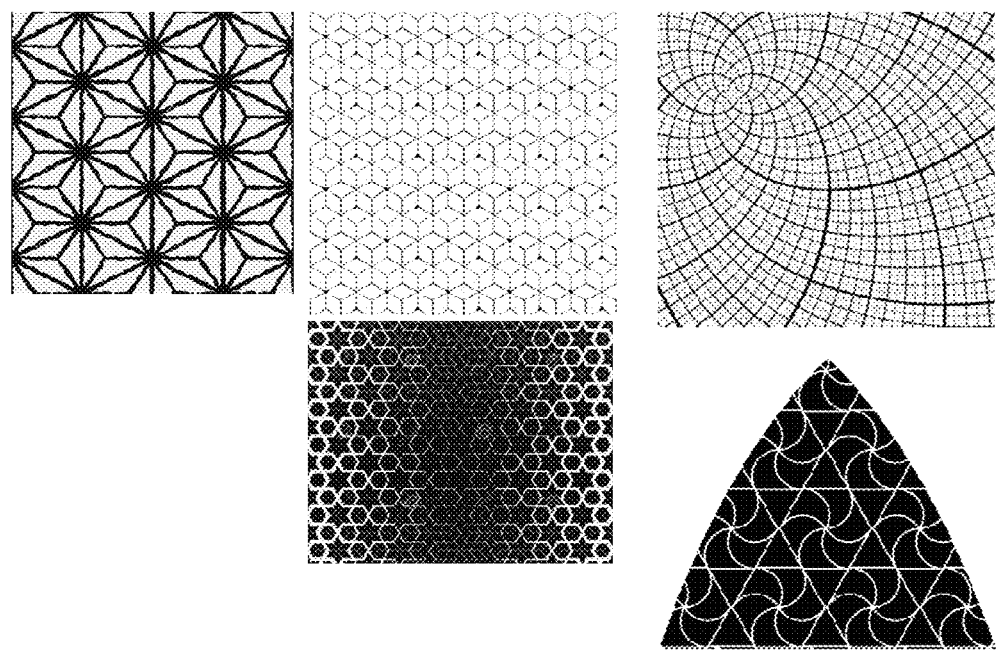
FIG. 9A shows various designs that pigment may form, according to certain embodiments.

When a material (e.g., a pigment, an ink jet ink) is present in the form of islands, the islands may have a variety of shapes. For instance, the islands may be square, round, oval, and the like. The islands may be positioned with respect to each other in a variety of manners. In some embodiments, the islands may be positioned with respect to each other in a pattern. For example, the islands may be formed in a repeating pattern, such as a lattice structure, or a non-repeating pattern, such as a pattern with quasicrystal symmetry or a pattern including one or more pre-determined features that are not repeating. FIG. 9A shows certain non-limiting shapes and patterns that the islands may form.

When a material (e.g., a pigment, an ink jet ink) is present in the form of islands, the islands may have any suitable size.

In some embodiments, an average size of islands comprising the material (e.g., islands comprising pigment, islands comprising pigment particles, islands comprising ink jet ink, islands comprising ink jet ink particles) may be less than or equal to 10 mm, less than or equal to 5 mm, less than or equal to 1 mm, less than or equal to 500 microns, less than or equal to 200 microns, less than or equal to 100 microns, or less than or equal to 50 microns. The average size of the islands may be greater than or equal to 30 microns, greater than or equal to 50 microns, greater than or equal to 100 microns, greater than or equal to 200 microns, greater than or equal to 500 microns, greater than or equal to 1 mm, or greater than or equal to 5 mm. Combinations of the above-referenced ranges are also possible (e.g., less than or equal to 10 mm and greater than or equal to 30 microns). Other ranges are also possible.

In some embodiments, a composite article may comprise a layer comprising a pigment that is not in the form of islands. For instance, the pigment (e.g., in the form of a plurality of pigment particles) may be fully interconnected, or a large portion of the pigment may be interconnected. In some such embodiments, the pigment may be interconnected but fragmented. For instance, portions of polymer may be positioned between certain portions of pigment.

In some embodiments, a composite article may comprise a layer comprising an ink jet ink that is not in the form of islands. For instance, the ink jet ink (e.g., in the form of a plurality of ink jet ink particles) may be fully interconnected, or a large portion of the ink jet ink may be interconnected. In some such embodiments, the ink jet ink may be interconnected but fragmented. For instance, portions of polymer (e.g., a polymer other than a polymer present in the ink jet ink) may be positioned between certain portions of ink jet ink.

When a layer comprises a pigment distributed in a polymer matrix, the pigment may be distributed within the polymer matrix in any suitable fashion. In some embodiments, the pigment may be distributed relatively uniformly within the polymer matrix (e.g., the density of pigment within the polymer matrix over a length scale at least an order of magnitude larger than any pigment particles and/or islands therein may be relatively uniform). In some embodiments, the pigment may not be distributed relatively uniformly within the polymer matrix. For instance, certain portions of the polymer matrix may comprise an enhanced amount of pigment relative to other portions of the polymer matrix. As another example, some portions of the polymer matrix may lack pigment entirely and some portions of the polymer matrix may comprise pigment. As a third example, some portions of the polymer matrix may comprise pigment of a first type (e.g., having a first color) but lack pigment of a second type (e.g., having a second color) and some portions of the polymer matrix may comprise pigment of the second type but lack pigment of the first type.

When a layer comprises an ink jet ink distributed in a polymer matrix, the ink jet ink may be distributed within the polymer matrix in any suitable fashion. In some embodiments, the ink jet ink may be distributed relatively uniformly within the polymer matrix (e.g., the density of ink jet ink within the polymer matrix over a length scale at least an order of magnitude larger than any ink jet ink particles and/or islands therein may be relatively uniform). In some embodiments, the ink jet ink may not be distributed relatively uniformly within the polymer matrix. For instance, certain portions of the polymer matrix may comprise an enhanced amount of ink jet ink relative to other portions of the ink jet ink matrix. As another example, some portions of the polymer matrix may lack ink jet ink entirely and some portions of the polymer matrix may comprise ink jet ink. As a third example, some portions of the polymer matrix may comprise ink jet ink of a first type (e.g., having a first color) but lack ink jet ink of a second type (e.g., having a second color) and some portions of the polymer matrix may comprise ink jet ink of the second type but lack ink jet ink of the first type.

Layers comprising both a polymer and another material (e.g., a pigment, an ink jet ink) may comprise the polymer and the other material in a variety of suitable amounts. In some embodiments, the polymer may make up a majority of the layer.

In some embodiments, a material (e.g., a pigment, an ink jet ink) may be distributed on a flexible substrate (and/or onto a flexible polymer disposed on a flexible substrate) and/or in a flexible polymer matrix (and/or on a flexible polymer matrix disposed on a flexible substrate) in a manner such that the composite article is configured such that, during deformation (e.g., bending, stretching) of the composite article as a whole, the material undergoes minimal deformation. The substrate or polymer on which the material is disposed (and/or the polymer matrix in which it is disposed) may be configured to undergo the entirety of the deformation and/or a large portion of the deformation. In certain cases, the substrate or polymer may stretch or bend around the material while the material remains relatively undeformed. Without wishing to be bound by any particular theory, it is believed arranging certain materials in a composite article such that they remains relatively undeformed during deformation of the composite article may be beneficial. For instance, certain pigments and ink jet inks are stiff and may undergo undesirable permanent deformation when deformed instead of desirable reversible deformation. When a relatively flexible material can deform around a stiff material, the composite article may deform and recover reversibly while maintaining desirable properties provided by the stiff material (e.g., aesthetic properties, abrasion resistance, friction). In some embodiments, a composite article may be configured such that macroscopic cracking of a stiff material therein (e.g., pigment at an exterior surface, an ink jet ink at an exterior surface) is minimized or prevented.

In some embodiments, a material (e.g., a pigment, an ink jet ink) may be distributed on a flexible substrate (and/or onto a flexible polymer disposed on a flexible substrate) and/or in a flexible polymer matrix (and/or on a flexible polymer matrix disposed on a flexible substrate) in a manner such that the composite article is configured such that, during deformation (e.g., bending, stretching) of the composite article as a whole, the material undergoes minimal deformation and deformation occurs uniformly throughout the composite article on at least one length scale. In other words, in some embodiments, deformation of the composite article as a whole may cause one or more materials e.g., a pigment, an ink jet ink) therein to undergo minimal deformation and cause the polymer surrounding the material to deform such that the composite article as a whole appears to deform uniformly (e.g., to an observer not observing the composite article under a microscope).

In some embodiments, like that shown in FIG. 8, a layer comprising a pigment may comprise more than one pigment (and/or more than one pigment particle). For instance, the layer may comprise two or more different pigments (and/or two or more different pigment particles). The different pigments may have different colors, or may be different formulations that have the same color. The two or more different pigments (and/or different pigment particles) may be positioned with respect to each other such that, to an individual viewing the layer, they appear to together form a continuous material, or to together form a material with a color that is a combination of the two different pigments (e.g., a blue pigment and a yellow pigment may be positioned with respect to each other such that together they appear to form a material with a green color). In some embodiments, a layer comprising a pigment may comprise some pigment particles that at least partially overlap with other pigment particles and/or are partially disposed on other pigment particles. In some embodiments, very few or none of the pigment particles within a layer comprising the pigment particles overlap or are disposed on each other.

In some embodiments, a composite article may comprise a pigment that is positioned within the composite article in an aesthetically pleasing manner. For instance, the pigment may be positioned within the article in an arrangement that forms a design, a logo, or any other image of interest. In some embodiments, the pigment may be positioned within the article in an arrangement such that the composite article has relatively uniform coloration and/or relatively uniform optical properties.

When present, a layer comprising a pigment (e.g., a layer comprising a pigment and a polymer) may have any suitable spatial extent. In some embodiments, the layer comprising the pigment may have a cross-sectional dimension of greater than or equal to 1 mm and less than or equal to 5 cm.

When present, a layer comprising an ink jet ink may have a variety of spatial extents. As an example, a layer comprising an ink jet ink may have a cross-sectional dimension of greater than or equal to 1 mm and less than or equal to 5 cm.

Figure 9B:
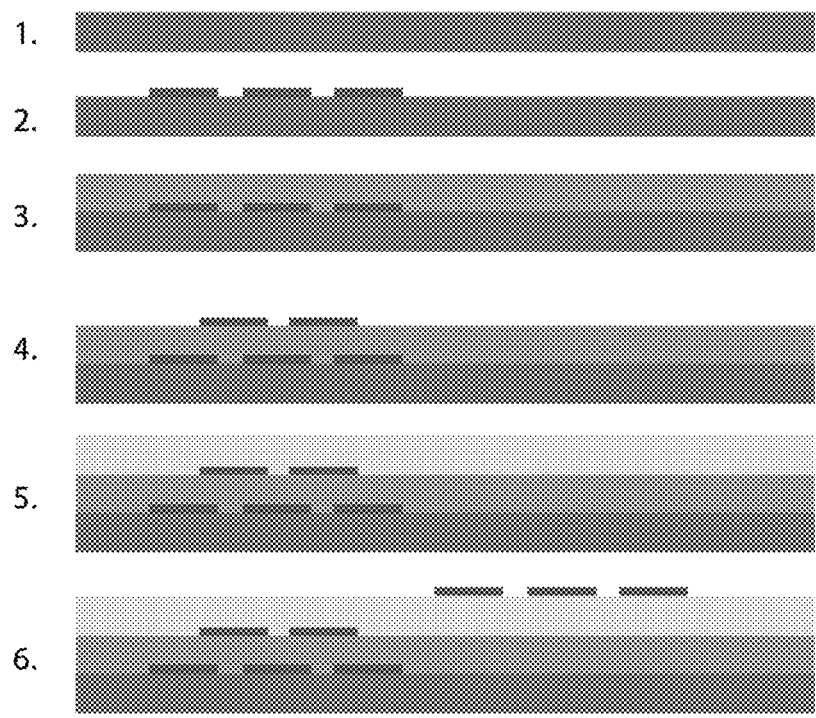
FIGS. 9B-9E are schematic depictions of methods of forming composite articles, according to certain embodiments.

In some embodiments, a composite article may comprise multiple layers comprising a pigment (e.g., multiple layers comprising a pigment and a polymer) positioned on the same substrate. In such composite articles, some of the layers comprising a pigment may be disposed on other of the layers comprising a pigment. In certain embodiments, a layer comprising a polymer may be positioned between each layer comprising a pigment. In some embodiments, a composite article may comprise both pigment that is at least partially embedded (e.g., pigment positioned in the composite article in the manner shown in FIG. 4) and pigment that is not embedded. For instance, a composite article may comprise a first layer comprising a first polymer, a second layer comprising a first pigment disposed on the first layer, a third layer comprising a second polymer disposed on the second layer, and a fourth layer comprising a pigment that is not embedded disposed on the third layer. As another example, a composite article may comprise a first layer comprising a first polymer, a second layer comprising a first pigment disposed on the first layer, a third layer comprising a second polymer disposed on the second layer, a fourth layer comprising a second pigment disposed on the third layer, a fifth layer comprising a third polymer disposed on the fourth layer, and a sixth layer comprising a third pigment that is not embedded disposed on the fifth layer. When a composite article comprises more than one layer comprising a pigment, an upper layer comprising a pigment may cover a portion or all of the gaps in a lower layer on which it is disposed. Without wishing to be bound by any particular theory, it is believed that an composite article wish such a design may have the appearance of solid infill, may have enhanced depth, and/or may have enhanced texture. FIG. 9B shows one example of a method that may be employed to form a composite article including two layers comprising pigment that is embedded and one layer comprising pigment that is not embedded. In FIG. 9B, each layer is deposited sequentially on the layer beneath.

In certain embodiments, a composite article may comprise two or more layers comprising a pigment that are directly adjacent to each other. In some such embodiments, the layers comprising a pigment may form a stack in which there are no intervening layers between the layers comprising the pigments. It should be understood that one or more (or all) of the layers comprising a pigment may be discontinuous layers (layers comprising pigment particles, layers comprising islands of pigment). In some cases, the layers comprising a pigment may be discontinuous and may be in the form of stack that has a thickness sufficient to impart texture to the composite article. In other words, portions of the composite article in which pigment is present (embedded or not embedded) may protrude above portions of the composite article in which pigment is absent or present to a lesser degree.

In some embodiments, a second pigment may be disposed on a first pigment (e.g., it may be directly adjacent to the first pigment), and neither the first pigment nor the second pigment may be in the form of a layer.

When two or more layers comprising a pigment are present, each layer may comprise the same pigment (or pigments), each layer may comprise a different pigment (or combination of pigments), and/or some layers may comprise the same pigment (or combination of pigments) as certain other layers and comprise a different pigment (or combination of pigments) from certain other layers. When two or more layers comprising a pigment are present, all of the layers may not be embedded (e.g., the outermost layer comprising a pigment may be on an exterior surface of the composite article, and each other layer comprising pigment may be either directly adjacent to the outermost layer comprising the pigment or separated from the outermost layer comprising the pigment exclusively by layers comprising a pigment), some of the layers may be embedded and some of the layers may not be embedded (e.g., the composite article may comprise some layers that are not embedded, some layers that are embedded, and the embedded layers may be separated from the layers that are not embedded by one or more layers comprising polymers), or all of the layers may be embedded.

Figure 9C:

FIG. 9C shows one non-limiting embodiment of a method of forming a composite article comprising three layers comprising an ink jet ink comprising a pigment. These layers are each discontinuous, directly adjacent to each other, and embedded. The layers comprise pigment particles and the pigment is in the form of islands. As described above, other configurations of composite articles comprising multiple layers comprising pigments are also possible. The first step shown in FIG. 9C is a step of providing a substrate (or providing a portion of a composite article, such as a layer comprising a polymer, on a substrate). In some embodiments, a layer comprising a polymer may be deposited onto the substrate (e.g., by spraying; not shown). Then, the layers comprising the ink jet ink are deposited sequentially onto the substrate (for instance, by an ink jetting process). Finally, a layer comprising a polymer is deposited onto the layers comprising the ink jet inks (for instance, by spraying). The layer comprising the polymer may be a flexible layer and/or may comprise a flexible polymer. In embodiments in which the ink jet ink is not embedded, the final step of depositing the polymer may be omitted. It should be understood that FIG. 9C is not limiting, and in some embodiments a composite article may comprise a layer comprising a translucent or clear ink jet ink directly adjacent to another layer comprising an ink jet ink (e.g., a clear ink jet ink, a translucent ink jet ink, an ink jet ink comprising a pigment). In some embodiments, a composite article may comprise at least two layers comprising a pigment that are directly adjacent to each other.

In some embodiments, a composite article comprises two or more layers comprising a pigment, and two or more of the layers comprising the pigments have different morphologies from each other. As an example, two or more layers comprising a pigment may have the same design, but one layer may be spatially offset from the other. As another example, a composite article may comprise multiple layers comprising a pigment arranged such that the layers comprising the pigment together form an aesthetic design and/or form a composite article with a desired texture. For instance, two or more layers comprising a pigment may be positioned with respect to each other such that they form a structure that extends from the surface of the composite article in a tapered manner. In other words, layers comprising a pigment may form structures that protrude from the composite article, and the protrusions may be tapered. In some embodiments, a composite article may comprise protrusions that form pyramid or mound-like structures. Without wishing to be bound by any particular theory, it is believed that protrusions, such as tapered protrusions, may provide one or more beneficial properties to a composite article within which they are positioned. For instance, certain protrusions may increase the friction of the exterior surface of the composite article on which they are present. This may be beneficial, for instance, for composite articles form a part of an article of footwear (e.g., soccer cleats, where a high level of friction between a cleat and a ball may enhance the spin of the ball) or apparel.

Figure 9D:
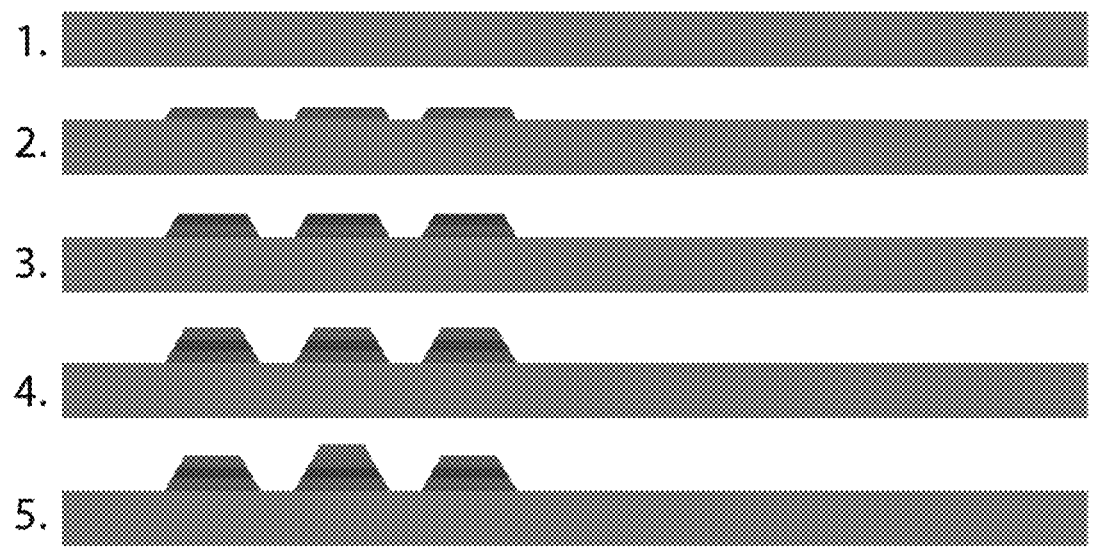

FIG. 9D shows one non-limiting embodiment of a method of forming a composite article comprising tapered protrusions which are formed from layers comprising pigment. The different layers comprising a pigment may have different coloration, and so may form an aesthetic design including multiple colors in addition to forming tapered protrusions, as shown in FIG. 9I). In some embodiments, the layers comprising a pigment may have the same coloration, and so may form protrusions that have uniform coloration. Tapered protrusions may comprise pigment that is not embedded, and/or may comprise pigment that is at least partially embedded.

In some embodiments, a method may comprise forming a composite article with a matte finish and/or a composite article may comprise a matte finish. Without wishing to be bound by any particular theory, it is believed that a composite article may have a matte finish when it comprises one or more layers that scatter light at a variety of angles. For instance, a composite article including a rough exterior surface may have a matte finish. In some embodiments, a composite article may comprise one or more layers at an exterior surface that enhance the surface roughness of the composite article. For instance, the composite article may comprise one or more layers comprising a material (e.g., a pigment, an ink jet ink) that enhance the roughness of the exterior surface, such as one or more layers that are discontinuous (e.g., layers comprising pigment particles, layers comprising islands of pigment, layers comprising ink jet ink particles, layers comprising islands of ink jet ink). In some embodiments, the one or more layers comprising an ink jet ink (e.g., one or more discontinuous layers comprising an ink jet ink) may comprise a clear ink jet ink and/or a translucent. Such layers may appear translucent.

It should be understood that layers that cause the composite article to have a matte finish (e.g., layers that comprise a clear ink jet ink and/or a translucent ink jet ink, and/or layers that are discontinuous), when present, may have all, some, or none of the characteristics described herein with respect to layers comprising a pigment or ink jet ink. For instance, a composite article may comprise one or more layers that cause the article to have a matte finish that comprise an ink jet ink (e.g., a clear ink jet ink, a translucent ink jet ink) that is not embedded, and/or may comprise one or more layers that cause the article to have a matte finish comprise an ink jet ink (e.g., a clear ink jet ink, a translucent ink jet ink) that is at least partially embedded. As another example, when a composite article comprises two or more layers that cause the composite article to have a matte finish (e.g., two or more layers comprising a clear ink jet ink, such as two or more discontinuous layers comprising clear ink jet ink and/or two or more layers comprising islands of clear ink jet ink; two or more layers comprising a translucent ink jet ink, such as two or more discontinuous layers comprising translucent ink jet ink and/or two or more layers comprising islands of translucent ink jet ink), such layers may be directly adjacent to each other or such layers may be separated by one or more intervening layers. As a third example, a composite article may comprise two or more layers that cause the composite article to have a matte finish (e.g., two or more layers comprising a clear ink jet ink, such as two or more discontinuous layers comprising clear ink jet ink and/or two or more layers comprising islands of clear ink jet ink; two or more layers comprising a translucent ink jet ink, such as two or more discontinuous layers comprising translucent ink jet ink and/or two or more layers comprising islands of translucent ink jet ink), and such layers may form protrusions.

Figure 9E:
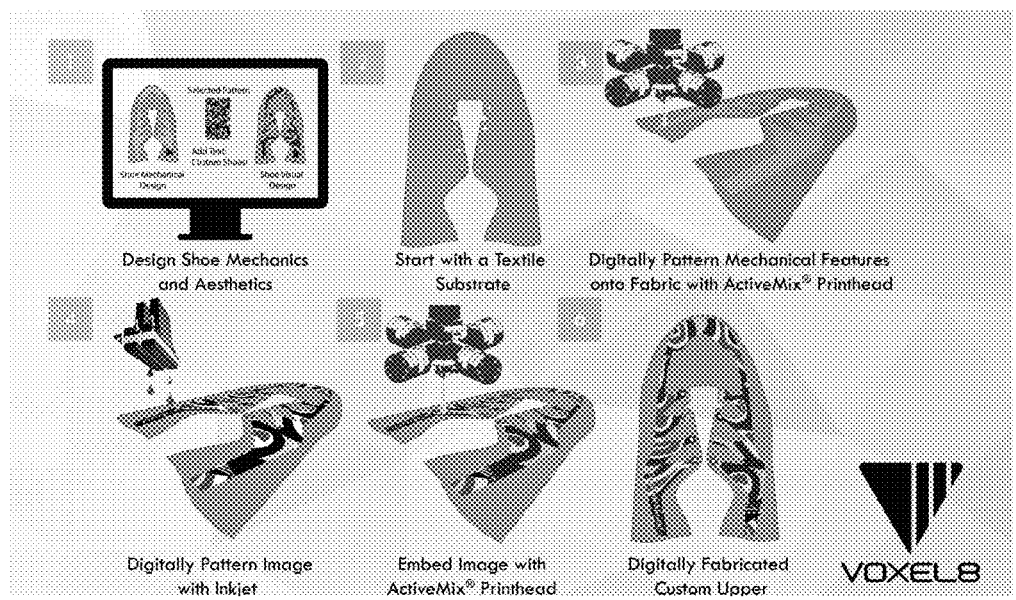

One possible method of forming a composite article with a matte finish directly follows. The method commences by providing a substrate which, may be a textile. Then, a layer is deposited onto the textile. This layer may be a layer comprising a polymer. It may be deposited by spraying, or from a mixing nozzle. Then, a pattern may be selected. This step will be described in further detail below. Next, one or more layers comprising a pigment are deposited onto the layer comprising the polymer. The pigment is arranged within the layers comprising the pigment in a manner such that the composite article appears to have the pattern selected in the third step. Finally, one or more layers are deposited that cause the composite article to have a matte finish. These layer(s) may be layers that comprise a clear and/or translucent ink jet ink and/or layers that are discontinuous (e.g., layers that comprise clear ink jet ink particles and/or comprise islands of clear ink jet ink; layers that comprise translucent ink jet ink particles and/or comprise islands of translucent ink jet ink). FIG. 9E shows a process similar to that described above, except that the pattern is selected as the first step in the method. During pattern selection, a consumer may design the mechanics and/or aesthetics of the composite article.

In some embodiments, a material (e.g., a curable composition, a polymer, a pigment, an ink jet ink) may be deposited onto a substrate such that at least a portion of the material and/or a cured form of the material penetrates into an interior of the substrate. By way of example, in the case of a substrate that comprises a fabric and a polymer, a method may comprise depositing the polymer onto the fabric such that it penetrates into an interior thereof. Similarly, some composite articles comprise a substrate into which at least a portion of a deposited material penetrates (e.g., a fabric comprising an interior into which at least a portion of a polymer penetrates). Penetration of the material into the substrate may be achieved by selecting a substrate which comprises one or more pores and/or openings into which the material can penetrate, and depositing the material in a manner such that it penetrates into the pores and/or openings. For instance, the material to be deposited may be deposited while in a liquid state and while having a viscosity that allows for penetration (e.g., via capillary forces and/or gravity). By way of example, a curable composition may be deposited onto a fabric (e.g., by spraying), and the viscosity of the sprayed composition (e.g., a curable composition, a composition comprising a solvent and a polymer) may be sufficiently low to such that the composition infiltrates into the pores of the fabric. As another example, penetration of a material into a substrate may be aided by the application of pressure from a compressed gas lens. As described above, after penetration, the material may be further cured such that it has a viscosity that it does not penetrate further into the substrate.

When a material, such as a polymer, penetrates into an interior of a substrate, such as a fabric, it may do so in a variety of suitable manners. The material may penetrate into only a portion of the interior of the substrate, or may penetrate throughout the entirety of the interior of the substrate. For instance, the material may penetrate throughout the full thickness of the substrate, or may only penetrate throughout a portion of the thickness of the substrate. As another example, the material may penetrate across the full area of the substrate (e.g., the area perpendicular to the thickness) or may only penetrate into one or more portions of the area of the substrate. In some embodiments, the material both penetrates into the interior of the substrate and be at least partially disposed on a surface of the substrate (e.g., it may also form a layer disposed thereon). In other words, a portion of the material may penetrate into the interior of the substrate and a portion of the material may not penetrate into the interior of the substrate. In some embodiments, the material is present at a surface of the substrate but is not disposed thereon and/or all of the material is located in the interior of the substrate.

When a material penetrates into a substrate, it may adhere together the portion or portions of the substrate into which it penetrates. By way of example, in the case of a polymer penetrating into a fabric, the polymer may adhere together the portion(s) of the fabric into which it penetrates. For instance, the fabric may comprise a plurality of fibers (e.g., a plurality of woven fibers, a plurality of knitted fibers, a plurality of non-woven fibers), and the polymer may adhere together the plurality of fibers in the portion(s) of the fabric into which it penetrates. One way in which this may be accomplished is by depositing a curable composition (e.g., an uncured curable composition, a partially cured curable composition) onto the fabric having a viscosity sufficiently low to allow penetration of the polymer therein, allowing the polymer to penetrate into the fabric, and then curing the polymer to completion. Curing of the polymer after penetration into the fabric may cause the polymer to form bonds with the fibers in the fabric, thus adhering the plurality of fibers in the portions of the fabric into which it penetrates together and to the polymer.

Adhering together portions of a fabric substrate may be desirable for a number of reasons. For instance, if the material (e.g., the polymer) is stiffer than the fabric, it may advantageously stiffen (e.g., in tension and/or bending) the portion(s) of the fabric into which it penetrates. Typically, fabric is easily deformable because the fibers therein can slip past each other. The fabric has little resistance to compression and little resistance to tension until the fibers are fully straightened (at which point, the fabric resists further deformation with a stiffness equal to that of the material forming the fibers). When a material, such as a polymer, adheres the fibers together, they can no longer slip past each other without breaking the polymer apart and so may exhibit enhanced resistance to tension and/or compression. Loads applied to a composite article comprising a polymer adhering fibers in a fabric together may be at least partially transferred to the polymer, which, if stiffer than the fibers, enhances the stiffness of the portion(s) comprising the fibers adhered together of the composite article and/or of the composite article as a whole. This may be advantageous for forming 3D-structures, such as 3D-structures that are freestanding. In some embodiments, portions of a fabric adhered together, such as by a polymer, may be resistant to fraying and/or may be configured to be cut to form an edge that is resistant to fraying. The polymer may bond the fibers that would otherwise fray together. Upon cutting the composite article comprising the fabric substrate and the polymer, the polymer may prevent the fibers from unweaving and/or unknitting and/or may hold them in place.

In some embodiments, it may be advantageous for a material to penetrate into one or more portions of a substrate and not penetrate into other portions of the substrate. As described above, in the case of a polymer penetrating into a fabric, the polymer may adhere together the portion(s) of the plurality of fibers in the portion(s) of the fabric into which it penetrates. In some embodiments, the portion(s) of the plurality of fibers in the portion(s) of the fabric into which it doesn't penetrate are not in contact with the polymer. This may allow for the development of fabrics having different regions of different stiffnesses. Regions into which a polymer has penetrated may be stiffened by the polymer, and so may be stiffer than regions into which the polymer did not penetrate. This may be advantageous for some articles of apparel, such as footwear in which it is desirable for a heel counter, an eyestay, and/or a quarter panel to be stiffer than portion(s) of fabric to which it is adjacent. Other articles of apparel for which this may be advantageous include compression clothing. It should be noted that the methods described herein may comprise a step of depositing a polymer by spraying the polymer, and/or may comprise a step of depositing a polymer by employing a direct write process. References herein to printing a material (e.g., a polymer, a pigment), unless otherwise specified, should be understood to refer to any suitable method of depositing the material, including depositing the material by a direct write process, depositing the material by a spraying process, and/or depositing the material by an ink jet process.

In some embodiments, a material, such as a polymer, may be deposited onto a substrate such as a fabric, into which it does not penetrate at all.

In one embodiment, a polymer is deposited to form a layer on a substrate by spraying or printing. Then, a pigment and/or ink jet ink is deposited onto the layer comprising the polymer by an ink jet process before the layer comprising the polymer is fully solidified. For instance, the layer comprising the polymer may further comprise a solvent and/or may be partially uncured. In some embodiments, the diffusivity of the pigment in the layer comprising the polymer may be enhanced relative to the diffusivity of the pigment in the layer comprising the polymer after the solvent therein evaporates and/or it is fully cured. The pigment may diffuse into the polymer layer such that the pigment cures inside the sprayed layer and retains the mechanical properties of the sprayed layer. In some embodiments, the pigment may bond to polymer layer as the polymer layer cures. In certain embodiments, the pigment may be at least partially embedded in the polymer layer.

In another embodiment, a polymer is deposited to form a layer on a substrate by spraying or printing. The layer comprising the polymer may then at least partially dry and/or at least partially cure. Then, a pigment may be deposited onto the layer comprising the polymer by an ink jet process. In some embodiments, the pigment may be in particulate form. Next, a second layer comprising a polymer may be deposited onto the pigment (e.g., by spraying and/or by a direct write process). The polymer may, in some cases, form a matrix in which pigment particles are distributed. In some embodiments, the layer comprising the polymer onto which the pigment is deposited and the layer comprising the polymer deposited onto the pigment may enclose the layer comprising the pigment. In other words, a composite article may comprise a layer comprising a pigment positioned between two layers comprising polymers. The polymers in these two layers may be the same, or they may be different.

In some embodiments, a method may comprise a step in which there is dynamic or passive mixing. The dynamic or passive mixing may blend together two or more polymer precursors (e.g., it may blend together one or more isocyanate prepolymers and one or more polyols, such as two or more isocyanate prepolymers and one or more polyol). The mixed material may then flow into a nozzle that has compressed gas flowing through it (e.g., continuously). The compressed gas may atomize the reactive polyurethane into droplets that may be deposited. The droplets may then be deposited onto the substrate such that they reacts after landing on the substrate. The material properties may be changed during deposition.

In some embodiments, a method may comprise performing one or more steps (e.g., a polymer deposition step, a pigment deposition step) on top of three dimensional features that already exist on the substrate. The three dimensional features may comprise features inherent to the substrate (e.g., roughness of the substrate), features printed using a direct write process, and/or features that were made through molding or stitching.

In some embodiments, a method may comprise forming a reactive polyurethane elastomer. For instance, one or more layers comprising a polymer may comprise a polyurethane such as a reactive polyurethane. The reactive polyurethane elastomer may be formed from a 4-input dynamic mixing print head. The print head may be configured to blend isocyanate prepolymers and polyols with outlet of the mixing chamber flowing into a spray nozzle. A compressed gas (e.g., air, nitrogen, or steam) may atomize the polyurethane into a shaped cone of material for deposition.

In some embodiments, one or more materials (e.g., a pigment, a plurality of pigment particles, an ink jet ink) may be deposited by an ink jetting process. The composition deposited by the ink jetting process may comprise a pigment. In some embodiments, the composition deposited by the ink jetting process may further comprise one or more additional components, such as a UV-curable resin, a polymer, and/or a solvent in which one or more components are dissolved and/or suspended.

In some embodiments, one or more materials may be deposited through a spray nozzle. The spray nozzle may have two or more inputs to the spray head (e.g., an input for a material to be deposited, an input for a compressed gas that atomizes the deposited material). In this case, the deposited material may be a one part latent curing or drying system, or it could also be a multicomponent system that is blended together directly before entering the spray head. By way of example, a method may comprise spraying a curable composition and/or a polymer onto a substrate. The composition may further comprise one or more additional components, such as a pigment and/or an ink jet ink. Composite articles formed by such methods, or other methods, may comprise a portion (e.g., a layer) comprising the pigment and/or ink jet ink dispersed throughout the polymer. The pigment and/or ink jet ink dispersed throughout the polymer may be uniformly dispersed therein.

In some embodiments, it may be desirable to form composite articles comprising a layer having a pigment and/or ink jet ink dispersed uniformly therein. For instance, such layers may be relatively uniformly colored. Such layers may advantageously provide a colored background and/or a colored overlayer for further layers deposited thereon, such as further layers comprising patterns. In some embodiments, a composite article may comprise a pattern formed at a first, larger, length scale by spraying (e.g., by spraying a curable composition comprising an ink jet ink and/or a pigment, by spraying a composition comprising a polymer and an ink jet ink and/or a pigment) and a second pattern formed at a second, smaller, length scale by ink jetting.

Patterns formed by spraying may have a variety of suitable feature sizes. In some embodiments, a pattern formed by spraying has a feature size of greater than or equal to 0.1 mm, greater than or equal to 0.2 mm, greater than or equal to 0.5 mm, greater than or equal to 1 mm, greater than or equal to 2 mm, greater than or equal to 5 mm, greater than or equal to 10 mm, greater than or equal to 20 mm, greater than or equal to 50 mm, greater than or equal to 100 mm, greater than or equal to 200 mm, greater than or equal to 500 mm, greater than or equal to 1 cm, greater than or equal to 2 cm, or greater than or equal to 5 cm. In some embodiments, a pattern formed by spraying has a feature size of less than or equal to 10 cm, less than or equal to 5 cm, less than or equal to 2 cm, less than or equal to 1 cm, less than or equal to 500 mm, less than or equal to 200 mm, less than or equal to 100 mm, less than or equal to 50 mm, less than or equal to 20 mm, less than or equal to 10 mm, less than or equal to 5 mm, less than or equal to 2 mm, less than or equal to 1 mm, less than or equal to 0.5 mm, or less than or equal to 0.2 mm. Combinations of the above-referenced ranges are also possible (e.g., greater than or equal to 0.1 mm and less than or equal to 10 cm). Other ranges are al so possible.

Patterns formed by ink jetting may have feature sizes that are smaller than those of patterns formed by spraying. For instance, a pattern formed by spraying may have a feature size of less than or equal to 1 mm, less than or equal to 500 microns, less than or equal to 200 microns, less than or equal to 100 microns, less than or equal to 50 microns, or less than or equal to 20 microns. In some embodiments, a pattern formed by ink jetting has a feature size of greater than or equal to 10 microns, greater than or equal to 20 microns, greater than or equal to 50 microns, greater than or equal to 100 microns, greater than or equal to 200 microns, or greater than or equal to 500 microns. Combinations of the above-referenced ranges are also possible (e.g., less than or equal to 1 mm and greater than or equal to 10 microns). Other ranges are also possible.

In some embodiments, a multicomponent spray head may have multiple inputs that comprise components to be mixed together to form a material that is deposited and have one or more inputs for compressed gas. In this case the material may be mixed by directly impinging the streams of material that are sprayed through one another. Some mixing may occur through turbulence of intersecting droplets. Some mixing may occur through diffusion of droplets as they land and spread on the substrate. In the case where there are more than 2 inputs, the material properties of the sprayed substance can be changed by changing the ratios of the 3 or more inputs. For example, one input could be isocyanate prepolymer, another input could be a high molecular weight polyol blend, and a third input could be a low molecular weight polyol blend or chain extender.

In some embodiments, one or more materials may be deposited by a direct ink writing (or nozzle extrusion) process. For instance, one or more reactive materials (e.g., precursors for polymers) may be deposited to form a base layer. Then one or more materials (e.g., one or more pigments) may be deposited by an ink jet process into and/or onto the base layer. Then, another material may be deposited by an direct ink write process and/or an extrusion process onto the material deposited by the ink jet process. This material may be, in some embodiments, translucent. In some embodiments, the base layer may comprise more than one layer (e.g., it may comprise multiple layers) and/or may comprise a three-dimensional structure.

In some embodiments, a process as described herein may comprise a step in which a pigment is fragmented. In certain cases, the pigment may be fragmented to form particles or islands. Fragmentation may allow the formation of an ink-jettable pigmented material with poor elongation and repetitive flex properties to be used in an application where beneficial elongation and/or repetitive flex properties are required or desirable. Repeated flex might cause a non-robust ink jetted material to break into pieces. Each piece of broken material may not stretch and/or may not need to stretch; areas of robust material in between the fragments or islands, such as a polymer, can stretch instead. For instance, an operator may determine an image that they want to print, break the desired image apart into many small pieces that are closely spaced, but not connecting, and instead print the broken apart image. From a distance, this broken apart image may look like a solid image, but when the material experiences strain, it may occur in between the fragments or islands (e.g., particles) of pigmented material rather than fracturing the pigmented material on a macro scale. A software pipeline can be used to break these images into fragmented pieces based on the material properties of the materials used and the expected strain based on the application. In some embodiments, images that comprise multiple colors may be fragmented and laid on top of one another, and/or placed in close proximity to one another. In some embodiments, employing a process as described herein may enable an operator to obtain a full color range.

In some embodiments, a process as described herein may comprise a step in which an ink jet ink is fragmented. In certain cases, the ink jet ink may be fragmented to form particles or islands.

Some articles described herein may not be composite articles and/or some methods may be employed to fabricate articles other than composite articles. For instance, some articles described herein may lack an ink jet ink and some methods may not include any ink jetting steps. Some exemplary methods and the articles that they may be used to produce are described in further detail below. These methods may be performed without inclusion of an ink jetting step; however, in some embodiments an ink jetting step may be performed in conjunction with the methods described below. Similarly, some of the articles described below may lack features formed by an ink jetting step and/or may lack an ink jet ink, while others may include features formed by an ink jetting step and/or include an ink jet ink.

Some methods below may comprise one or more steps in which a polymer is sprayed onto a substrate. Spraying may comprise spraying a composition comprising a polymer, such as a thermoplastic polymer, and/or may comprise spraying a curable composition and then curing the curable composition.

In some embodiments, a method comprises spraying a polymer onto a fabric to form one or more advantageous features. The advantageous features may be features that could not be formed by other methods, features for which formation by spraying is less expensive and/or more facile than other methods of formation, and/or features that may be desirable to fabricate on a digital printing system described herein. In some embodiments, the advantageous feature is a waterproof feature. Methods of forming waterproof features may comprise spraying a waterproof polymer onto one or more desirable locations on a substrate. The desirable location may be a seam between two substrates (e.g., a seam between two pieces of fabric). Spraying a waterproof polymer onto one side of the seam to form a waterproof polymer-coated seam may form a waterproof barrier over the seam.

In some embodiments, it may be desirable to form an article including some portions that are waterproof and some portions that are permeable to water. Such articles may allow sweat to wick through the portions permeable to water, while preventing sweat from wicking through the waterproof portions. A method of forming an article including some portions that are waterproof and some portions that are permeable to water may comprise spraying a polymer (e.g., a waterproof polymer) onto a portion of a substrate (e.g., a substrate permeable to water, such as a fabric permeable to water) to cover the substrate. The polymer may be sprayed such that one or more portions of the substrate are covered by the polymer and one or more portions of the substrate remain uncovered by the polymer. The portions of the substrate covered by the polymer may be waterproof, and the portions of the substrate uncovered by the fabric may be permeable to water.

In some embodiments, a polymer is sprayed onto a substrate to provide a structural feature to the substrate. By way of example, a polymer may be sprayed onto an interface between two substrates (e.g., two pieces of fabric) two adhere together the two pieces of substrates. If the polymer is waterproof, it may adhere the two substrates together along a waterproof interface. During the spraying process, the two pieces of fabric may be positioned side-by-side, may touch each other, may overlap with each other, and/or may not be in contact with each other. Non-limiting examples of pieces of fabric that may be adhered together by spraying include an upper and a tongue, and an upper and a strobel sock.

As another example, a polymer may be sprayed onto a substrate, such as a textile, to form a feature including a portion with a mechanical property other than that of the substrate. For instance, the feature may include a portion with a tensile elastic modulus greater than that of the substrate and/or with a greater flexural stiffness than that of the substrate. The feature may be useful as a grip (e.g., in articles of apparel such as shoes and/or gloves) and/or may assist with body shaping (e.g., in articles of apparel such as pants, shirts, jeans, leggings, bras, and/or bralettes). In some embodiments, the feature may provide reinforcement in a desirable location, such as internal eyestays, internal toe caps, internal heel counters, and internal toe boxes in articles of footwear. When the feature is positioned in an article of apparel, it may be positioned in the interior of the article of apparel (e.g., in a portion of the article of apparel configured to directly contact the wearer of the article of apparel) and/or on an exterior of the article of apparel (e.g., in a portion of the article of apparel configured to be visible when the article of apparel is worn). For instance, two examples of suitable features are internal reinforcements (positioned in the interior of the article of apparel) and external reinforcements (positioned on an exterior of the article of apparel). The polymer may also include one or more features having a mechanical property identical to that of the substrate and/or with a value less than that of the substrate. Such portions may assist the polymer in blending smoothly into the substrate at one or more termini thereof. When the polymer includes multiple portions with differing mechanical properties, there may be a gradient in stiffness therebetween.

As a third example, a polymer may be sprayed onto a substrate that is a fabric in order to form a lining layer for an article of apparel. The lining layer may be relatively stiff, and so may limit the deformation of the article of apparel when worn. This property may be advantageous, for instance, if the article of apparel comprises one or more conductive pathways that could be damaged by stretching. In some embodiments, the lining layer may encapsulate one or more portions of the article of apparel (e.g., from the wearer, from an environment external to the wearer). The portions of the article encapsulated may be sensitive portions, such as conductive materials.

As a fourth example, a polymer may be sprayed onto a substrate in order to give the substrate a non-flat shape (e.g., a 3D-structure). The substrate may be draped over a non-flat support, and then a polymer may be sprayed onto the substrate to form an article comprising the substrate and the polymer. This article may have a non-flat shape indicative of at least a portion of the non-flat support. For instance, the article may have a non-flat shape that mirrors the curvature of one or more portions of the non-flat support and/or may include one or more protrusions and/or indentations indicative of protrusions and/or indentations present on the support. The shape of the article as a whole may be maintained by the polymer. For instance, the polymer may be relatively stiff, and may form a non-flat shape on the substrate after being sprayed thereon. Upon removal of the substrate from the support, the polymer may maintain the non-flat shape and may cause the article as a whole to have the non-flat shape. Portions of the substrate not sprayed with polymer may not maintain a shape indicative of the non-flat support.

Non-limiting examples of suitable articles that may be have a non-flat shape include articles of apparel (e.g., bras, pants, leggings) and articles of footwear. The structure with the non-flat shape indicative of at least a portion of the non-flat support may be a heel counter.

Non-limiting examples of non-flat supports that may be employed include shoe lasts and body models. The non-flat supports may have standard sizes, or may be custom sized for a particular wearer of the resultant articles of footwear or apparel.

In some embodiments, a method comprises spraying a polymer onto a substrate that is configured to adhere to the substrate, and then depositing a material onto the sprayed polymer that adheres to the polymer. The material deposited onto the sprayed polymer may not adhere to the substrate in the absence of the sprayed polymer, but the sprayed polymer may adhere the two together. The sprayed polymer may be an amphiphilic polymer, or may be a polymer comprising some functional groups configured to bond well to the substrate and some functional groups configured to bond well to the material to be deposited thereon. Non-limiting examples of suitable substrates on which this technique may be applied include laptops, phone cases, lighters, and plaques.

In some embodiments, a method comprises spraying a polymer onto a substrate to form a structural feature on the substrate. The structural feature may change the surface topography of the substrate and/or may emboss the substrate.

Certain embodiments relate to software that is configured to allow an operator to fabricate a composite article with a desired morphology (e.g., an article of footwear with a desired morphology, an article of apparel with a desired morphology). The software may allow a consumer to send instructions to a system (or to an intermediary that sends the instructions to a system) to fabricate a composite article with a design of their choosing. The software may be configured to send instructions to a printer that includes certain parameters that are predefined, and/or that includes certain parameters selected by the customer or selected by data gathered about the intended user. Non-limiting examples of data gathered about the intended user include data related to the health of the intended user, data related to the walking or running style of the intended user, and data related to the wear patterns of shoes worn previously by the intended user. Non-limiting examples of parameters that may be selected by the customer or selected by data gathered about the intended user include an image positioned on an exterior surface of the composite article (e.g., an image positioned on an exterior surface of the composite article configured to be on an exterior surface of an article of footwear or an article of apparel, an image positioned on an exterior surface of the composite article configured to be on an interior surface of an article of footwear or an article of apparel), the stiffness of the composite article as a whole, the stiffness of certain portions of the composite article, the stiffness gradient over the composite article as a whole, and the stiffness gradient over certain portions of the composite article.

In some embodiments, a system as described herein may comprise a spray head that can vary one or more materials properties continuously without stopping spraying and/or a method may comprise varying one or more materials properties of a polymer or pigment during deposition thereof. Certain embodiments may be related to composite articles with a gradient one or more properties, and/or to composite articles in which a portion of the composite article (e.g., a layer comprising a polymer) has a gradient in one or more properties. For instance, relative amounts of different polymers or precursors for polymers may be varied during spraying, and the resultant polymer that is deposited may have a spatially varying chemical composition and/or spatially varying materials properties. Other methods for varying polymer and/or composite article methods may also be employed, such as varying the time and/or rate at which a polymer deposited on a substrate is cured. By way of example, a composite article may comprise a gradient in a mechanical property, an optical property, or a structural property. In some embodiments, the materials properties that may be varied include one or more of stiffness (e.g., average stiffness), color, and matte finish. Other examples of properties of a polymer and/or composite article that may vary along a gradient include average Shore A hardness, average Shore D hardness, average Asker C hardness, average density, average surface roughness, average reflectivity, average strength, average elongation at break, average tensile elastic modulus, and average modulus at 100% strain. In some embodiments, the materials properties that may be varied include one or more of the materials properties described in U.S. Provisional Patent Application No. 62/555,897 entitled "Systems and Methods for 3D Printing Articles of Footwear with Property Gradients", incorporated herein in its entirety. In some embodiments, a composite article described herein comprises a gradient in one or more properties, such as a gradient described in U.S. Provisional Patent Application No. 62/555,897 entitled "Systems and Methods for 3D Minting Articles of Footwear with Property Gradients".

When a composite article (and/or a polymer therein) comprises a gradient, the gradient may have a variety of suitable geometries. For instance, the gradient may comprise a component parallel to a surface of the composite article and/or parallel to a surface of one or more components of the composite article (e.g., a surface of a fabric forming a portion of the composite article). In some embodiments, the gradient comprises a component perpendicular to a surface of the composite article and/or perpendicular to a surface of one or more components of the composite article (e.g., a surface of a fabric forming a portion of the composite article). For some composite articles, the gradient is be substantially parallel to a surface of the composite article and/or substantially parallel to a surface of one or more components of the composite article (e.g., a surface of a fabric forming a portion of the composite article). In other words, if the gradient comprises a component perpendicular to a surface of the composite article and/or perpendicular to a surface of one or more components of the composite article (e.g., a surface of a fabric forming a portion of the composite article), the magnitude of that component is less than 10%, less than 5%, less than 2%, or less than 1% of the magnitude of the component of the gradient parallel to a surface of the composite article and/or parallel to a surface of one or more components of the composite article (e.g., a surface of a fabric forming a portion of the composite article). The gradient pass through the composite article along a pathway that is straight, or it may pass through the composite article along a pathway that includes one or more curves or corners. In some embodiments, the gradient may pass through the composite article along a pathway along which a component of the composite article (e.g., a polymer, an ink jet ink, a pigment) was deposited during formation of the composite article, such as a pathway travelled by a print head (or by a substrate with respect to the print head) during 3D-printing.

It should be understood that composite articles may comprise gradients that are smooth (e.g., gradients lacking an interface over which the property having the gradient undergoes a step change) and/or may include gradients that comprise one or more step changes.

In some embodiments, a system as described herein may comprise a mixing head configured to receive two or more inputs, such as three or more inputs, or four or more inputs. The mixing head may be positioned upstream of an input to a spray nozzle. In some embodiments, the mixing head may be an active mixing head. In some embodiments, a method may comprise depositing a material through an active mixing head (e.g., depositing a polymer, such as a polyurethane that is optionally a reactive polyurethane).

In some embodiments, an article as described herein may comprise a material deposited by an ink jet process (e.g., a pigment, an ink jet ink) that is positioned between two layers (e.g., layers comprising polymers) deposited by a non-ink jet process (e.g., one or more layers deposited by a spray process, one or more layers deposited by a direct write process, one or more layers comprising a polymer).

In some embodiments, an article as described herein may comprise one or more particles of material deposited by an ink jet process (e.g., one or more particles of pigment, one or more particles of ink jet ink) that are fragmented to form islands. The particles and/or islands may be embedded between one or more materials (e.g., one or more polymers deposited by a non-ink jet process (e.g., a spray process, a direct write process). This process may integrate pigment half toning into deposited polymers (e.g., sprayed polyurethane structures), and/or may increase the mechanical robustness of the composite article and/or the abrasion resistance of the composite article.

In some embodiments, a method as described herein may comprise depositing a pigment by an ink jet process onto a partially uncured layer of sprayed or printed material (e.g., a partially uncured layer of a sprayed or printed polymer) such that the pigmented material diffuses into the uncured layer.

In some embodiments, an article as described herein, such as a composite article described herein may comprise a component of an article of footwear, an article of apparel, a bag, a glove, or a sporting good. The article described herein may be an article of apparel and/or may be a portion of an article of apparel. Non-limiting examples of suitable articles of apparel include shirts, pairs of pants, gloves, and bras. In some embodiments, the article described herein is an article of footwear and/or is a portion of an article of footwear. Non-limiting examples of suitable portions of articles of footwear include uppers (and/or portions thereof) and heel counters (and/or portions thereof).

In some embodiments, a method as described herein may be employed to form an article of footwear, an article of apparel, a bag, a glove, or a sporting good (and/or a component of an article of footwear, an article of apparel, a bag, a glove, or a sporting good).

In some embodiments, a method as described herein may be employed to form an article comprising two or more pigments of different colors.

In some embodiments, a method as described herein may be employed to enhance the smoothness of a surface of a 3D-printed article, and/or may be employed to form a desired color or pattern on the surface of a 3D-printed article. For instance, a process comprising a step of spraying a polymer may be employed for this purpose. As another example, a process comprising a step of spraying a polymer, depositing one or more particles of pigment by an ink jet process onto the polymer deposited by spraying, and then spraying a polymer onto the particles of pigment may be employed for this purpose. As a third example, a process comprising a step of spraying a polymer, depositing one or more particles of ink jet ink by an ink jet process onto the polymer deposited by spraying, and then spraying a polymer onto the particles of ink jet ink may be employed for this purpose.

In certain embodiments, a composite article as described herein may be produced on a multi-axis deposition system, a method as described herein may include at least one step that is performed on a multi-axis deposition system, and/or a system as described herein may comprise one or more components of a multi-axis system. Further features of multi-axis deposition systems are described below. It should be understood that suitable systems for use in forming composite articles described herein, suitable systems for performing methods described herein, and suitable systems described herein may have all, some, or none of the features described below.

In some embodiments, a multi-axis system may comprise a mixing nozzle, an ink jet head, and a compressed gas source, and/or may be configured to deposit a pigment and/or ink jet ink by an ink jet process and/or a polymer by a spray process. In general, and as described further below, multi-axis deposition systems include a print head and a substrate. The print head may be any suitable print head configured to deposit a material onto the substrate. The substrate may be any suitable substrate onto which a material may be deposited; in some embodiments, one or more articles (e.g., a component of an article of footwear, an upper, a sock liner) may be disposed on the substrate. In certain embodiments, one or both of the print head and substrate may be translated along one or more axes and/or rotated around one or more axes. Translation and/or rotation of the print head and/or substrate may enable the position of the print head with respect to the substrate to be changed prior to, during, and/or after a printing process. In some cases, translation and/or rotation of the print head and/or the substrate may allow the print head to deposit material onto a wide variety of substrate surfaces and/or allow the print head to deposit material onto the substrate at a wide variety of angles. In some embodiments, the print head may be configured to be rotated and/or translated such that it can deposit material onto each surface of the substrate.

Figure 10:
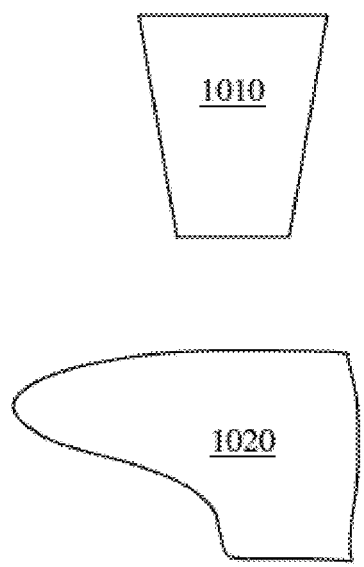
FIG. 10 is a schematic depiction of a print head and a substrate, according to certain embodiments of the invention.

FIG. 10 shows one non-limiting embodiment of a multi-axis deposition system 1000 comprising print head 1010 and substrate 1020. The print head, substrate, and multi-axis deposition system will be described in further detail below.

A print head in a multi-axis deposition system may be any suitable print head configured to deposit a material of interest onto the substrate. In some embodiments a multi-axis deposition system may comprise two or more print heads. For instance, a multi-axis deposition system may comprise an ink jet head and a spray nozzle. Non-limiting examples of suitable print heads include a spray nozzle, an ink jet head, a direct write head, a mixing nozzle, an ink jet head, a spray valve, an aerosol jet print head, a cutting head (e.g., a laser cutting head), a hot air gun, a hot knife, an ultrasonic knife, a sanding head, a polishing head, a UV curing device, an engraver, an embosser, and the like. In some embodiments, it may be advantageous for the multi-axis deposition system to comprise a first print head that is and/or comprises a mixing nozzle and a second print head that does not comprise a mixing nozzle. As described elsewhere herein, in some embodiments, the print head may be configured to accept one or more material inputs (e.g., one material input, two material inputs, etc.). When two or more material inputs are present, the inputs may be substantially the same or they may differ. In some embodiments, the print head may be configured to mix two or more reactive material inputs to form a reactive mixture that may be deposited onto a substrate while the first and second material inputs are reacting and/or after the first and second material inputs have reacted. For example, the print head may be configured to mix a polyol and an isocyanate to form a reactive polyurethane mixture. Other examples of suitable reactive mixtures include reactive polyurea mixtures, reactive mixtures comprising reactive polyurethane and reactive polyurea blends, reactive mixtures comprising epoxy groups and amine groups, and reactive silicone mixtures.

A substrate in a multi-axis deposition system may be any suitable substrate capable of receiving the material deposited by the print head. In some cases, the substrate may have a shape that enables facile deposition of the material of interest in a morphology of interest by the print head. As an example, the substrate may have a shape that substantially corresponds to the morphology of interest, such as a footwear last for footwear applications (e.g., as shown in FIG. 10), a bra cup for sports bra applications and/or for bra lining applications, an article substantially corresponding to the shape of a knee for knee brace applications, an article substantially corresponding to the shape of an ankle for ankle brace applications, an article substantially corresponding to the shape of a wrist for wrist brace applications, an article substantially corresponding to the shape of a shoulder for shoulder brace applications, and/or an article substantially corresponding to the shape of an arm for arm band applications. As another example, the substrate may be a mold or a portion of a mold. As a third example, the substrate may comprise a portion that is curved, and/or the substrate as a whole be curved. For instance, the substrate may have a spherical shape, or a hemispherical shape. As a fourth example, the substrate may comprise two or more surfaces that are joined at facets. In some such cases, the substrate may be a platonic solid or may comprise a portion that is a platonic solid. In some embodiments, the substrate may be substantially flat. Other types of substrates are also possible.

In some embodiments, a multi-axis deposition system may comprise a substrate that is removable. The substrate may be configured to be positioned in the multi-axis deposition system during material deposition and removed after material deposition. In some embodiments, a multi-axis deposition system may comprise multiple substrates that may be added to the multi-axis deposition system prior to material deposition and/or removed from the multi-axis deposition system after material deposition. Each substrate may have a different shape (e.g., a different shoe size, a different cup size, a mold for a different type of apparel), or two or more substrates may have substantially the same shape.

As described above, one or more articles may be disposed on the substrate prior to material deposition and/or during material deposition using a multi-axis deposition system. The article(s) disposed on the substrate may be configured to be positioned on the substrate during material deposition and, optionally, removed from the substrate after material deposition. In some embodiments, a multi-axis deposition system may be configured to deposit material onto a multiple articles successively, each of which may be added to the multi-axis deposition system prior to material deposition and/or removed from the multi-axis deposition system after material deposition. For example, a textile (e.g., a non-flat textile, an upper, a woven textile, a knit textile) may be disposed on the substrate prior to material deposition, during material deposition, and/or after material deposition. In some embodiments, a multi-axis deposition system may be employed to deposit a reactive mixture as described above onto a textile to form a printed and/or 3D-printed material on the textile and/or on a succession of textiles sequentially added to the substrate.

It should be noted that the print head(s) and the substrate in a multi-axis deposition system comprising both a print head and a substrate may be oriented with respect to each other in other ways than that shown in FIG. 10. As an example, a print head may be disposed over the center of the substrate in some embodiments and over the edge of the substrate in other embodiments. As another example, a print head may be oriented so that it deposits material on the substrate at a 90° angle to the substrate in some embodiments and so that it deposits material on the substrate at another angle to the substrate (e.g., 45°, 30°, or other angles) in other embodiments. As a third example, the substrate may present a bottom surface (e.g., a portion of a last on which a sole would be disposed) to a print head in some embodiments and may present a side or top surface (e.g., a portion of a last on which an upper would be disposed) in other embodiments. In some cases, the print head(s) and/or the substrate may be configured to be translated and/or rotated around one or more axes, as described further below. In such cases, the absolute positions of the print head(s) and the substrate may be varied during operation of the multi-axis system, and/or the relative position of the print head(s) with respect to the substrate may be varied during operation of the multi-axis system.

As described above, a multi-axis deposition system may comprise one or more print heads that may be configured to be translated along one or more axes. In some embodiments, one or more print heads may be configured to be translated along one axis, along two axes, or along three axes. In certain cases, the axes may be perpendicular to each other. In other cases two or more of the axes are not perpendicular to each other (e.g., they may intersect at an angle between 45° and 90°). For example, in some embodiments the print head may be configured to be translated vertically, and/or translated in one or more directions perpendicular to the vertical direction. As another example, in some embodiments one or more print heads may be configured to be translated in a direction perpendicular to the substrate, and/or in one or more directions parallel to the substrate. As a third example, in some embodiments one or more print heads may be configured to be translated at a 45° angle with respect to the substrate. In some cases, each axis of translation may independently be controlled by separate motors. In some embodiments, one or more print heads may not be configured to be translated.

In some embodiments, one or more print heads in a multi-axis system may be configured to be rotated around one axis, around two axes, or around three axes. In some embodiments, one or more print heads may be configured to be rotated around more than three axes (e.g., around more than four axes, around more than six axes, around more than eight axes, around more than 10 axes, or around more than 12 axes). In certain cases, the axes may be perpendicular to each other. For example, in some embodiments the print head may be configured to be rotated around a vertical axis, and/or rotated around one or more axes perpendicular to the vertical axis. As another example, in some embodiments one or more print heads may be configured to be rotated around an axis perpendicular to the substrate, and/or around one or more axes parallel to the substrate. In some cases, each axis of rotation may independently be controlled by separate motors. In some embodiments, one or more print heads may not be configured to be rotated. In some embodiments, the print head may be configured to be stationary.

In some embodiments, a substrate in a multi-axis system may be configured to be translated along one axis, along two axes, or along three axes. In certain cases, the axes may be perpendicular to each other. In other cases two or more of the axes are perpendicular to each other (e.g., they may intersect at an angle between 45° and 90°. For example, in some embodiments the substrate may be configured to be translated vertically, and/or translated in one or more directions perpendicular to the vertical direction. As another example, in some embodiments the substrate may be configured to be translated in a direction perpendicular to the print head, and/or in one or more directions parallel to the print head. As a third example, in some embodiments the print head may be configured to be translated at a 45° angle with respect to the substrate. In some cases, each axis of translation may independently be controlled by separate motors. In some embodiments, the substrate may not be configured to be translated.

In some embodiments, a substrate in a multi-axis system may be configured to be rotated around one axis, around two axes, or around three axes. In certain cases, the axes may be perpendicular to each other. In some embodiments, the substrate may be configured to be rotated around more than three axes (e.g., around more than four axes, around more than six axes, around more than eight axes, around more than 10 axes, or around more than 12 axes). For example, in some embodiments the substrate may be configured to be rotated around a vertical axis, and/or rotated around one or more axes perpendicular to the vertical axis. As another example, in some embodiments the substrate may be configured to be rotated around an axis perpendicular to the print head, and/or around one or more axes parallel to the print head. In some cases, each axis of rotation may independently be controlled by separate motors. In some embodiments, the substrate may not be configured to be rotated. In some embodiments, the substrate may be configured to be stationary.

In some embodiments, a multi-axis deposition system may comprise one or more features that aid rotation and/or translation of a print head and/or a substrate. As an example, in some cases the print head may be attached to a print head arm that facilitates motion. When two or more print heads are present, each print head may be positioned on separate print head arms or two or more print heads may be positioned on the same print head arm. In some cases, two or more print head arms may be attached to a single gantry. The gantry may be a robotic gantry (e.g., a gantry comprising one or more components that may translate and/or rotate based on instructions from software). The print head arms may be capable of facilitating translation and/or rotation of the print head. In some embodiments, the print head(s) may be attached to single print head arms; in other embodiments, the print head(s) may be attached to multiple print head arms that are attached at joints that allow for rotation and/or translation. In some cases, one or more motors may facilitate motion of one or more components of the print head arm(s). As another example, in some cases the substrate may be attached to a substrate arm that facilitates motion. The substrate arm may be capable of facilitating translation and/or rotation of the substrate. In some embodiments, the substrate may be attached to a single substrate arm; in other embodiments, the substrate may be attached to multiple substrate arms that are attached at joints that allow for rotation and/or translation. In some cases, the substrate may be attached to a robot arm. In some cases, one or more motors may facilitate motion of one or more components of the substrate arm(s). In certain embodiments, the print head may be attached to a print head arm and the substrate may be attached to a substrate arm.

Figure 11:
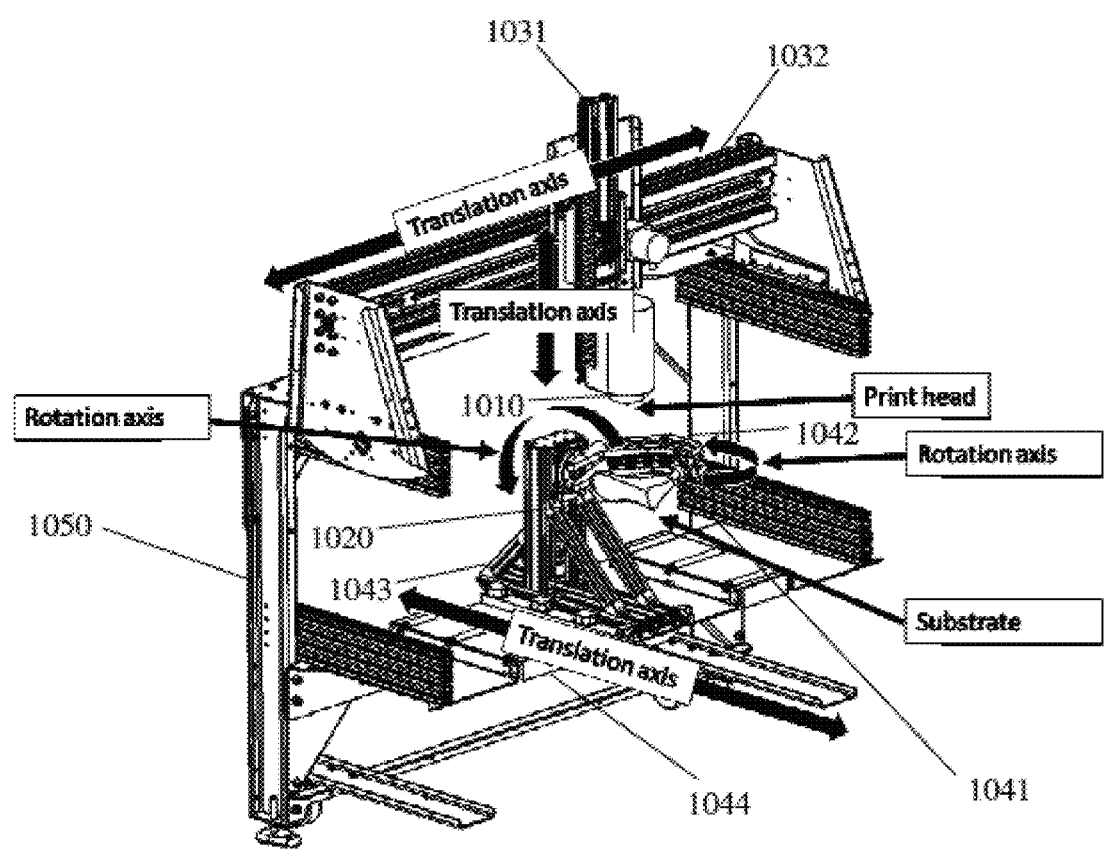
FIGS. 11-13 are schematic depictions of a multi-axis deposition system, according to certain embodiments of the invention.
Figure 12:
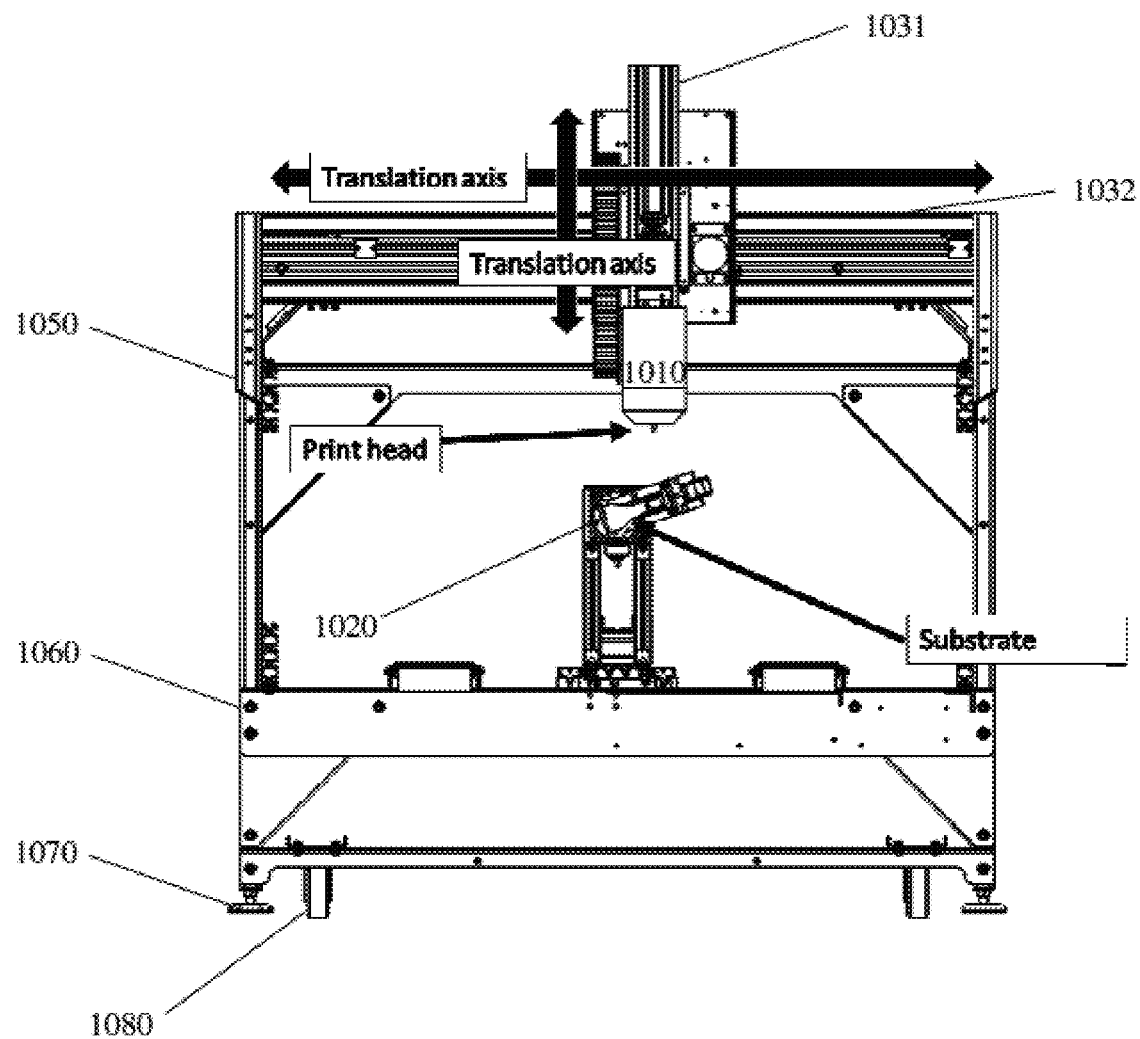
Figure 13:
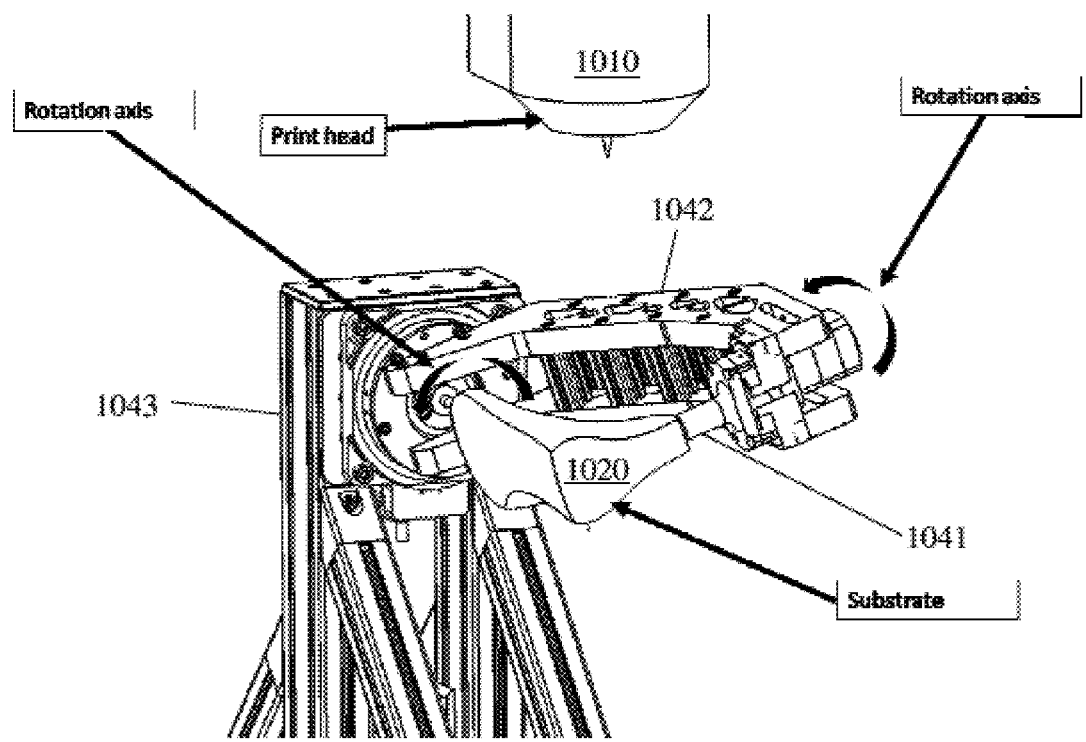

FIGS. 11-13 show various views of a non-limiting embodiment of a multi-axis deposition system showing various combinations of axes around which a print head and substrate therein may be configured to be rotated and/or translated. FIG. 11 shows a perspective view of the system as a whole, FIG. 12 shows a cross-sectional view of the system as a whole, and FIG. 13 shows a close up perspective view of the print head and the substrate. It should be understood that these figures do not show all possible combinations of print head and substrate motion, and that all combinations of print head motion and substrate motion described above are contemplated.

In FIGS. 11-13, the multi-axis deposition system includes print head 1010 and substrate 1020. Print head 1010 in FIGS. 11-13 is attached to first print head arm 1031, which is attached to second print head arm 1032 by a first print head joint configured to allow translation of first print head arm 1031 along a first print head translation axis and along a second print head translation axis. Second print head arm 1032 is also attached to gantry 1050, which supports the second print head arm. In some embodiments, the second print head arm is attached to the gantry by screws and held in a stationary position (as is shown in FIGS. 11-13). In other embodiments, the second print head arm is configured to be translated along one or more axes and/or rotated around one or more axes. The print head may be translated along the first print head translation axis by translating the first print head arm along the first print head translation axis, and the print head may be translated along the second print head translation axis by translating the first print head arm along the second print head translation axis. In certain cases, such as that shown in FIGS. 11-13, the second print head arm may be a track along which the first print head arm may be translated and/or the first print head joint may comprise a track along which the first print head arm may be translated. In other embodiments, other types of joints and print head arms may be employed.

Substrate 1010 in FIGS. 11-13 is attached to first substrate arm 1041, which is attached to second substrate arm 1042 by a first substrate joint configured to allow rotation of first substrate arm 1041 around a first substrate rotation axis. Second substrate arm 1042 is attached to third substrate arm 1043 by a second substrate joint configured to allow rotation of second substrate arm 1042 around a second substrate rotation axis. The substrate may be rotated around the first substrate rotation axis by rotating the first substrate arm around the first substrate rotation axis, and around the second substrate rotation axis by rotating the second substrate arm around the second substrate rotation axis. In some embodiments, one or more of the substrate arms may curved (e.g., second substrate arm as shown in FIGS. 11-13). Third substrate arm 1043 is attached to support 1044 by a third substrate joint configured to allow translation of the third arm along a first substrate translation axis. The substrate may be translated along the first substrate translation axis by translating the third arm along the first substrate translation axis. In certain cases, such as that shown in FIGS. 11-13, the third substrate arm may be a track along which the second substrate arm may be translated. In other embodiments, other types substrate arms may be employed.

In some embodiments, a multi-axis system may comprise further features in addition to some or all of those described above. For example, the multi-axis system may be encased in a frame or enclosure. FIG. 12 includes frame 1060 with feet 1070 and wheels 1080. The feet may aid stable positioning of the frame on a surface (e.g., a floor, a desktop, a lab bench). The wheels may promote facile repositioning of the frame in different locations. In some embodiments, one or more components (e.g., the frame, one or more arms) may be formed from standardized parts, such as T-slotted framing. Other types of standardized parts, and/or non-standard parts, may also be employed.

Certain combinations of print head motion and substrate motion may be especially advantageous. For example, as shown in FIGS. 11-13, a print head may be configured to be translated vertically and in a first horizontal direction, and the substrate may be configured to be translated along a second horizontal direction perpendicular to the first horizontal direction and rotated around two distinct axes. As another example, a print head may be configured to be translated in three perpendicular directions and the substrate may be configured to be rotated around two distinct axes. As a third example, a print head may be configured to be stationary and the substrate may be configured to be translated in three perpendicular directions and rotated around two distinct axes. As a fourth example, a print head may be configured to be translated around three distinct rotation axes and along three distinct translation axes, and the substrate may be configured to be stationary. Other combinations of print head motion and substrate motion are also possible.

In some embodiments, a multi-axis system may have one or more features that make it suitable for printing and/or 3D-printing materials of interest, such as a composite material as described elsewhere herein. For example, the multi-axis system may be configured to deposit a material onto a substrate as a continuous stream or as a continuous filament. In other words, the substrate may be in fluid communication with the print head via the material during deposition. In certain cases, the multi-axis system may be employed to deposit a continuous stream or filament that extends from a first side of a last or a material disposed on the last (e.g., an upper, a 3D-printed material disposed on an upper) across the bottom of the last or material disposed on the last to the opposing side of the last or material disposed on the last. In some cases, the multi-axis system may be employed to print each portion of an article of footwear except for the upper.

In some embodiments, a multi-axis system may be configured to print and/or 3D-print materials with one or more advantageous properties. For example, the multi-axis system may be configured to print and/or 3D-print materials with a feature size of greater than or equal to 100 microns, greater than or equal to 200 microns, greater than or equal to 500 microns, greater than or equal to 1 Mm, greater than or equal to 2 mm, greater than or equal to 5 mm, greater than or equal to 10 mm, greater than or equal to 20 mm, greater than or equal to 50 mm, greater than or equal to 1 cm, or greater than or equal to 2 cm. In some embodiments, the multi-axis system may be configured to print and/or 3D-print materials with a feature size of less than or equal to 5 cm, less than or equal to 2 cm, less than or equal to 1 cm, less than or equal to 5 mm, less than or equal to 2 mm, less than or equal to 1 mm, less than or equal to 500 microns, or less than or equal to 200 microns. Combinations of the above-referenced ranges are also possible (e.g., greater than or equal to 100 microns and less than or equal to 5 cm). Other ranges are also possible.

In some embodiments, one or more materials deposited onto a substrate (e.g., a polymer deposited by a spray deposition process) may comprise reactive functional groups for a period of time after deposition. As described above, in some embodiments, such functional groups may react with a pigment (e.g., with one or more pigment particles) to form a layer comprising a polymer bonded to the pigment. In some embodiments, such functional groups may react with an ink jet ink (e.g., with one or more ink jet ink particles) to form a layer comprising a polymer bonded to the ink jet ink. It should be understood that the composite articles described herein, and polymers formed by the methods described herein, may in some cases comprise one or more of the reactive functional groups described below for a period of time after deposition. In some embodiments, the composite articles described herein, and polymers formed by the methods described herein, may lack the functional groups described below. Similarly, systems described herein may be configured to deposit polymers comprising one of the reactive functional groups described below for a period of time after deposition, or may be configured to deposit polymers that lack the functional groups described below.

In some embodiments, a polymer may comprise reactive functional groups that are configured to react with other articles to which the deposited material is adjacent (e.g., articles of footwear, components of articles of footwear, materials deposited by a print head such as a nozzle, materials printed by a 3D-printing process, components of 3D-printed articles, portions of 3D-printed articles), such as an article onto which the material was deposited, an article added to the deposited material, an article positioned beside the deposited material, an article disposed on the same article onto which the material was deposited, and/or an article that is positioned partially above or below the deposited material and partially beside the deposited material. Although many of the articles referred to herein are articles of footwear or components thereof, it should be understood that articles of apparel such as sports bras, pants, shirts, and the like, and components of articles of apparel such as sports bras, pants, shirts, and the like are also contemplated herein. Reaction between the reactive functional groups in the deposited material and one or more articles to which it is adjacent may result in bond formation between the deposited material and the articles(s), and/or may increase the adhesive strength between the deposited material and the article(s). Examples of such articles include textiles, molded parts, layers, portions, further deposited materials with the same or different chemistry, and the like. In some embodiments, the deposited material may bond with two or more articles to which it is adjacent, and may adhere these articles together through bonds formed by reaction of the reactive functional groups in the deposited material with the articles. Each article adhered together may comprise a deposited material (e.g., a composite article may be built up by successively depositing layers of materials comprising reactive functional groups on top of each other), some of the articles adhered together may comprise a deposited material (e.g., a deposited material may adhere another deposited material to which it is adjacent to a textile on which they are both disposed), or none of the articles adhered together may comprise a deposited material. In some cases, the articles adhered together may have different physical or chemical properties (e.g., different values of toughness, different values of Young's modulus, different values of other properties described below).

In some embodiments, reactive functional groups that are configured to react with an article to which a deposited material (e.g., a polymer deposited by a spray deposition process) is adjacent (e.g., an article of footwear, a component of an article of footwear, a material deposited by a print head such as a nozzle, a material printed by a 3D-printing process, a component of a 3D-printed article, a portion of a 3D-printed article) may also be configured to react with other reactive functional groups in the deposited material. Reaction between two complementary sets of functional groups within the deposited material may comprise curing of the material. As the deposited material cures, the number of reactive functional groups within the deposited material may be reduced and the deposited material may become less reactive with any articles to which it is adjacent. In certain cases, tuning the curing time of the deposited material by varying one or more parameters (e.g., temperature at which the deposited material is held after deposition, composition of the deposited material) may be advantageous because it may allow for tuning of the reactivity of the deposited material as a function of time. For example, the curing time may be tuned so that the deposited material is adhesive upon deposition and upon further addition of a second article to the deposited material, but is no longer adhesive during further manufacturing steps and/or when an article of which the deposited material is a part of is in use.

A variety of suitable reactive functional groups and molecules comprising reactive functional groups may be included in a deposited material (e.g., a polymer deposited by a spray deposition process, a first layer comprising a first polymer, a second layer comprising a second polymer). In some embodiments, a deposited material may comprise reactive functional groups that are alcohol groups and reactive functional groups that are isocyanate groups, and the alcohol groups and isocyanate groups may react to form a polyurethane. In some embodiments, a deposited material may comprise reactive functional groups that are amine groups and reactive functional groups that are isocyanate groups, and the alcohol groups and isocyanate groups may react to form polyureas. In some embodiments, a deposited material may comprise reactive functional groups that are amine groups, reactive functional groups that are alcohol groups, and reactive functional groups that are isocyanate groups; in this case, the isocyanate groups may react with the amine groups and the alcohol groups to form a polyurethane/polyurea hybrid formulation). Further non-limiting examples of suitable reactive functional groups include hydroxyl groups, isocyanate groups, amine groups, glycidyl groups, epoxide groups such as cycloaliphatic epoxy groups, vinyl groups, catalysts such as platinum catalysts and tin catalysts, acrylate groups, methacrylate groups, and photoinitiators.

A polymer (e.g., a polymer positioned in a composite article, a polymer deposited by a method described herein, a polymer a system described herein is configured to deposit, a polymer in a layer comprising a polymer) may comprise one or more of a polyurethane, a polyurea, a polyurethane/polyurea hybrid formulation, a silicone, and an epoxy. Further non-limiting examples of molecules comprising reactive functional groups are also listed below. Non-limiting examples of suitable comprising molecules comprising alcohol groups include difunctional hydroxyl compounds such as 1,4-butanediol, hydroquinone bis(2-hydroxylethyl) ether, neopentyl glycol, di ethanolamine, and methyldiethanolamine; trifunctional hydroxyl compounds such as trimethylolpropane, 1,2,6-hexanetriol, and triethanolamine; tetrafunctional hydroxyl compounds such as pentaerythritol; and polyols such as polyether polyols, polyester polyols, polytetrahydrofuran, polycaprolactone polyols, polycarbonate polyols, and polytetramethylene ether glycol-based polyols. Non-limiting examples of suitable molecules comprising amine groups include difunctional amine compounds such as diethyltoluenediamine and dimethylthiotoluenediamine. Non-limiting examples of suitable molecules comprising isocyanate groups include methylenebis(phenyl isocyanate), toluene diisocyanate, hexamethylene diisocyanate, naphthalene diisocyanate, methylene bis-cyclohexylisocyanate, and isophorone diisocyanate. Other types of reactive functional groups, and other types of molecules comprising reactive functional groups are also possible.

Figure 14:
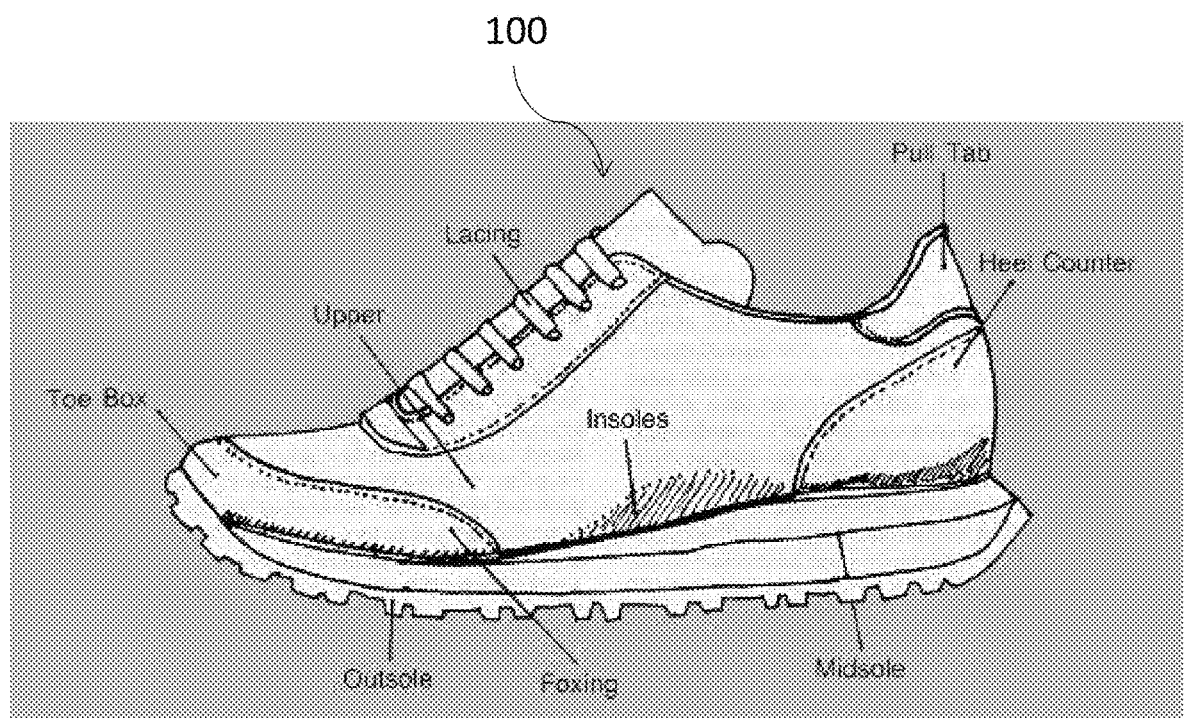
FIG. 14 illustrates an article of footwear according to certain embodiments of the invention.

In some embodiments, a composite article as designed herein may be suitable for use as a component of one or more articles of footwear. FIG. 14 shows one non-limiting embodiment of an article of footwear 100. The article of footwear comprises a sole, a toe box, an upper; lacing, a heel counter, and a pull tab. It should be understood that composite articles may form any of the components or be a portion of any or all of the components shown in FIG. 14. In some embodiments, multiple composite articles may be positioned on a single article of footwear (e.g., a single article of footwear may comprise a composite article that is disposed on a sole or is a sole and a composite article that is disposed on an upper). In some embodiments, the composite article may be a sole or a sole component, such as an outsole, a midsole, or an insole. In some embodiments, the composite article may be an article that is printed onto a sole component, such as a midsole and/or insole that is printed onto an outsole (e.g., a commercially available outsole, an outsole produced by a non-3D-printing process). In some embodiments, the composite article may be an upper. In some embodiments, the composite article may be an article that is printed onto an upper, such as a toe box, a heel counter, an ankle support, an eyestay, an article comprising a logo and/or embodying a logo, an eyelet, a quarter panel, a no sew overlay feature, and/or a pull tab. The upper may be one component of a fully assembled shoe which lacks the part(s) to be deposited, or it may be an upper that has not been assembled with other footwear components. In some embodiments, the composite article may be an article that is printed onto an upper, and the resultant article comprising the upper and the composite article may pass 1,000 or more cycles without degradation. In some embodiments, the composite article may be configured to adhere well to an upper.

Although FIG. 14 shows an athletic shoe, composite articles suitable for use in other types of footwear are also contemplated as described in further detail below. In some embodiments, the composite article may also or instead be suitable for one or more non-footwear components, such as orthotics and/or prosthetics.

Non-limiting examples of footwear include athletic footwear, shoes, sneakers, tennis shoes, basketball shoes, sandals, shoes appropriate for work, boots, booties, footwear comprising a heel of at least one inch, footwear lacking a heel or comprising a heel of less than one inch, basketball shoes, hiking boots, dress shoes, orthotics, bunion orthotics, and ski boots. Footwear comprising a composite article as described herein may be appropriate for men, women, and/or children.

In some embodiments, one or more materials (e.g., a polymer, a pigment, an ink jet ink) may be deposited onto an article of apparel and/or a substrate may be an article of apparel. Non-limiting examples of articles of apparel include sports bras, bralettes, bra linings, knee braces, ankle braces, wrist braces, shoulder braces, arm bands, leggings, pants, jeans, shirts and gloves. In some embodiments, one or more materials (e.g., a polymer, a pigment, an ink jet ink) may be deposited onto a bag or a sporting good and/or a substrate may be a bag or a sporting good. In some embodiments, one or more materials may be deposited onto a medical device or a wearable, and/or a substrate may be a medical device or a wearable.

EXAMPLE 1

Figure 15A:
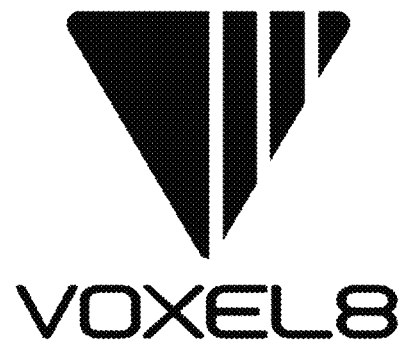
FIGS. 15A-15C are schematic depictions of designs that may be formed in composite articles, according to certain embodiments.
Figure 15B:
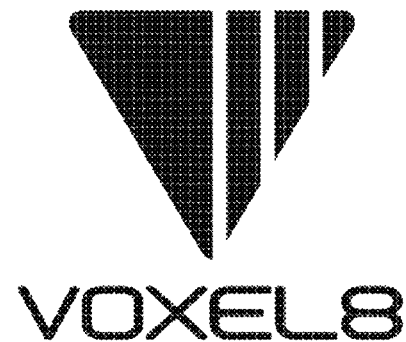
Figure 15C:
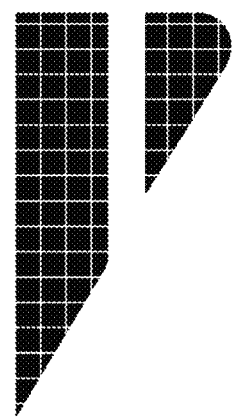
Figure 15D:
FIG. 15D shows two optical micrographs of composite articles, according to certain embodiments.

This Example describes the formation of a composite article comprising islands of pigment. A design was broken up into islands, and then pigment was printed onto a polyurethane layer in the design. Finally, a second layer comprising polyurethane was printed onto the pigment. FIG. 15A shows the initial design. FIGS. 15B and 15C show the design broken into islands. FIG. 15D shows two optical micrographs of the resultant composite article at two different magnification levels.

EXAMPLE 2

Figure 16:
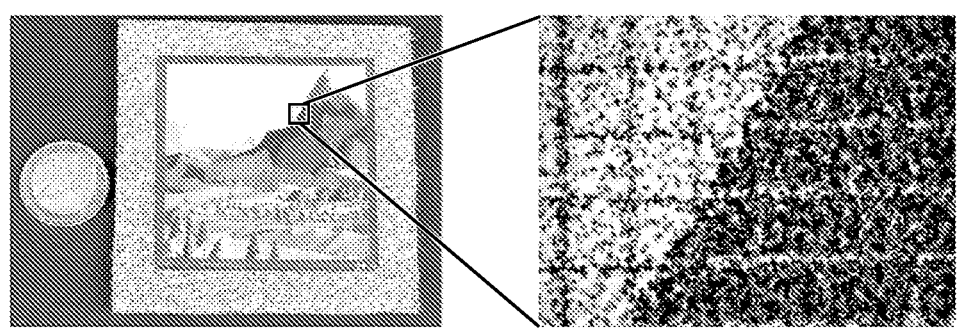
FIG. 16 shows two optical micrographs of composite articles, according to certain embodiments.

This Example describes the formation of a composite article comprising various colors of pigment. The composite article comprises particles of pigment of different colors positioned between two polyurethane films. FIG. 16 shows two optical micrographs at different length scales of a composite article. At the larger length scale, the composite article appears to be a picture with continuous variation in color. At the smaller length scale, the individual pigment particles and islands are apparent.

EXAMPLE 3

This Example describes the formation of a composite article comprising a portion with a matte finish and a portion with a glossy finish. The composite article was formed by depositing translucent ink jet ink onto portions of a clear high-gloss polyurethane base by an ink jet process. The resultant composite article included a grid of translucent ink jet ink disposed on the polyurethane base in certain portions and an uncoated clear high-gloss polyurethane base in other portions.

Figure 17A:
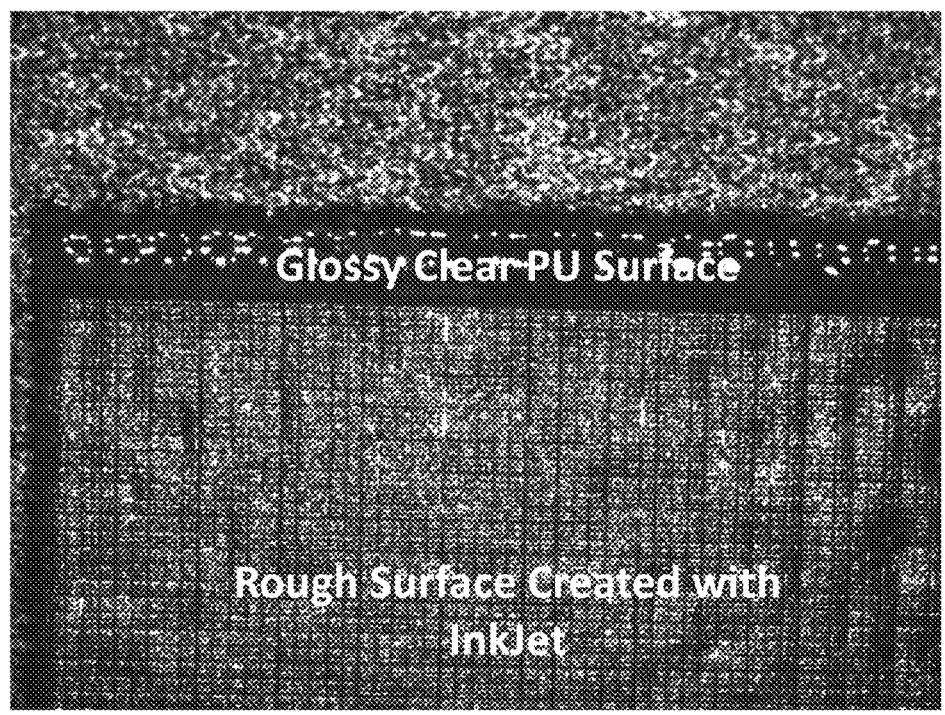
FIGS. 17A-17B are optical micrographs of composite articles, according to certain embodiments.
Figure 17B:
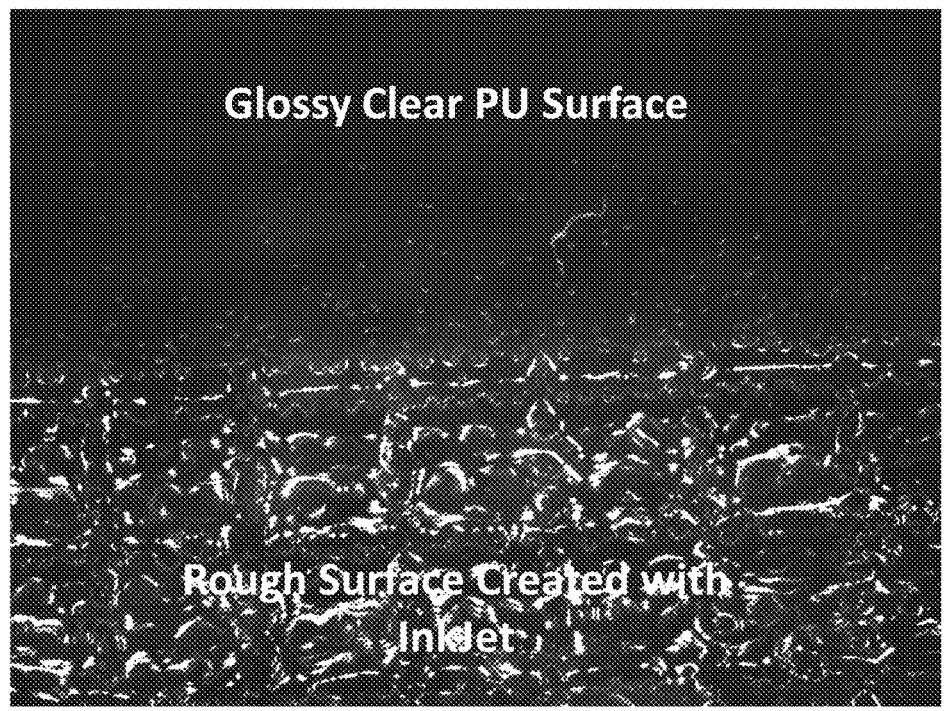

FIG. 17A shows an optical micrograph of the composite article. At the magnification in FIG. 17A, the composite article appears to include one portion that has a frosted matte finish and another portion that has a glossy finish. The portion with the matte finish is the portion where the translucent ink jet ink had been deposited, and the portion with the glossy finish is the portion where the translucent ink jet ink had not been deposited. FIG. 17B shows an optical micrograph of the same composite article shown in FIG. 17A at a higher magnification. In FIG. 17B, the grid of translucent ink jet ink can be seen in the bottom of the image and the uncoated polyurethane can be seen in the top of the image.

EXAMPLE 4

Figure 18:
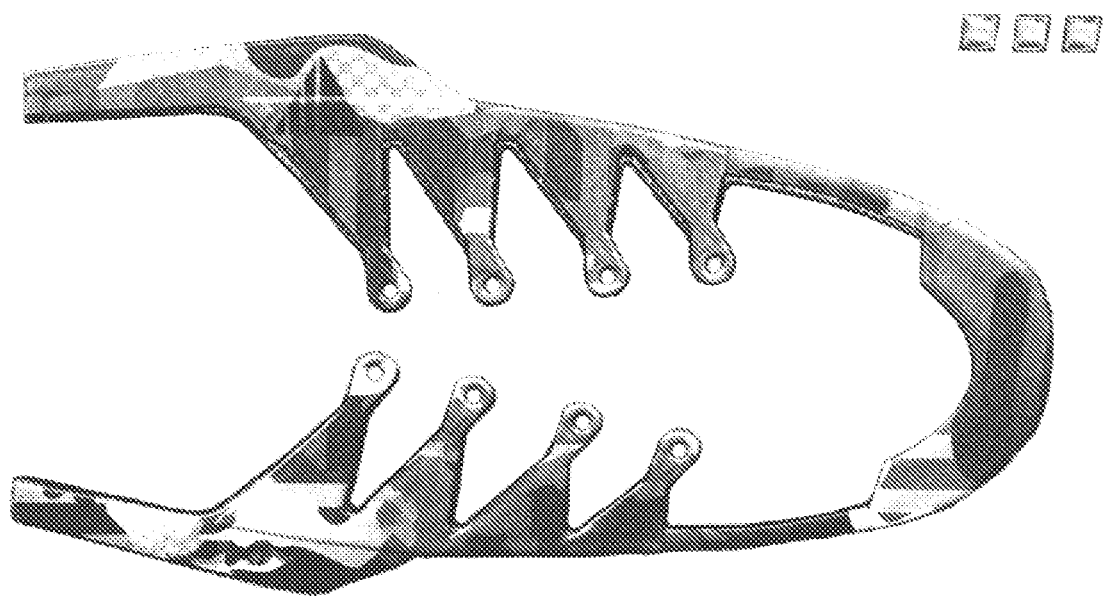
FIG. 18 is an optical micrograph of a composite article, according to certain embodiments.

This Example describes the formation of a composite article with an aesthetically pleasing design. The composite article shown in FIG. 18 was formed by depositing a layer comprising a polymer and a layer comprising a pigment as described herein.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of forming a composite article, comprising:
   depositing a first polymer onto a substrate to form a first layer comprising the first polymer;
   depositing a pigment onto the first layer to form a second layer comprising the pigment; and
   depositing a second polymer onto the second layer to form a third layer comprising the second polymer.

2. A method as in claim 1, wherein the pigment is in the form of islands.

3. A method as in claim 2, wherein the islands are not interconnected.

4. A method as in claim 2, wherein an average size of the islands is less than or equal to 5 mm.

5. A method as in claim 1, wherein the first polymer is the same as the second polymer.

6. A method as in claim 1, wherein the pigment is at least partially embedded in the first layer comprising the first polymer.

7. A method as in claim 1, wherein one or more of the layers comprising the polymers are continuous.

8. A method as in claim 1, wherein depositing the first polymer comprising spraying the first polymer and/or depositing the second polymer comprises spraying the second polymer.

9. A method as in claim 1, wherein depositing the first polymer comprises printing the first polymer from a print head positioned on a robotic gantry and/or depositing the second polymer comprises printing the second polymer from a print head positioned on a robotic gantry.

10. A method as in claim 1, wherein the first polymer comprises a polyurethane and/or the second polymer comprises a polyurethane.

11. A method as in claim 1, wherein the layer comprising the pigment further comprises an additional polymer.

12. A method as in claim 11, wherein the additional polymer is the same as the first polymer or the second polymer.

13. A method as in claim 11, wherein the additional polymer is different from the first polymer and different from the second polymer.

14. A method as in claim 11, wherein the additional polymer forms a majority of the layer comprising the pigment.

15. A method as in claim 1, wherein the layer comprising the pigment further comprises a second pigment.

16. A method as in claim 15, wherein the second pigment is a different color than the pigment.

17. A method as in claim 1, wherein a portion of the layer comprising the pigment lacks any type of pigment.

18. A method of forming a composite article, comprising:
    depositing a first polymer onto a substrate to form a first layer comprising the first polymer;
    depositing an ink jet ink onto the first polymer.

19. A method as in claim 18, further comprising depositing a second polymer onto the ink jet ink.

20. A method as in claim 18, wherein the composite article comprises a gradient in one or more properties.

21. A method as in claim 20, wherein the property is selected from the group consisting of average stiffness, average Shore A hardness, average Shore D hardness, average Asker C hardness, average density, color, average surface roughness, average reflectivity, average strength, average elongation at break, average tensile elastic modulus, and average modulus at 100% strain.

22. A method as in claim 20, wherein the gradient is oriented in a direction substantially parallel to a surface of the fabric.

23. A method as in claim 18, wherein depositing the first polymer comprising spraying the first polymer.

24. A method as in claim 18, wherein depositing the first polymer comprises printing the first polymer from a print head positioned on a robotic gantry.

25. A method as in claim 18, wherein the first polymer comprises a polyurethane.

26. A method as in claim 18, wherein depositing the first polymer comprises expelling a curable composition configured to cure to form the first polymer from a print head.

27. A method as in claim 26, wherein the curable composition comprises more than one component.

28. A method as in claim 18, wherein the composite article forms part of an upper and/or comprises an upper.

29. A method as in claim 18, wherein the ink jet ink forms a continuous layer.

* * * * *